US009454302B2

(12) United States Patent
Toriyama

(10) Patent No.: US 9,454,302 B2
(45) Date of Patent: Sep. 27, 2016

(54) INFORMATION PROCESSING APPARATUS, SYSTEM AND METHOD FOR CONTROLLING DISPLAY OF WINDOWS

(75) Inventor: Kazuyoshi Toriyama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1110 days.

(21) Appl. No.: 13/164,041

(22) Filed: Jun. 20, 2011

(65) Prior Publication Data

US 2011/0246933 A1    Oct. 6, 2011

Related U.S. Application Data

(63) Continuation of application No. 10/593,828, filed as application No. PCT/JP2005/003560 on Feb. 24, 2005, now abandoned.

(30) Foreign Application Priority Data

Mar. 22, 2004    (JP) .................................. 2004-083248

(51) Int. Cl.
G06F 3/048    (2013.01)
G06F 3/0488    (2013.01)
(Continued)

(52) U.S. Cl.
CPC ......... *G06F 3/04883* (2013.01); *A63F 13/005* (2013.01); *A63F 13/02* (2013.01); *G06F 3/0481* (2013.01); *G06F 3/0488* (2013.01); *G06F 3/04886* (2013.01); *A63F 2300/1075* (2013.01);
(Continued)

(58) Field of Classification Search
CPC .................................................... G06F 3/0481
USPC ........................................................ 715/790
See application file for complete search history.

(56) References Cited

U.S. PATENT DOCUMENTS 4,542,903 A    9/1985    Yokoi et al.
5,712,995 A    1/1998    Cohn
(Continued)

FOREIGN PATENT DOCUMENTS

JP    58-116377    7/1983
JP    4-369027    12/1992
(Continued)

OTHER PUBLICATIONS

"UltraMon Smart Taskbar", Aug. 3, 2003, 2 pages http://web.archive.org/web/20020803185317/http://realtimesoft.com/ultramon/tour/smart_taskbar.asp.*
(Continued)

*Primary Examiner* — William Bashore
*Assistant Examiner* — Henry Orr
(74) *Attorney, Agent, or Firm* — Nixon & Vanderhye PC

(57) ABSTRACT

An information processing apparatus (10) includes an LCD (12) as a first display area and an LCD (14) as a second display area, and on the second display area, a touch panel (22) as an input means is set, for example. On the first display area, a plurality of windows are displayed in an overlapping manner or only the top window is displayed, and on the second display area, a plurality of tabs which are respectively corresponded to a plurality of windows are displayed. When it is determined that a predetermined input is present on a tab on the basis of the coordinates data detected according to an operation via the touch panel, a window corresponding to the tab which was displayed on the top on the first display area is displayed on the second display area. Or, an inactive window corresponding to the tab is displayed on the second display area.

24 Claims, 31 Drawing Sheets

(51) Int. Cl.
*A63F 13/00* (2014.01)
*A63F 13/98* (2014.01)
*G06F 3/0481* (2013.01)

(52) U.S. Cl.
CPC .... *A63F 2300/203* (2013.01); *A63F 2300/301* (2013.01)

(56) References Cited

U.S. PATENT DOCUMENTS

| | | | | |
|---|---|---|---|---|
| 5,757,371 | A * | 5/1998 | Oran | G06F 3/0482 715/779 |
| 5,892,511 | A * | 4/1999 | Gelsinger | G06F 3/0481 715/790 |
| 5,910,802 | A * | 6/1999 | Shields | G06F 3/0488 345/173 |
| 6,369,803 | B2 * | 4/2002 | Brisebois | G06F 3/03547 178/18.01 |
| 2003/0189597 | A1 * | 10/2003 | Anderson | G06F 3/0481 715/778 |
| 2004/0066414 | A1 * | 4/2004 | Czerwinski | G06F 3/0481 715/781 |
| 2005/0188329 | A1 * | 8/2005 | Cutler | G06F 8/38 715/804 |

FOREIGN PATENT DOCUMENTS

| | | |
|---|---|---|
| JP | 5-204581 | 8/1993 |
| JP | 6-285259 | 10/1994 |
| JP | 7-51467 | 2/1995 |
| JP | 8-83160 | 3/1996 |
| JP | 2000-35847 | 2/2000 |
| JP | 2000-134503 | 5/2000 |
| JP | 2000-137555 | 5/2000 |
| JP | 2001-70647 | 3/2001 |
| JP | 2001-321571 | 11/2001 |
| JP | 2002-182893 | 6/2002 |
| JP | 2003-47774 | 2/2003 |
| JP | 2003-157066 | 5/2003 |

OTHER PUBLICATIONS

"UltraMon Smart Taskbar", Aug. 3, 2003, 2 pages, http://web.archive.org/web/20020803185317/http://realtimesoft.com/ultramon/tour/smart_taksbar.asp.

International Search Report of PCT/JP2005/003560 mailed Aug. 2, 2005.

Nintendo DS Instruction Booklet, p. 4-5, p. 16-17 [online], 4 pages, Jan. 19, 2005.

Examination Report in corresponding EP Application No. 05710783.1 dated Jan. 25, 2012.

Patent Board Decision for Appeal 2013-008351, U.S. Appl. No. 10/593,828, seven pages, mailed Dec. 21, 2015.

* cited by examiner

WINDOW IMAGE STORING AREA

| INITIAL ADDRESS OF WINDOW IMAGE | WINDOW IMAGE DATA |
|---|---|
| 00AA | INPUT WINDOW IMAGE |
| 00AB | SEARCH CANDIDATE WINDOW IMAGE |
| 00AC | MINERAL WATER WINDOW IMAGE (DICTIONARY WINDOW) |
| 00AD | MINERAL SALTS WINDOW IMAGE (DICTIONARY WINDOW) |
| ⋮ | ⋮ |

TAB DATA STORING AREA

| TAB NUMBER | TITLE IMAGE DATA | INITIAL ADDRESS OF WINDOW IMAGE |
|---|---|---|
| 1 | SEARCH CANDIDATE | 00AB |
| 2 | MINERAL WATER | 00AC |
| 3 | MINERAL SALTS | 00AD |
| ⋮ | ⋮ | ⋮ |

(A)

ONE OR TWO CLICK (B)

ONE OR TWO CLICK (A)

⇒ PROCESS THE SAME AS TWO CONTINUOUS TOUCHES (B)

⇒ CLOSE WINDOW (RESET TAB NUMBER)

INFORMATION PROCESSING APPARATUS, SYSTEM AND METHOD FOR CONTROLLING DISPLAY OF WINDOWS

CROSS REFERENCE TO RELATED APPLICATION

This application is a continuation of Ser. No. 10/593,828 filed Sep. 22, 2006, which is a 371 of PCT/JP2005/003560 filed on Feb. 24, 2005, the entire contents of which are hereby incorporated by reference.

TECHNICAL FIELD

The exemplary embodiments disclosed herein relate to an information processing apparatus, an information processing program, a storage medium storing an information processing program, and a window controlling method. More specifically, the exemplary embodiments disclosed herein relate to an information processing apparatus, an information processing program, a storage medium storing an information processing program, and a window controlling method which display a plurality of windows on a first display area and a second display area.

BACKGROUND AND SUMMARY

One example of a controlling technique of a plurality of windows is disclosed in the document 1 (Japanese Patent Laying-open No. 5-204581) laid-open on Aug. 13, 1993. In the window displaying method described in the document 1, a plurality of windows are displayed in an overlapping manner on a screen, and a plurality of icons are displayed on the same screen. Then, the window corresponding to the icon on which a mouse input is performed is displayed on the forefront in an active state.

Furthermore, another example of a controlling technique of a plurality of windows is disclosed in the document 2 (Japanese Patent Laying-open No. 8-83160) laid-open on Mar. 26, 1996. In the multi-window displaying method described in the document 2, a plurality of windows are displayed in an overlapping manner on a display (first display) out of a plurality of displays. To each of the plurality of displays, a mouse and an operation key (reproduction destination key, moving destination key or copy destination key) are provided. When a second display is designated with an operation key provided on the first display, and a window is selected with a mouse provided thereto, the selected window is displayed on the designated second display through reproducing, moving, or copying.

In the technique described in the document 1, in response to an icon being selected with the mouse, a corresponding window is displayed in an active state, eliminating a need for performing a complicated operation, such as moving the overlapping windows. However, in the technique described in the document 1, a window intended to be rendered an active window out of the plurality of windows overlapping on one screen is merely selected by the icon on the same screen. Furthermore, the selected window is merely displayed at the forefront in the same position on the same screen. In the document 1, the technique of controlling the plurality of windows between the plurality of display areas or between the plurality of display screens is nowhere disclosed.

Furthermore, in the technique described in the document 2, a selected window out of the plurality of windows displayed on one display in an overlapping manner is displayed on another designated display, capable of improving visibility. However, in the technique described in the document 2, for making an input to a screen of each display, each mouse, etc. has to be utilized, causing a bother in operation. That is, one of the plurality of windows displayed on the first display can be displayed on the second display by operating a mouse, etc. provided on the first display, but for inputting to the window displayed on the second display, a mouse, etc. provided on the second display has to be operated. Also, even when the mouse, etc. provided on the second display is operated, it is impossible to display a window displayed on the first display on the second display.

Therefore, it is a feature of certain exemplary embodiments to provide a novel information processing apparatus, information processing program, storage medium storing an information processing program, and window controlling method.

Another feature of certain exemplary embodiments is to provide an information processing apparatus, an information processing program, a storage medium storing an information processing program, and a window controlling method which are able to improve operability with respect to a window control among a plurality of display areas.

An information processing apparatus of a first exemplary embodiment comprises a storing means, a display means, a detecting means, and a first display controlling means. The storing means stores data to display a plurality of windows and data to display a plurality of selection areas which are respectively corresponded to the plurality of windows. The display means includes a first display area on which only a predetermined window out of the plurality of windows is displayed or the plurality of windows are displayed in an overlapping manner, and a second display area on which the plurality of selection areas are displayed. The detecting means detects an input to display positions of the plurality of selection areas. The first display controlling means displays, when it is determined that a first predetermined input is performed within a selection area corresponding to a window displayed on the first display area or a window displayed on a forefront by the detecting means, the window corresponding to the selection area on the second display area.

More specifically, the information processing apparatus (10: reference numeral designating a portion corresponding in the exemplary embodiments) of the first exemplary embodiment includes a storing means (28a, 48), and the storing means stores data to display a plurality of windows and data to display a plurality of selection areas which are respectively corresponded to the plurality of windows. In certain exemplary embodiments, window image data, upper screen window tab number data, lower screen window tab number data, tab data, tab position data, etc. are stored. A display means (12, 14) includes a first display area (12) and a second display area (14). The first display area displays a predetermined (forefront in depth, for example) window out of a plurality of windows (110, 114, 118), or displays the plurality of windows in an overlapping manner. The second display area displays a plurality of selection areas (112, 116, 120). A detecting means (42, S5, S7, S131, S133, S135, S137, S143, S145, S161, S163, S189, S211, S213, S227) detects an input to display positions of the plurality of selection areas. A first display controlling means (42, 50, 52, 60, S181, S183, S241, S243) displays, when it is determined that a first predetermined input is performed within a selection area corresponding to a window displayed on the first display area or a window displayed on a forefront by the detecting means, the window corresponding to the selection area on the second display area. The predetermined input is an input with a one-click operation, a two-click operation, a downward-sliding operation, or the like in certain exemplary embodiments.

More specifically, for example, the storing means may includes a table storing means (80) for storing table data (tab data) to bring the respective selection areas into the respective windows. The first display controlling means determines a window corresponding to the selection area on which a predetermined input is performed on the basis of the table storing means, and displays the window on the second display area. In addition, the storing means may include the identification information storing means (80) for storing identification information (tab number) to be applied to each of the windows and a second display area identification information storing means (84) for storing identification information of the window to be displayed on the second display area. The first display controlling means, when a predetermined input is performed within a selection area, stores identification information of the window corresponding to the selection area on the second display area identification information storing means (S181, S241), and displays the window to which the stored identification information applied on the second display area (S185, S243).

According to the information processing apparatus, the plurality of selection areas which are respectively corresponded to the plurality of windows are displayed on the second display area, and therefore, a user performs a first predetermined input to the selection area of the second display area to thereby display a window displayed on the first display area or a window displayed on the forefront (active window) on the second display area. Thus, it becomes possible to perform an operation or input to the window by means of an input means, for example. Therefore, even the window displayed on the first display area can be displayed so as to be set to an inputable state on the second display area through movement or copying by performing a predetermined operation on the selection area of the second display area, capable of improving operability.

In one aspect, an information processing apparatus further comprises a second display controlling means for displaying, when it is determined that a first predetermined input is performed within a selection area corresponding to a window which is not displayed on the first display area and the second display area or a window a part of which is hidden under the window displayed on the forefront on the first display area by the detecting means, the window corresponding to the selection areas on the first display area or on the forefront on the first display area.

More specifically, the second display controlling means (42, 50, 52, 60, S185, S187), displays when it is determined that a first predetermined input is performed within a selection area corresponding to a window which is not displayed on the first display area and the second display area or a window a part of which is hidden under the window displayed on the forefront on the first display area (inactive window) by the detecting means, the window corresponding to the selection area on the first display area or on the forefront on the first display area. The first predetermined input is an input by the one-click operation in certain exemplary embodiments. In this case, the user temporarily displays the inactive window on the first display area or displays it on the forefront of the first display area by the first predetermined input, and thus he or she can confirm the content of the window by the first display area, for example. Then, after the confirmation, by performing a predetermined input operation as necessary, it is possible to display the window on the second display area. Accordingly, it is possible to improve operability.

In another aspect, an information processing apparatus further comprises a third display controlling means for displaying, when it is determined that a second predetermined input is performed within a selection area corresponding to a window which is not displayed on the first display area and the second display area or a window a part of which is hidden under the window displayed on the forefront on the first display area by said detecting means, the window corresponding to the selection area on the second display area.

More specifically, the third display controlling means (42, 50, 52, 60, S241, S243), displays when it is determined that a second predetermined input is performed within a selection area corresponding to a window which is not displayed on the first display area and the second display area or a window a part of which is hidden under the window displayed on the forefront on the first display area (inactive window) by the detecting means, the window corresponding to the selection area on the second display area. The second predetermined input is an input by a two-click operation or a downward-sliding operation in certain exemplary embodiments. In this case, by the second predetermined input different from the first predetermined input to display an active window on the second display area, an inactive window can be directly displayed on the second display area, capable of directly setting the window to an operational inputable state, and allowing a quick input. For example, it is extremely advantageous in a case that the content of the inactive window needs not to be confirmed. Accordingly, it is possible to improve operability. In addition, the user uses different input operations on the selection area corresponding to the inactive window to thereby differentiate the display control of the inactive window. For example, in a case that the content of an inactive window needs to be confirmed, by performing a first predetermined input, it is possible to temporarily display the inactive window on the forefront on the first display area.

An information processing apparatus of the second exemplary embodiment comprises a storing means, a display means, a detecting means, and a first display controlling means. The storing means stores data to display a plurality of windows and data to display a plurality of selection areas which are respectively corresponded to the plurality of windows. The display means includes a first display area on which only a predetermined window out of the plurality of windows is displayed or the plurality of windows are displayed in an overlapping manner and a second display area on which the plurality of selection areas are displayed. The detecting means detects an input to display positions of the plurality of selection areas. The third display controlling means displays, when it is determined that a second predetermined input is performed at a display position of a selection area corresponding to a window which is not displayed on the first display area and the second display area or a window a part of which is hidden under the window displayed on a forefront on the first display area by the detecting means, the window corresponding to the selection area on the second display area.

More specifically, the information processing apparatus of the second exemplary embodiment is the same as the above-described information processing apparatus of the first exemplary embodiment except for a difference in operation of the display controlling means, and therefore, a duplicated description will be omitted. Also, a third display controlling means in the second exemplary embodiment is equivalent to the third display controlling means in the first exemplary embodiment, and displays when it is determined that a second predetermined input is performed at a display position of a selection area corresponding to a window which is not displayed on the first display area and the second display area or a window a part of which is hidden under the window displayed on the forefront on the first display area by the detecting means, the window corresponding to the selection area on the second display area. The second predetermined input may be an input by the one-click operation, a two-click operation, a downward-sliding operation, or the like. According to the information processing apparatus of the second exemplary embodiment, the user performs a second predetermined input on the selection area corresponding to the inactive window to thereby directly display the inactive window on the second display area, and can directly set the window to an operational inputable state, allowing a quick input. For example, it is extremely advantageous in a case that the content of the inactive window needs not to be confirmed. Accordingly, by performing a predetermined operation in the selection area of the second display area, even the inactive window can be displayed on the second display area so as to be set to an inputable state, capable of improving operability.

In one aspect, an information processing apparatus of the second exemplary embodiment further comprises a first display controlling means for displaying, when it is determined that a first predetermined input is performed within a selection area corresponding to a window displayed on the first display area or the window displayed on the forefront by said detecting means, the window corresponding to the selection area on the second display area. The first display controlling means is equivalent to the first display controlling means in the first exemplary embodiment, and displays, when it is determined that a first predetermined input is performed within a selection area corresponding to the active window of the first display area by the detecting means, the window corresponding to the selection area on the second display area. The first predetermined input is set so as to be different from the second predetermined input, for example, and in certain exemplary embodiments, the first predetermined input is an input by a one-click operation, and the second predetermined input is an input by a two-click operation, a downward-sliding operation, or the like. In this case, by performing the first predetermined operation different from the second predetermined input within the selection area corresponding to the window displayed on the first display area, it is possible to display the window on the second display area through moving or copying or the like.

Also, in the above-described first and second exemplary embodiment, in one aspect, the detecting means detects an input to an arbitrary position of the second display area. The information processing apparatus further comprises a setting means (42, S181, S183, S241, S243) for setting, when a window is displayed on the second display area by the first display controlling means or the third display controlling means, the window to an inputable state from the detecting means. In certain exemplary embodiments, when a tab number is stored in the lower screen window tab storing area 84, and the window corresponding to the stored tab number is displayed, the window is set to an inputable state. Accordingly, by performing a predetermined input on the selection area, it is possible to perform an input operation on the window displayed on the second display area.

In another aspect, an information processing apparatus comprises a fourth display controlling means for displaying, when it is determined that a predetermined input is performed within a selection area corresponding to the window displayed on the second display area, the window corresponding to the selection area of the forefront on the first display area.

More specifically, the fourth window controlling means (42, 50, 52, 60, S185, S187, S215, S217) displays, when it is determined that a predetermined input is performed within a selection area corresponding to the window displayed on the second display area on the basis of the coordinates data detected by the coordinates detecting means, the window corresponding to the selection area of the forefront on the first display area. In this case, if an input operation to the window displayed on the second display area is not required, the window can be moved from the second display area to the first display area, capable of improving operability.

In the other aspect, the information processing apparatus further comprises a fifth display controlling means for displaying, in a case that the window is displayed on the second display area and when it is determined that other window is being displayed on the second display area, the other window on the forefront on the first display area.

More specifically, a fifth display controlling means (42, 50, 52, 60, S165, S167, S175, S223, S225, S235) displays, in a case that the window is intended to be displayed on the second display area by the first display controlling means or the third display controlling means and when it is determined that other window is being displayed on the second display area, the other window on the forefront on the first display area. For more detail, for example, the storing means may include a first display area identification information storing means (82) for storing identification information of the window to be displayed on the first display area. The fifth display controlling means, when it is determined that other window is being displayed on the second display area (S165, S223), stores the identification information of the other window on the first display area identification information storing means (S167, S225), and displays the window to which the stored identification information is applied on the first display area (S175, S235). In this case, the window to be input from now and the window which has been an object to be operated by now are switched by only a predetermined input, capable of improving operability.

In one exemplary embodiment, the detecting means detects the predetermined input on the basis of the input data from a touch panel (22) which is not set on the first display area but set on the second display area. In this case, it is possible to operate it as if the player touches the selection area of the second display area, and similarly, it is possible to operate the window displayed on the second display area as if the player touches it. Accordingly, it is possible to control the window with an intuitive operation. Also, since the touch panel is an input means, a window as an operational object can be displayed on the second display area which exists within a range touchable by a user, that is, reachable by the user. Accordingly, it is possible to further improve operability.

In another aspect, the storing means stores data to display a basic input window (input window image data) to be displayed on the second display area, and the information processing apparatus further comprises a basic display controlling means (42, 50, 52, 60, S189, S191, S193, S213, S219, S221, S277, S279, S281) for displaying the basic input window on the second display area when no window to be displayed on the second display area is present. Accordingly, in a case that no window to be displayed on the second display area out of the plurality of windows is present, the basic input window is displayed on the second display area, and therefore, it becomes possible to prompt the user to input, and to respond to an input operation required for the progress of the application, etc. Furthermore, this makes it possible for the user to smoothly perform an input operation without inhibiting the input operation by the user.

In the other aspect, an information processing apparatus comprises a generating means for, when a predetermined coordinates input is performed to the window displayed on the second display area, generating data to display a new window and data to display a new selection area, and storing the generated data in the storing means by bring them correspondence with each other, and a selection area display controlling means for displaying the selection area generated by the generating means on the second display area.

More specifically, the generating means (42, S49, S51, S101, S103, S105, S107, S109) generates data to display a new window and data to display a new selection area, and stores the generated data in the storing means by bringing them into correspondence with each other when a predetermined coordinates input is performed to the window displayed on the second display area. In certain exemplary embodiments, when it is determined that an input is performed to the display position of the word of a search candidate window or the word in a dictionary window, dictionary window image data for explaining the word and a tab number corresponding to the window, and title image data of the tab are generated, and the tab data obtained by bringing them correspondence with each other are stored in the tab data storing area 80. The selection area display controlling means (42, 50, 52, 60, S115, S117) displays the generated selection area on the second display area. Accordingly, by performing an input operation to the window, a new window and a selection area can be created, and therefore, the display of the new window can be controlled by a predetermined input to the selection area, capable of improving operability.

A information processing program of the third exemplary embodiment is an information processing program of an information processing apparatus comprising a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed. The information processing program causes a processor of the information processing apparatus to execute a detecting step and a first display controlling step. The detecting step detects an input to display positions of the plurality of selection areas. The first display controlling step displays, when it is determined that a first predetermined input is performed within a selection area corresponding to a window displayed on the first display area or a window displayed on a forefront by the detecting step, the window corresponding to the selection area on the second display area.

A storage medium storing an information processing program of a fourth exemplary embodiment is a storage medium storing an information processing program of an information processing apparatus comprises a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed. The information processing program of the storage medium causes a processor of the information processing apparatus to execute a detecting step and a first display controlling step. The detecting step detects an input to display positions of the plurality of selection areas. The first display controlling step displays, when it is determined that a first predetermined input is performed within a selection area corresponding to a window displayed on the first display area or a window displayed on a forefront by the detecting step, the window corresponding to the selection area on the second display area.

A window controlling method of a fifth exemplary embodiment is a window controlling method of an information processing apparatus comprising a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed. The window controlling method includes a detecting step, and a first display controlling step. The detecting step detects an input to display positions of the plurality of selection areas. The first display controlling step displays, when it is determined that a first predetermined input is performed within a selection area corresponding to a window displayed on the first display area or a window displayed on a forefront by the detecting step, the window corresponding to the selection area on the second display area.

An information processing program of a sixth exemplary embodiment is an information processing program of an information processing apparatus comprising a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed, and causes a processor of the information processing apparatus to execute a detecting step, and a third display controlling step. The detecting step detects an input to display positions of the plurality of selection areas. The third display controlling step displays, when it is determined that a second predetermined input is performed at a display position of a selection area corresponding to a window which is not displayed on the first display area and the second display area or a window a part of which is hidden under the window displayed on a forefront on the first display area by the detecting step, the window corresponding to the selection area on the second display area.

A storage medium storing an information processing program of a seventh exemplary embodiment is a storage medium storing an information processing program of an information processing apparatus comprising a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed. The information processing program of the storage medium causes a processor of the information processing apparatus to execute a detecting step, and a third display controlling step. The detecting step detects an input to display positions on the plurality of selection areas. The third display controlling step displays, when it is determined that a second predetermined input is performed at a display position of a selection area corresponding to a window which is not displayed on the first display area and the second display area or a window a part of which is hidden under the window displayed on the forefront on the first display area by the detecting step, the window corresponding to the selection area on the second display area.

A window controlling method of a eighth exemplary embodiment is a window controlling method of an information processing apparatus comprising a storing means for storing data to display a plurality of windows and data to display a plurality of selection areas which are respectively corresponded to the plurality of windows, and a display means for including a first display area on which only a predetermined window out of the plurality of windows is displayed or the plurality of windows are displayed in an overlapping manner, and a second display area on which the plurality of selection areas are displayed. The window controlling method includes a detecting step, and a third display controlling step. The detecting step detects an input to a display position of the plurality of selection areas. The third display controlling step displays, when it is determined that a second predetermined input is performed at a display position of a selection area corresponding to a window which is not displayed on the first display area and the second display area or a window a part of which is hidden under the window displayed on a forefront on the first display area by the detecting step, the window corresponding to the selection area on the second display area.

In these information processing programs, storage medium storing an information processing program, and window controlling method, also, it is possible to have an advantage similarly to the above-described information processing apparatus of the first or second exemplary embodiment.

An information processing apparatus of a ninth exemplary embodiment comprises a storing means, a display means, a detecting means, and a first display controlling means. The storing means stores data to display a plurality of windows and data to display a plurality of selection areas which are respectively corresponded to the plurality of windows. The display means includes a first display area on which only a predetermined window out of the plurality of windows is displayed or the plurality of windows are displayed in an overlapping manner, and a second display area on which the plurality of selection areas are displayed. The detecting means detects an input to display positions of the plurality of selection areas. The first display controlling means displays, when a predetermined input is performed within the selection area by the detecting means, the window corresponding to the selection area on the second display area. In the information processing apparatus, similarly to the above-described first or second exemplary embodiment, a predetermined operation is performed on the selection area corresponding to the window displayed on the first display area, the window displayed on the forefront on the first display area, the window which is not displayed on the first display area and the second display area, the window a part of which is hidden under the window displayed on the forefront on the first display area, or the like, and whereby, it is possible to display the window corresponding to the selection area on the second display area, capable of improving operability.

According to certain exemplary embodiments, the plurality of selection areas respectively corresponding to the plurality of windows are displayed on the second display area, and a predetermined input to the display position of the selection area is detected, and therefore, the user performs a predetermined input at a position of the selection area on the second display area by utilizing the input means, for example, to thereby control the corresponding window. More specifically, by performing a predetermined input within the selection area on the second display area, even a window displayed on the first display area or an inactive window can be displayed on the second display area so as to be set to an inputable state, capable of improving operability.

The above described features, aspects and advantages of certain exemplary embodiments will become more apparent from the following detailed description when taken in conjunction with the accompanying drawings.

DETAILED DESCRIPTION

Figure 1:
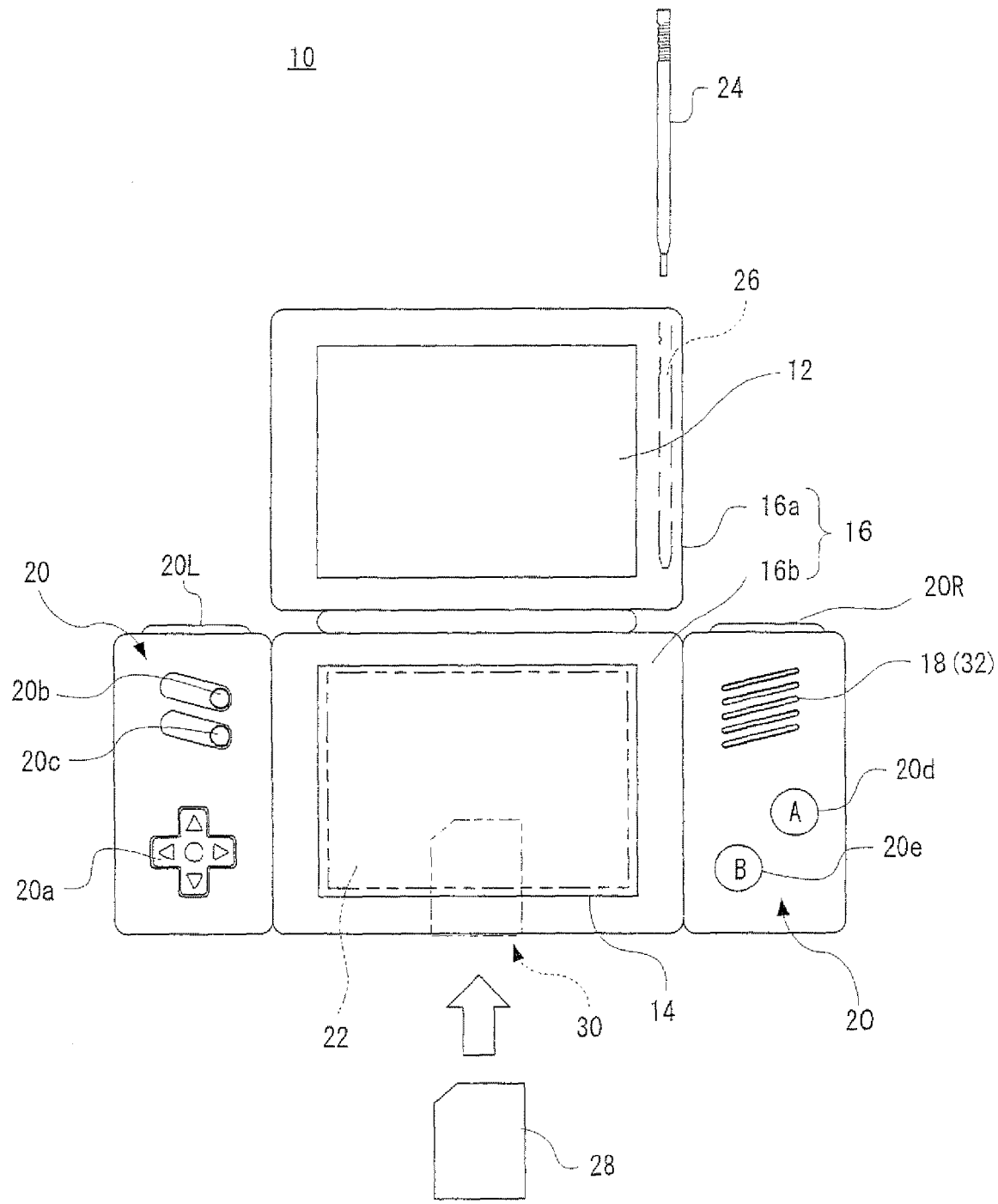
FIG. 1 is an appearance view showing one example of an information processing apparatus of one exemplary embodiment.

Referring to FIG. 1, an information processing apparatus 10 of one exemplary embodiment is realized as a form of a game apparatus as one example. It should be noted that the information processing apparatus 10 may be a personal computer, other hand-held type computers, such as a PDA.

The game apparatus 10 includes a first liquid crystal display (LCD) 12 and a second LCD 14. The LCD 12 and the LCD 14 are provided on a housing 16 so as to be arranged in a predetermined position. In this exemplary embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this exemplary embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound emission hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, or not using an application, for example, if the upper housing 16a is rotated to be folded such that the display surface of the LCD 12 and the display surface of the LCD 14 are face to face with each other, it is possible to prevent the display surface of the LCD 12 and the display surface of the LCD 14 from being damaged, such as a surface flaw, etc. It is should be noted that the upper housing 16a and the lower housing 16b are not rotatably connected with each other, but these are provided in an integrated (fixed) fashion to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switch 20L and the switch 20R are placed in a part of an upper edge (top surface) of the lower housing 16b, and lie of each side of the connected portion with the upper housing 16a.

The direction instructing switch 20a, for example, functions as a digital joystick. This makes it possible to instruct a moving direction of a player character (or player object) to be operated by a player, instruct a moving direction of a cursor, and so forth by operating at least any one of the four depression portions. The start switch 20b is formed of a push button, and is utilized for starting (restarting), temporarily stopping (pausing) a game, and so forth. The select switch 20c is formed of the push button, and utilized for a game mode selection, etc.

The action switch 20d, that is, the A button 20d is formed of the push button, and allows the player character to perform an arbitrary action except for instructing the direction such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button 20e is formed of the push button, and is utilized for changing a game mode selected by the select switch 20c, canceling an action determined by the A button 20d, and so forth.

The action switch 20L (left depression button) and the action switch 20R (right depression button) are formed of the push button, and the left depression button (L button) 20L and the right depression button (R button) 20R can be utilized for the same operation as the A button 20d and the B button 20e, or are also utilized for the subsidiary operation of the A button 20d and the B button 20e.

The touch panel 22 is set on the top surface of the LCD 14. As the touch panel 22, any one of a resistance film system, an optical system (infrared rays system), and an electrostatic capacitive coupling system, for example, can be utilized. Also, when being operated by depressing, stroking (touching) and so forth with a stick 24, a pen (stylus pen), or a finger (hereinafter referred to as "stick 24, etc.") on a top surface thereof, the touch panel 22 detects a coordinates position operated (touched) by the stick 24, etc., and outputs coordinates data corresponding to the detected coordinates. That is, the touch panel 22 functions as an input means in certain exemplary embodiments, and is for allowing a user (player) to input the input data to indicate an arbitrary position on the screen of the LCD 14 (or LCD 12).

It should be noted that in this exemplary embodiment, a resolution of the display surface of the LCD 14 is 256 dots×192 dots (this is true for the LCD 12), and the detection accuracy of the touch panel 22 is also rendered 256 dots×192 dots in correspondence to the resolution of the display surface. It should be noted that in FIG. 1, in order to simplify an understanding of the touch panel 22, the touch panel 22 is shown in a size different from that of the LCD 14, but the size of the display screen of the LCD 14 and the size of the operation panel of the touch panel 22 are the same in size. However, the detection accuracy of the touch panel 22 may be lower than the resolution of the display surface, or higher than it.

In this exemplary embodiment, for example, a screen to be viewed by the player is displayed on the LCD 12, and a screen to be viewed and operated by the player in association with the screen of the LCD 12 is displayed on the LCD 14 with the touch panel 22 thereon. The screen displayed on the LCD 14 includes an object, an icon, a tab, textual information, or the like to be operated (touched) with the stick or the like 24. The player directly touches the object, etc. displayed on the LCD 14 by operating the touch panel 22 with the stick 24, etc., for example to thereby select or operate the object, etc. perform a coordinate input instruction, and so forth. Also, it is possible to perform other various input instructions depending on the kind of the game or application. For example, it is possible to select a command according to texture information, an icon, etc. to be displayed on the display screen of the LCD 14, and instruct a scrolling (gradual movement display) direction of the game screen (map) displayed on the LCD 12, or to input by handwriting.

Thus, the game apparatus 10 has the LCD 12 and the LCD 14 as a display portion of two screens, and the touch panel 22 is provided on either of the display screens (LCD 14 in this exemplary embodiment), and therefore, the game apparatus 10 has the two screens (LCD 12, 14) and the two systems of the operating portions (20, 22).

Furthermore, in this exemplary embodiment, the stick 24 can be inserted into a housing portion (housing slot) 26 provided on a side surface (right side surface) of the upper housing 16a, for example, and taken out therefrom as necessary. It should be noted that in a case of preparing no stick 24, the housing portion 26 needs not to be provided.

Also, the game apparatus 10 includes a memory card (or game cartridge) 28 as an information storage medium. The memory card 28 is detachable, and inserted into a loading slot 30 provided on a rear surface or a lower edge (bottom surface) of the lower housing 16b. Although illustration is omitted in FIG. 1, a connector 46 (see FIG. 2) is provided at a depth portion of the loading slot 30 for connecting a connector (not shown) provided at an end portion of the memory card 28 in the loading direction. Therefore, when the memory card 28 is loaded into the loading slot 30, the connectors are connected with each other, and the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound emission hole 18 inside the lower housing 16b.

Furthermore although omitted in FIG. 1, a battery accommodating box is provided on a rear surface of the lower housing 16b, for example. A power switch, a volume adjustment switch, an external expansion connector, an earphone jack, etc. are provided on a bottom surface of the lower housing 16b.

Figure 2:
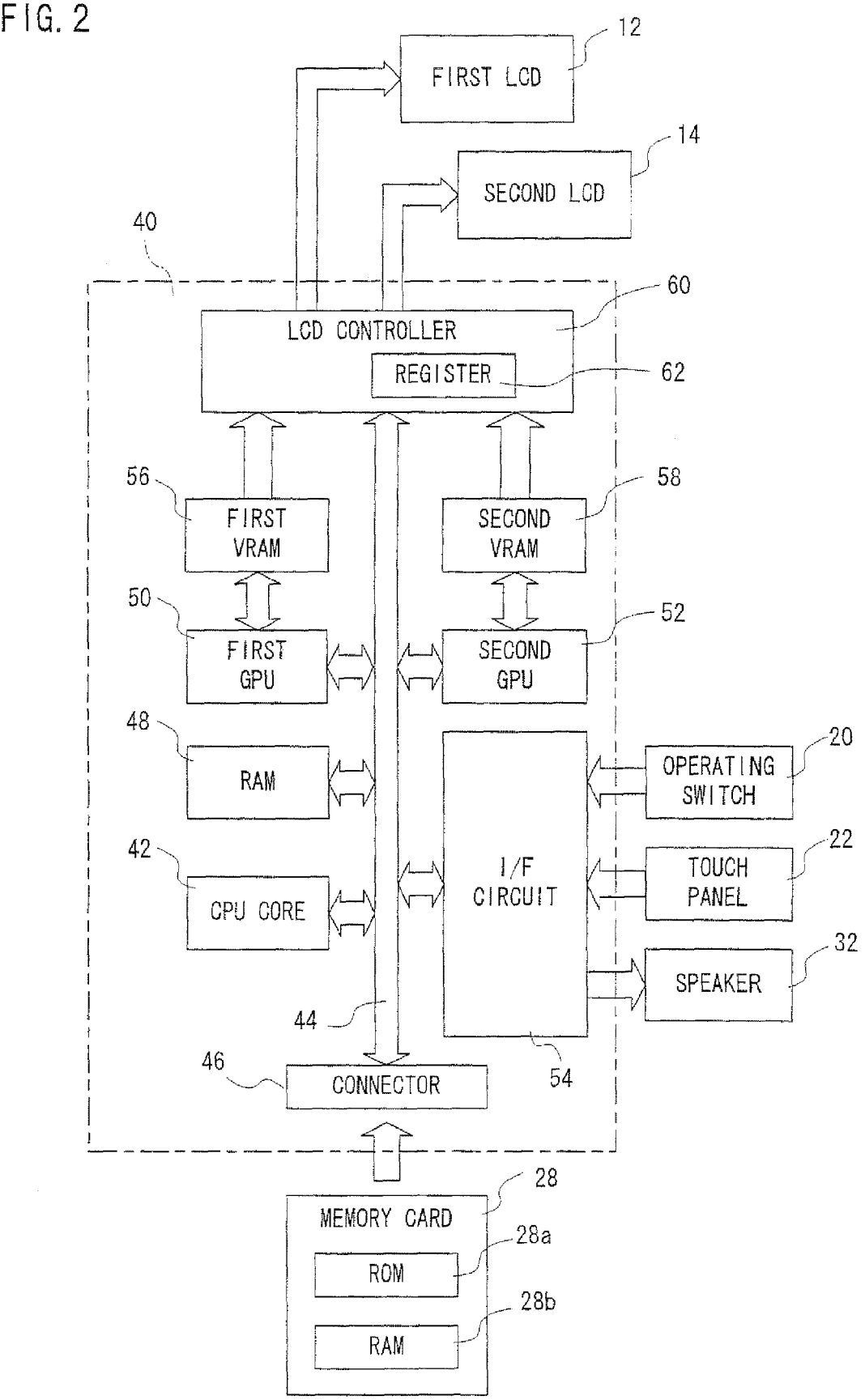
FIG. 2 is a block diagram showing an electric configuration of the information processing apparatus of FIG. 1 exemplary embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as the CPU core 42, etc. is mounted. The CPU core 42 is connected to the connector 46 via a bus 44, and is also connected with a RAM 48, a first Graphics Processing Unit (GPU) 50, a second GPU 52, an input/output interface circuit (hereinafter, referred to as "I/F circuit") 54, and an LCD controller 60.

The connector 46 is detachably connected with the memory card 28 as described above. The memory card 28 includes a ROM 28a and a RAM 28b. Although illustration is omitted, the ROM 28a and the RAM 28b are connected with each other via a bus, and also connected with a connector (not shown) to be connected with the connector 46. Accordingly, as described above, the CPU core 42 gains access to the ROM 28a and the RAM 28b.

The ROM 28a stores in advance an information processing program to cause the game apparatus 10 to function as the information processing apparatus according to certain exemplary embodiments. The information processing program is a program of an application to be executed, and is a game program when a game (virtual game) is executed, for example. Furthermore, an image (character image, background image, item image, message image, etc.) data and sound or music data (sound data), etc. required to execute the application are stored in advance. The RAM (backup RAM) 28b stores (saves) proceeding data, result data of the application, the game, etc.

The RAM 48 is utilized as a buffer memory or a working memory. That is, the CPU core 42 loads the information processing program, the image data, the sound data, etc. stored in the ROM 28a of the memory card 28 into the RAM 48, and executes the loaded information processing program. Furthermore, the CPU core 42 executes the information process while storing in a work area and a predetermined area of the RAM 48 data temporarily produced (generated) in correspondence with progress of the process according to the information processing program.

It should be noted that such the information processing program, the image data, the sound data, etc. are read from the ROM 28a entirely at a time, or partially and sequentially as necessary so as to be stored into the RAM 48.

Each of the GPU 50 and the GPU 52 forms a part of a rendering means, is constructed by, for example, a single chip ASIC, and receives a graphics command (construction command) from the CPU core 42 to generate image data for displaying according to the graphics command. Here, the CPU core 42 applies to each of the GPU 50 and the GPU 52 an image generating program (included in the information processing program) necessary for generating the image data for display in addition to the graphics command.

It should be noted that data (image data: a polygon, a texture, etc.) necessary for executing the graphics command is obtained through the access to the RAM 48 by the GPU 50 or GPU 52. The GPU 50 and the GPU 52 may store the created data in the RAM 48.

Also, the GPU 50 is connected to a first video RAM (hereinafter, referred to as "VRAM") 56, and the GPU 52 is connected to a second VRAM 58. The GPU 50 renders the image data for display in the VRAM 56, and the GPU 52 renders the image data for display in the VRAM 58. The VRAM 56 and the VRAM 58 are a line buffer, for example, or may employ a frame buffer.

The VRAM 56 and the VRAM 58 are connected to the LCD controller 60. The LCD controller 60 includes a register 62. The register 62 is configured with one bit, for example, and stores a value (data value) of "0" or "1" according to an instruction of the CPU core 42. The LCD controller 60 outputs the image data of the VRAM 56 to the LCD 12, and outputs the image data of the VRAM 58 to the LCD 14 in a case that the data value of the register 62 is "0". Furthermore, the LCD controller 60 outputs the image data of the VRAM 56 to the LCD 14, and outputs the image data of the VRAM 58 to the LCD 12 in a case that the data value of the register 62 is "1".

It should be noted that the LCD controller 60 can directly read the image data from the VRAM 56 and the VRAM 58, or read the image data from the VRAM 56 and VRAM 58 via the GPU 50 and GPU 52. Also, the VRAM 56 and the VRAM 58 may be provided in the RAM 48.

The I/F circuit 54 is connected with the operating switch 20, the touch panel 22, and the speaker 32. Here, the operating switch 20 is the above-described switches 20a, 20b, 20c, 20d, 20e, 20L and 20R. When the operating switch 20 is operated, a corresponding operation signal (operation data) is input to the CPU core 42 via the I/F circuit 54. Furthermore, the operation input data (coordinate data) output from the touch panel 22 is input to the CPU core 42 via the I/F circuit 54. In addition, the CPU core 42 reads the sound data necessary for the game, such as a game music (BGM), a sound effect, voices (onomatopoeic sound) of the game character, etc. from the RAM 48, and outputs the sound from the speaker 32 via the I/F circuit 54.

Figures 3, 4:
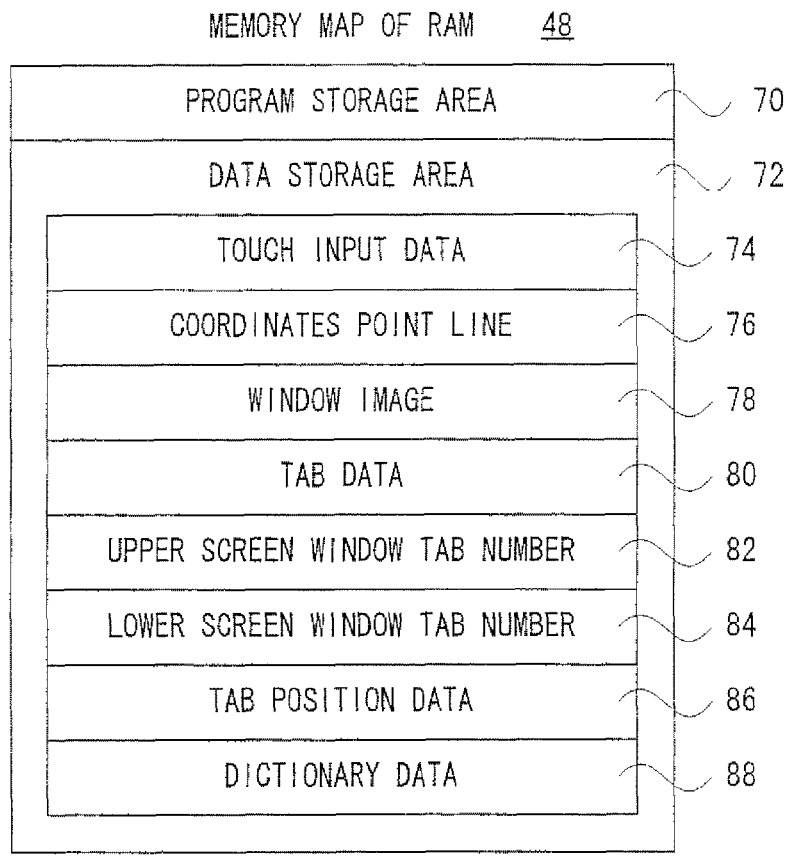
FIG. 3 is an illustrative view showing one example of a memory map of a RAM 48 shown in FIG. 2.
FIG. 4 is an illustrative view showing one example of a content of a window image storing area.

FIG. 3 shows one example of a memory map of the RAM 48. The memory map includes a program storage area 70 and a data storage area 72. In the program storage area 70, an information processing program is loaded from the ROM 28a of the memory card 28. The CPU core 42 operates according to the information processing program, and causes the game apparatus 10 to function as the information processing apparatus 10 according to certain exemplary embodiments.

In the data storage area 72, data of the ROM 28a and data generated or obtained according to an operation of the CPU core 42 are stored. The data storage area 72 includes a touch input data storing area 74, a coordinates point line storing area 76, a window image storing area 78, a tab data storing area 80, an upper screen window tab number storing area 82, a lower screen window tab number storing area 84, a tab position data storing area 86, a dictionary data storing area 88, etc. It should be noted that data to be stored is partly shown in FIG. 3, but other data required for an image processing is also stored.

In the touch input data storing area 74, touch input data obtained from the touch panel 22 via the I/F circuit 54 is stored. More specifically, coordinates data indicative of an instructed position by the operation via the touch panel 22 detected from the obtained data is stored. In this storage area 74, the coordinates data of the predetermined number of frames (one frame is equal to 1/60 second) is stored.

In the coordinates point line storing area 76, a history of the coordinates data detected when a handwriting input is performed on an input window, that is, an input coordinates point line or track is stored. The input window is a window to which a user input a word by handwriting with the stick 24, etc. when the word is searched in a dictionary application of the certain exemplary embodiments. The recognition of the character input by handwriting is performed on the basis of the coordinates point line data.

In the window image storing area 78, data relating to the window image is stored. For example, as shown in FIG. 4, each window image data is stored in correspondence to the data indicative of an initial address of the data. Each window is displayed on the basis of the data in the window image storing area 78. In FIG. 4, an input window image, a search candidate window image, a mineral water window image, a mineral salts window image as one example of the dictionary window image, etc. are stored.

Figures 5, 6:
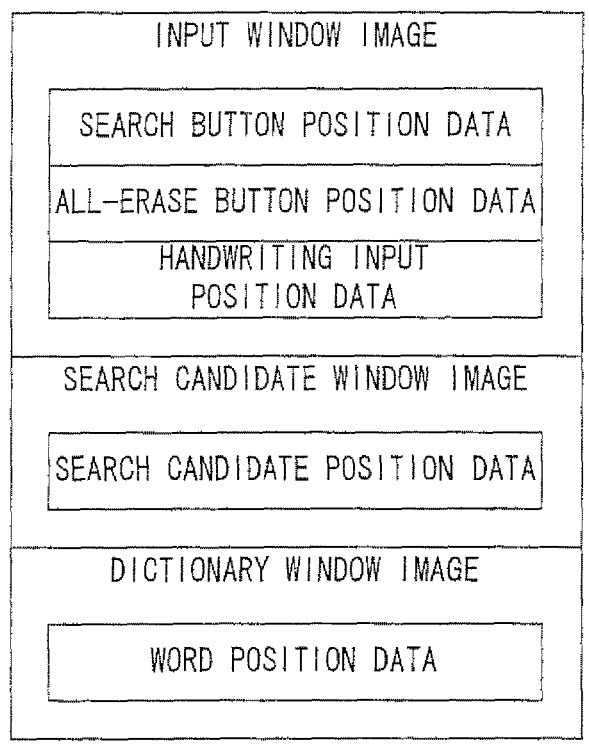
FIG. 5 is an illustrative view showing one example of a content of window image data.
FIG. 6 is an illustrative view showing one example of a content of a tag data storing area.

As shown in FIG. 5, the input window image data includes position data indicative of a display position or area of a search button, an all-erase button, and a handwriting input area within the input window. Also included are image data for each button and input area, and image data based on the input coordinates point line when a handwriting input is performed. It should be noted that data for displaying an initial state of the window is stored in advance in the ROM 28a.

The search candidate window is a window for displaying a word (dictionary item or entry word) matched with the character input in the input window as a search candidate. In a case that a plurality of search candidate windows are generated, a plurality of pieces of search candidate window image data are stored. The search candidate window image data includes image data for each search candidate, and position data (coordinates data) indicative of a display position or range (area) of each search candidate.

The dictionary window is a window for displaying an interpretation or explanation of reading, meaning, derivation, examples, etc. as to an item selected via the search candidate window. If the plurality of dictionary windows are generated, the plurality of pieces of dictionary window image data are stored. The dictionary window image data includes position data indicative of the display position, range, or the like of each word utilized in the interpretation along with the image data of the interpretation or explanation.

Returning to FIG. 3, in the tab data storing area 80, data relating to tabs each corresponding to the search candidate window and the dictionary window are stored. The tab is generated when a window is generated and displayed on the LCD 14. The tab is an image for selecting a corresponding window. That is, a touch operation of a display position or area of the tab allows selection of a corresponding window. It should be noted that in this exemplary embodiment, the input window is a special window to be displayed on the lower screen in an initial state, and is not provided with a tab corresponding to the input window.

As shown in FIG. 6, in the tab data storing area, a title image data, a window image of an initial address, etc. are stored in correspondence with the tab number. The tab number is numbered consecutively from 1, for example, every time that window is generated anew. Also, when a window is erased, the tab numbers of the rest of the windows are updated to be numbered consecutively. The tab and the window are one to one correspondence, and the tab number is an identification number of the tab, and corresponds to an identification number of the window. The title image data is image data for displaying a name of the tab in the tab. In FIG. 6 example, the tab number 1 is a tab corresponding to the search candidate window, and stores image data representing the word by characters as the title image data. The tab number 2 is a tab corresponding to the dictionary window of a word called mineral water, and stores image data representing the word by characters as the title image data. The tab number 3 is a tab corresponding to the dictionary window of a word called mineral salts, and stories image data representing a search candidate by characters as the title image data. The title image data of each word is obtained from the dictionary data. It should be noted that the title image data of the search candidate may be stored in the ROM 28a in advance. Also, the data indicative of an initial address of the window image is an initial address of the window image data corresponding to the tab, and on the basis of the data, the window corresponding to the tab can be specified.

Returning to FIG. 3, in the upper screen window tab number storing area 82, a tab number of the tab corresponding to the window displayed on the upper screen, that is, the LCD 12 in an active state is stored. In this exemplary embodiment, on the LCD 12, only the window in active state is displayed, and the window in inactive state is not displayed. Furthermore, on the LCD 12 of this exemplary embodiment, the touch panel 22 as an input means is not provided, and therefore, the active state of the upper screen means that the window is displayed on the forefront. It should be noted that 0 (zero), NULL, or the like, for example, is stored as an initial value, and in this case, a window is not displayed on the LCD 12, and a background image is displayed.

In the lower screen window tab number storing area 84, a tab number of the tab corresponding to the window to be displayed on the lower screen, that is, the LCD 14 is stored. In this exemplary embodiment, on the LCD 14, only the active window is displayed, and the inactive window is not displayed. In addition, the touch panel 22 as an input means is provided on the LCD 14, and therefore, the active state on the lower screen means that the window is displayed on the forefront, and is set to a state such that an input or an operation by the touch panel 22 can be made. It should be noted that 0 (zero) or NULL, or the like, for example, is stored as an initial value, and in this case, an input window is displayed on the LCD 14.

In the tab position data storing area 86, position data (coordinates data) indicative of the display position or range, etc. of the generated tab is stored. With reference to the data in the storage area 86, the tab selected by the user can be specified. It should be noted that the display position or range, and etc. of the tab may be fixedly decided in advance depending on the number of tabs, for example, or may be set as necessary depending on the number of generated tabs, the number of characters on the title image or the like.

Additionally, the number of displayable tabs (that is, the number of generable windows) may be restricted to a predetermined number. In this case, when the window will be generated equal to or more than a limit value, a message, "Unable to generate window due to a lot of windows" may be displayed. The more the number of tabs is, the smaller the display area (width) of the tab is, and the smaller the number of characters of the title displayed on the tab is. Therefore, if the characters of the title do not fit in the tab, for example, the title can be displayed by applying an elision mark (" . . . ", etc.) to the first several characters in the title.

In the dictionary data storing area 88, dictionary data for the dictionary application in this exemplary embodiment is stored. In the dictionary data, each data (text data, etc.) of reading, explanation, etc. is stored by being corresponded with each word (item).

In the information processing apparatus 10, a window control is performed among a plurality of display areas (tow screens of the LCD 12 and the LCD 14 in this exemplary embodiment) by a user making a window control. In this exemplary embodiment, a description is made on a case that a window control is applied to the execution of a dictionary application as one example. It should be noted that this may be applied, when a plurality of applications are simultaneously activated, to control windows respectively corresponding to the applications.

Figure 7:
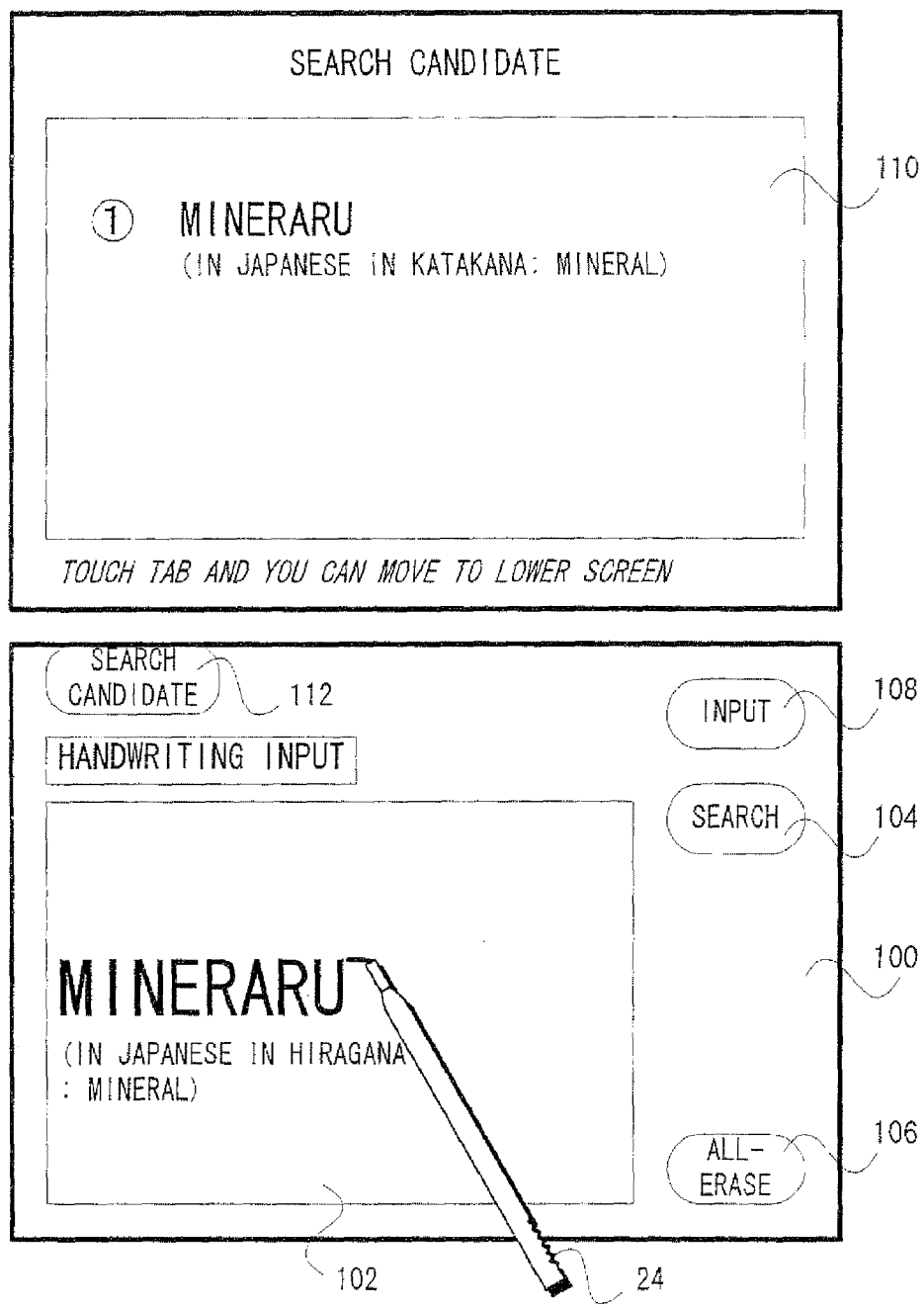
FIG. 7 is an illustrative view showing one example of a display screen in a case that a character is input by handwriting on an input window to generate a search candidate window.

FIG. 7 shows one example of the display screen when a character to be searched with a dictionary is input. On the lower screen displayed on the LCD 14, an input window 100 is displayed in an active state. On the other hand, on the upper screen displayed on the LCD 12, a background image is displayed in an initial state.

On the input window, a character input area 102, a search button 104, and an all-erase button 106 are provided in predetermined positions. The character input area 102 is an area for allowing a user to manually input the word which the user wants to search by utilizing the stick 24, etc. The touch input data to the character input area 102 is stored in the coordinates point line storing area 76. In the character input area 102, pixels corresponding to the position touched by the user, that is, the stored coordinates points line is drawn by a color different from that of the character input area 102. In FIG. 7, "mineraru" (in Japanese in hiragana: mineral) is input. The search button 104 is for instructing search of the input character. The all-erase button 106 is a button for erasing the characters input and drawn in the character input area 102.

It should be noted that the window generally means a specific display area divided by a frame, but in FIG. 7, the line denoting the frame is omitted in the input window 100. Also, the frame of the window need not be displayed on the screen necessarily.

Furthermore, an input button 108 is formed in a predetermined position on the lower screen. The input button 108 is for displaying the input window 100 on the forefront of the lower screen, that is, making it in an active state.

When a character is input to the character input area 102 of the input window 100, and a next character is started to be input, the character which has been input at that time is automatically recognized. For example, if no input is kept for a fixed period of time (after a lapse of the fixed period of time from the detection of the touch-off without detecting a touch-on), it is determined that a next character input is present.

Then, a search candidate window 110 for displaying a search candidate corresponding to recognition result is displayed on the upper screen in an active state. In FIG. 7, the word "mineraru" (in Japanese in katakana: mineral) is searched from the dictionary data as a search candidate, and displayed within the search candidate window 100. Also, the tab 112 corresponding to the generated search candidate window 110 is displayed above the input window 100, for example, on the lower screen. The user can select the search candidate window 110 by performing a predetermined operation on the tab 112 displaying the title "search candidate" with the stick 24, etc. It should be noted that on the upper screen, at the center of the upper edge portion of the background image, the character "search candidate" indicative of display of the search candidate window 110 is displayed, and at the lower edge portion of the background image, a message, "touch tab and you can move to lower screen", for example, is displayed.

More specifically, when it is determined a next character input is present, character recognition is performed from the recorded coordinates point line, and a word corresponding to the recognition result is searched from the dictionary data. Then, search candidate window image data (see FIG. 4 and FIG. 5) including the word of the search candidate is generated. Also, tab data (see FIG. 6) and tab position data of the tab 112 corresponding to the generated search candidate window 110 is generated. Then, in the upper screen window tab number storing area 82, a tab number of the tab corresponding to the generated search candidate window 110 is stored. Thus, on the upper screen, the search candidate window 110 is displayed, and on the lower screen, the tab 112 of the search candidate is displayed along with the input window 100, etc.

Figure 8:
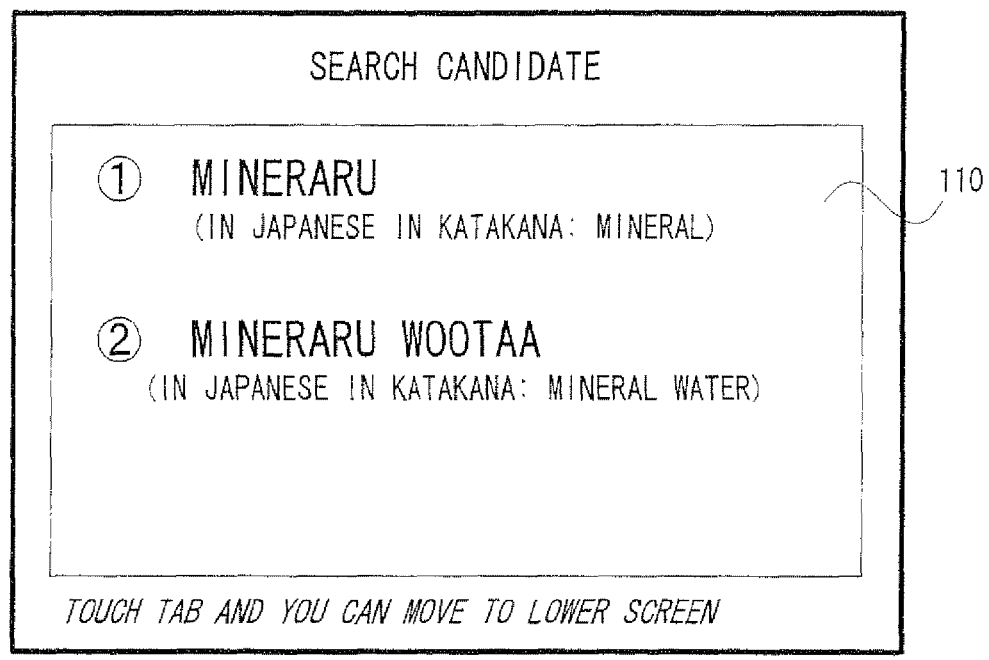
FIG. 8 is an illustrative view showing one example of a display screen in a case that the character input is completed in FIG. 7, and a search button is then selected to thereby generate a search candidate window.
Figure 8:
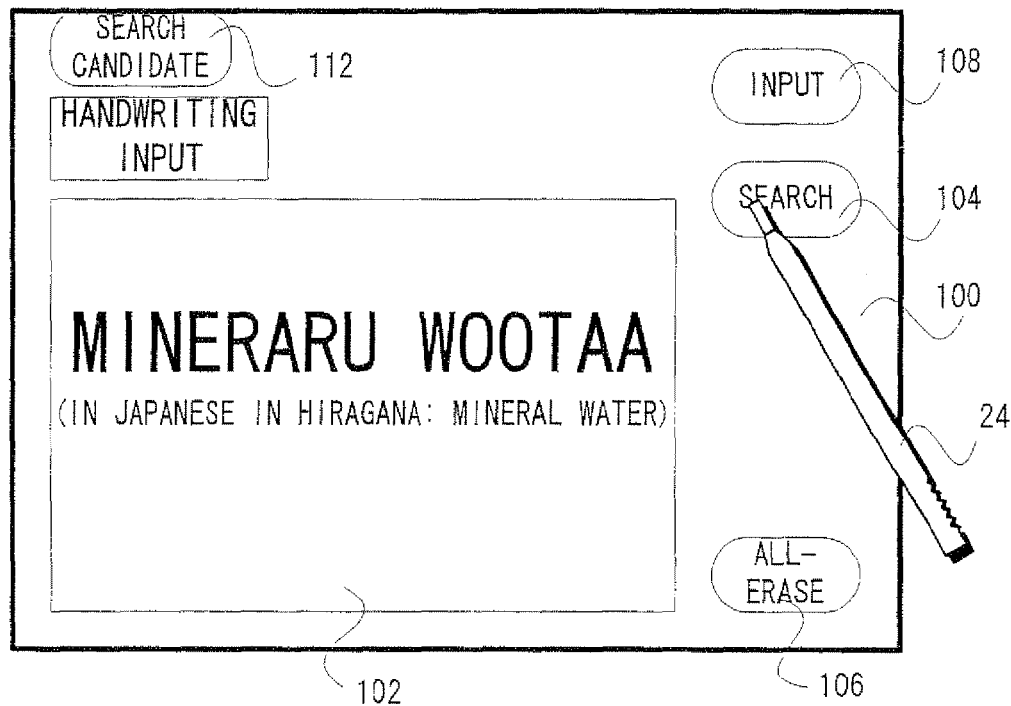

FIG. 8 shows one example of the display screen when the character input is completed after FIG. 7, and the search button 104 is then selected. When the search button 104 is selected, character recognition of the input character is started, and a search candidate corresponding to the result is displayed in the search candidate window 110. In FIG. 8, "mineraru wootaa" (in Japanese in hiragana: mineral water) is input and the search button 104 is then selected, and therefore, the search candidate window 110 to which the word "mineraru wootaa" (in Japanese in katakana: mineral water) is added as a search candidate is generated, and displayed in an active state on the upper screen.

Figure 9:
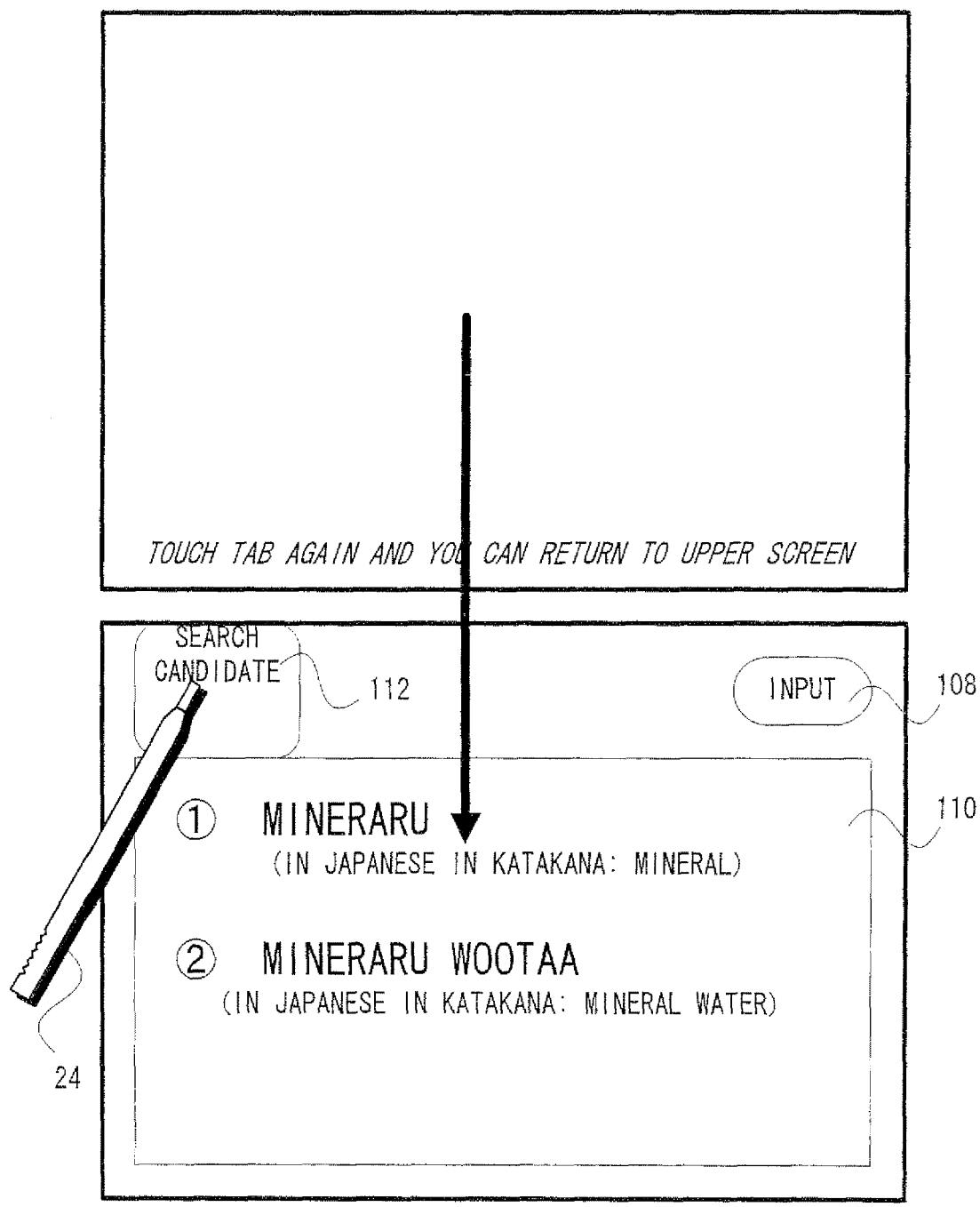
FIG. 9 is an illustrative view showing one example of a display screen in a case that a tab corresponding to the search candidate window is selected in FIG. 8.

FIG. 9 shows one example of the display screen in a case that the tab 112 of the search candidate is selected in FIG. 8. In a case that the search candidate window 110 is displayed in an active state on the upper screen, when the tab 112 of the search candidate is selected with the stick 24, etc., the search candidate window 110 is displayed in an active state on the lower screen. More specifically, when it is determined that a display position of the tab 112 of the search candidate is instructed with one click, for example, on the basis of the detected touch input data, the tab number of the tab 112 of the search candidate is stored in the lower screen window tab number storing area 84, and the corresponding search candidate window 110 is thus displayed on the lower screen.

It should be noted that the tab 112 corresponding to the search candidate window 110 is displayed in a manner different in size, color, etc. from a case the lower screen is hidden. This shows that a corresponding window is displayed on the lower screen in an active state. In FIG. 9 example, the tab 112 is made large in size, and the tab 112 is displayed so as to be brought into contact with the search candidate window 110.

On the other hand, on the upper screen, an inactive window is absent, and therefore, the upper screen window tab number storing area 82 is cleared, and a background image including a message, "touch tab again, and you can return to upper screen", for example, is displayed.

When the search candidate window 110 is displayed on the lower screen, an input or an operation via the touch panel 22 is possible with respect to the search candidate window 110. In this exemplary embodiment, by touching the word of the search candidate in the search candidate window 110 with the stick 24, etc., it is possible to search the word. Accordingly, in a case that the user wants to operate the search candidate window 110, the tab 112 corresponding to the search candidate window 110 is merely selected.

Figure 10:
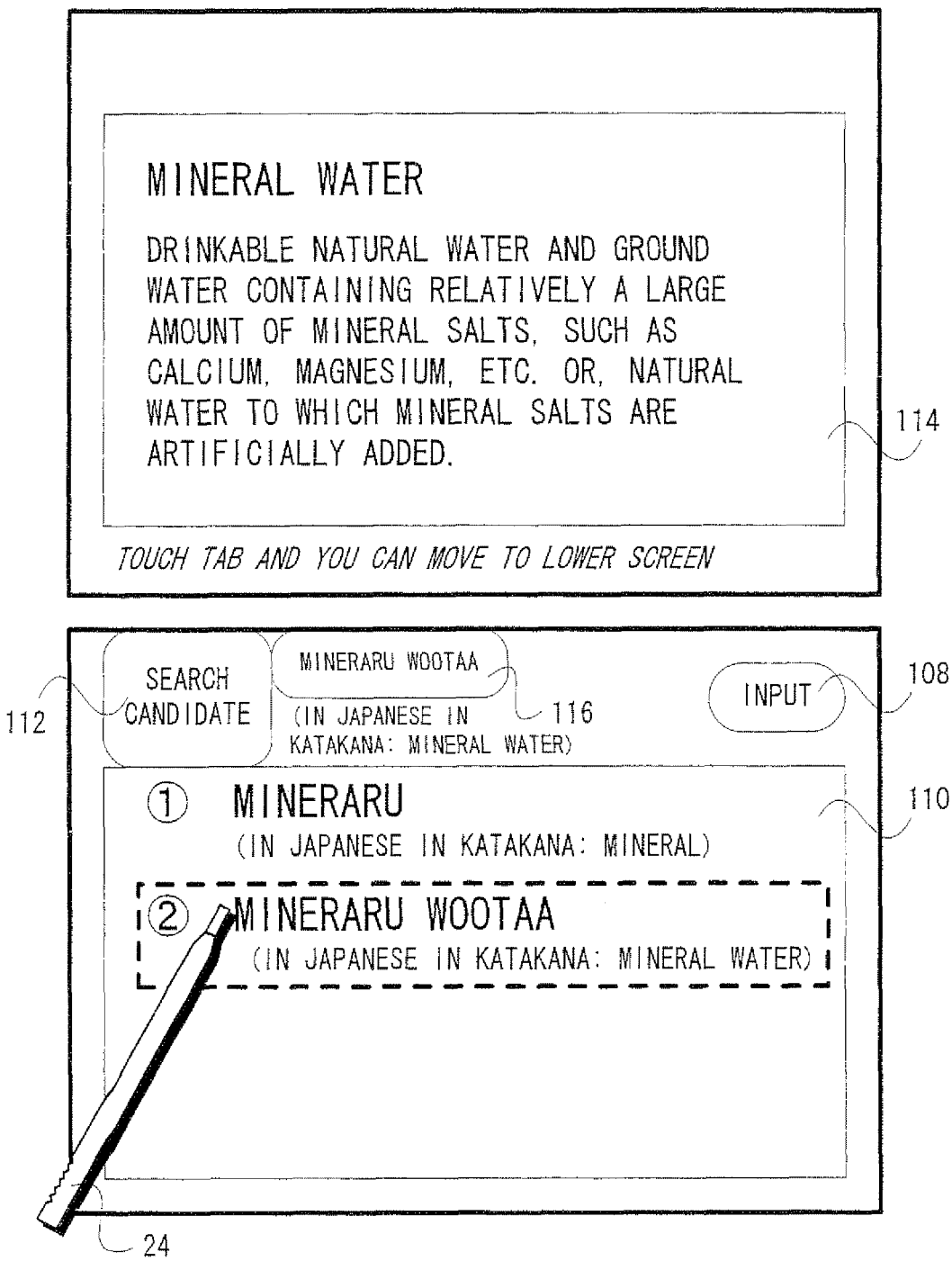
FIG. 10 is an illustrative view showing one example of a display screen in a case that a word of the search candidate window is selected to generate a dictionary window in FIG. 9.

FIG. 10 shows one example of the display screen in a case that a word of the search candidate window 110 is selected in FIG. 9. When a word is selected in the search candidate window 110, a dictionary window 114 displaying an interpretation or explanation of the word is displayed on upper screen in an active state. In FIG. 10, since the "mineraru wootaa" is selected, the dictionary window 114 including an interpretation of the "Mineral water", such as "drinkable natural water, and ground water containing relatively a large amount of mineral salts, such as calcium, magnesium, etc., or natural water to which mineral salts are artificially added" is displayed. It should be noted that a message, "touch tab, and you can move to lower screen" is displayed again on the background image of the upper screen. On the other hand, a tab 116 corresponding to the generated dictionary window 114 is displayed on the lower screen. In FIG. 10, the tab 116 corresponds to the dictionary window 114 of the word "mineraru wootaa", and therefore, the title of the "mineraru wootaa" is displayed on the tab 116.

More specifically, when it is determined that the word of the search candidate is selected on the basis of the touch input data and the search candidate position data, the dictionary window image data (see FIG. 4 and FIG. 5) including an explanation of the word is generated on the basis of the dictionary data. Furthermore, the tab data (see FIG. 6) and the tab position data to which data relating to the tab 116 corresponding to the generated dictionary window 114 is added are generated. Then, in the upper screen window tab number storing area 82, a number of the tab corresponding to the generated dictionary window 114 is stored. Thus, the dictionary window 114 is displayed on the upper screen, and the tab 116 of the mineral water in addition to the search candidate window 110, the tab 112 of the search candidate, etc. are displayed on the lower screen.

Figure 11:
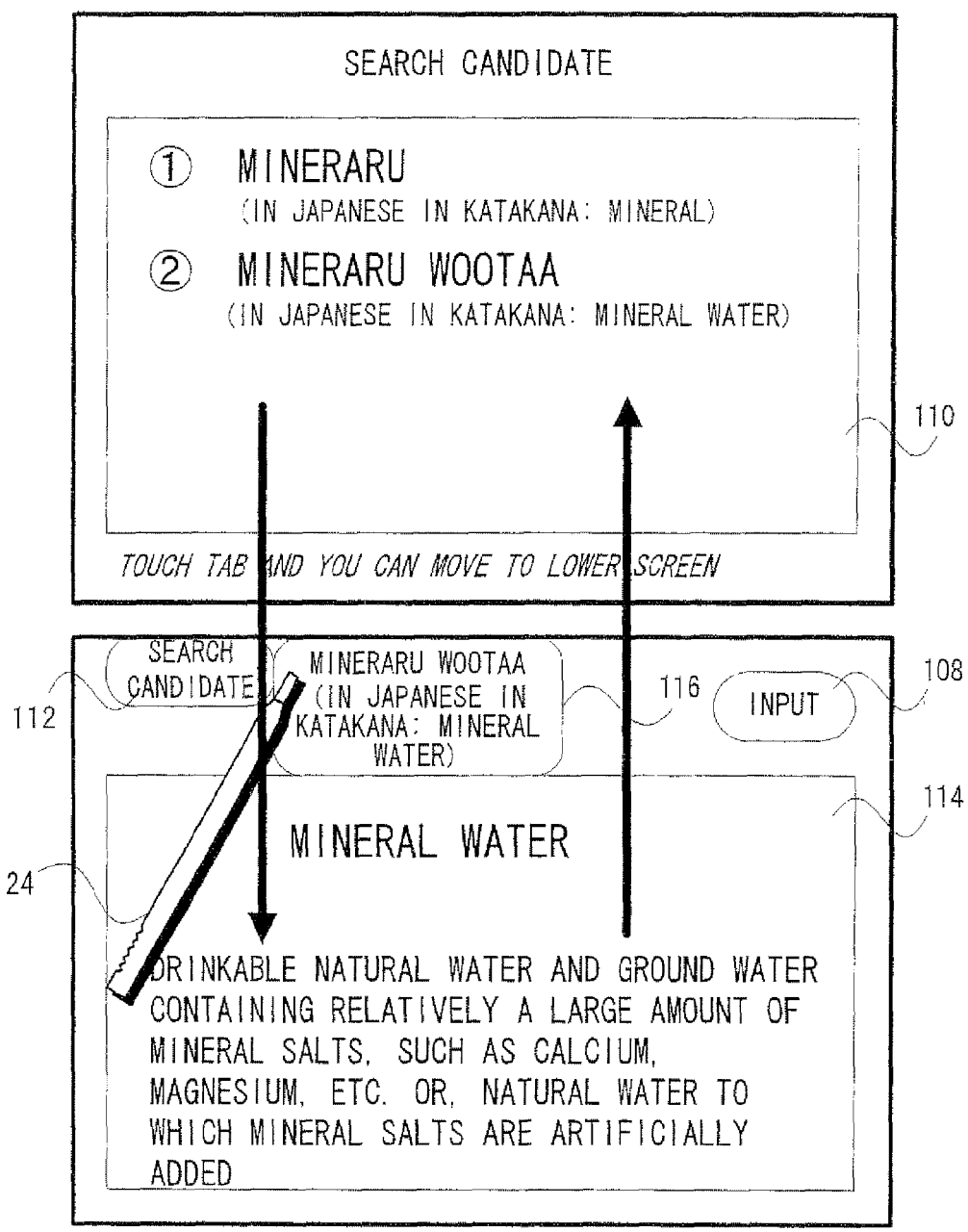
FIG. 11 is an illustrative view showing one example of a display screen in a case that a tab corresponding to the dictionary window is selected in FIG. 10.

FIG. 11 shows one example of the display screen in a case that the tab 116 corresponding to the dictionary window 114 is selected in FIG. 10. In a case that the dictionary window 114 is displayed on the upper screen in an active state, and the search candidate window 110 is displayed on the lower screen in an active state, if the tab 116 corresponding to the dictionary window 114 is selected, the windows are switched between the upper screen and the lower screen. That is, the search candidate window 110 is displayed on the upper screen in an active state, and the selected dictionary window 114 is displayed in an active state on the lower screen. Also, the tab 116 corresponding to the selected dictionary window 116 is displayed with a form indicative of an active state.

Figure 12:
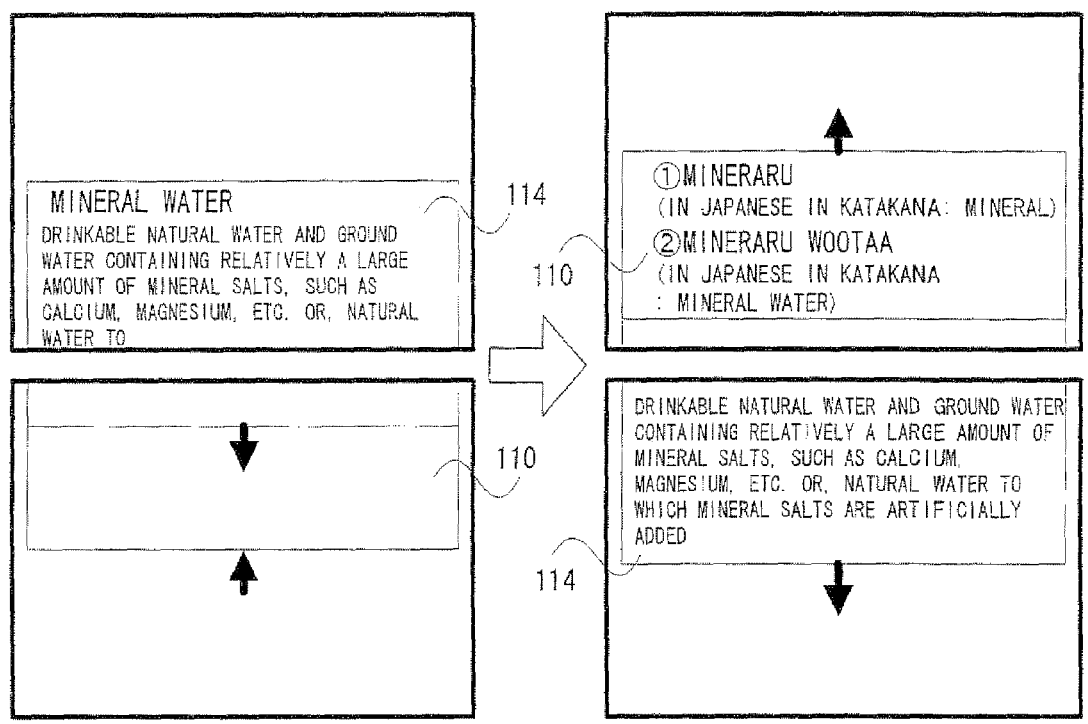
FIG. 12 is an illustrative view showing a manner in which the dictionary window and the search candidate window are switched in a case that the tab corresponding to the dictionary window is selected in FIG. 10.

It should be noted that if the windows in the active state are switched between the upper and lower screens, the window may be displayed so as to gradually move to a next display position as shown in FIG. 12. FIG. 12 shows that dictionary window 114 on the upper screen is gradually moved to the display position on the lower screen, and the search candidate window 110 on the lower screen is gradually moved to the display position on the upper screen. In a case that the windows are overlapped with each other, any one of the windows (window which was in an active state on the upper screen in this exemplary embodiment) is displayed on the forefront. Also, in a case that the selected window is moved from the upper screen to the lower screen (see FIG. 9), or if it is moved from the lower screen to the upper screen (see FIG. 13), the window may similarly be displayed so as to be gradually moved to a next display position. By producing such a gradually movement, it is possible to make the user feel as if the window actually moves between the upper and lower screens.

When the dictionary window 114 is displayed in an active state on the lower screen as shown in FIG. 11, an input or an operation to the dictionary window 114 via the touch panel 22 becomes possible. In this exemplary embodiment, by touching the word in the explanation within the dictionary window 114 with the stick 24, etc., it is possible to search the word. Accordingly, if the user wants to operate the dictionary window 114, the tab 116 corresponding to dictionary window 114 is merely selected in FIG. 10.

Figure 13:
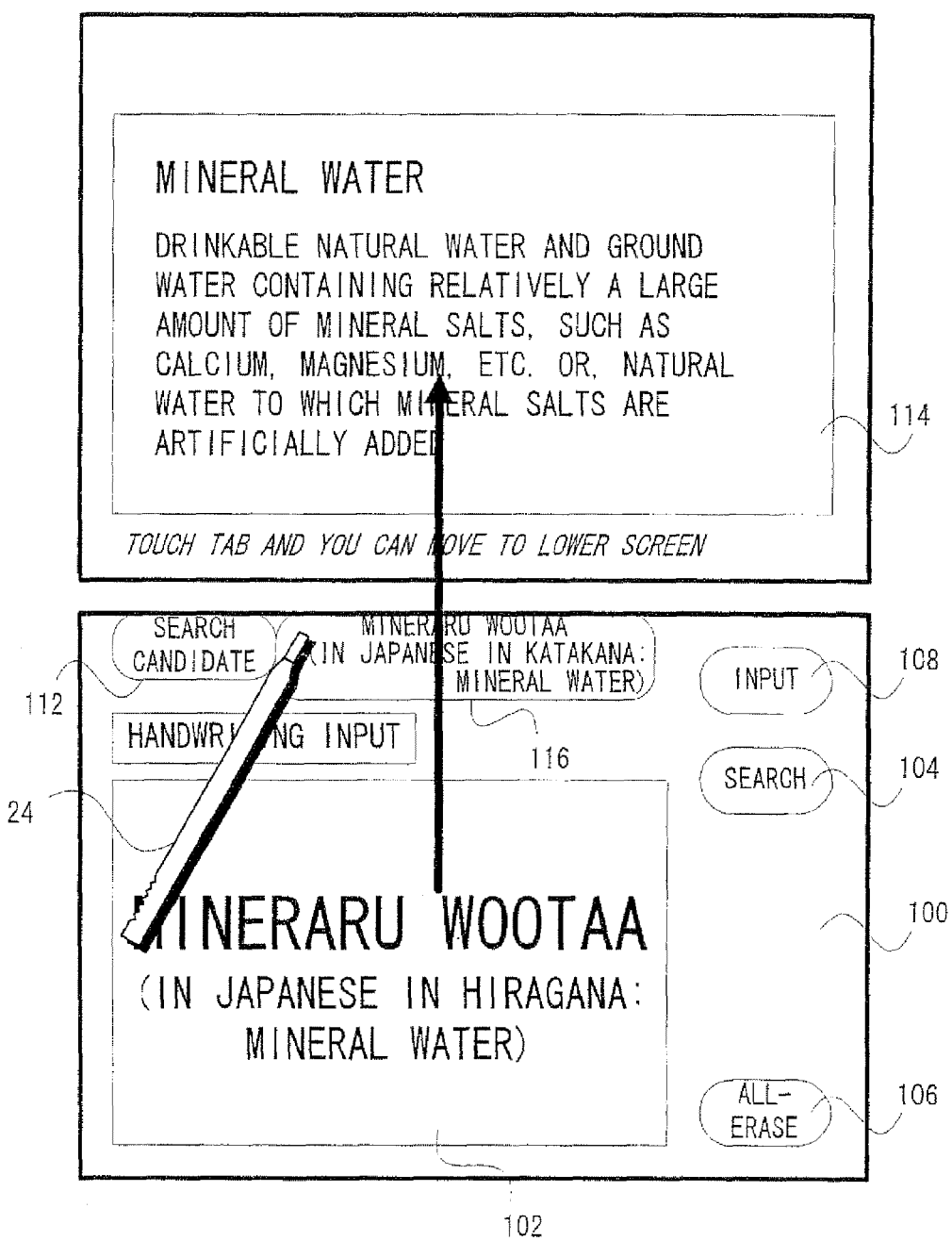
FIG. 13 is an illustrative view showing one example of a display screen in a case that the tab corresponding to the dictionary window is selected in FIG. 11.

It should be noted that in a case that the tab 116 corresponding to the dictionary window 114 displayed on the lower screen in an active state is selected in FIG. 11, the dictionary window 114 is displayed on the upper screen as shown in FIG. 13. The search candidate window 110 which was displayed on the upper screen is set to an inactive state. Furthermore, the input window 100 is displayed on the lower screen.

Figure 14:
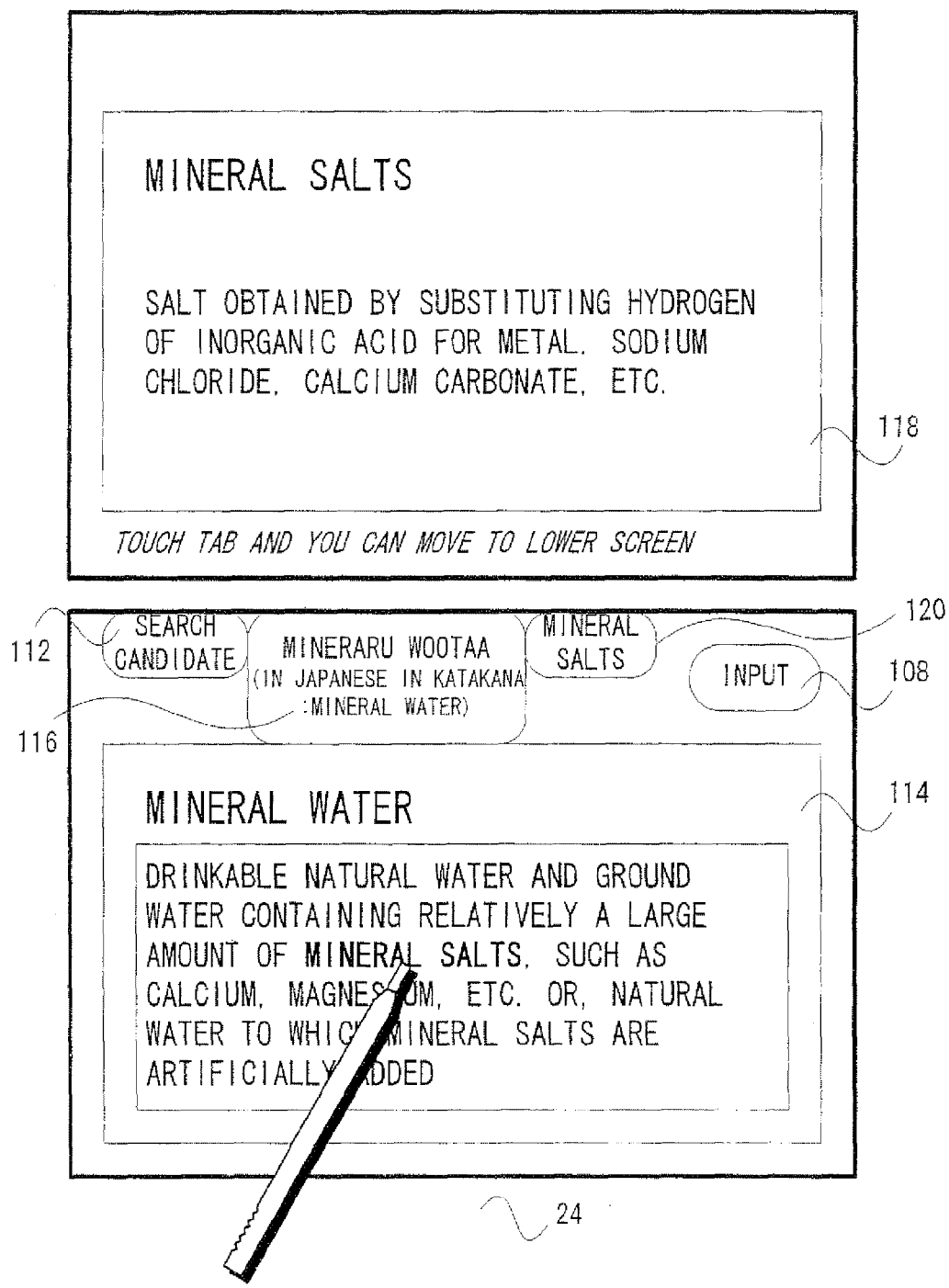
FIG. 14 is an illustrative view showing one example of the display screen in a case that a word in the dictionary window is selected in FIG. 11 to generate another dictionary window.

FIG. 14 shows one example of the display screen in a case that the word in the dictionary window 114 is selected in FIG. 11. When a word in the explanation of the dictionary window 114 is selected with the stick 24, etc., the dictionary window 118 of the word is displayed on the upper screen in an active state. It should be noted that the search candidate window 110 which was displayed on the upper screen is set to an inactive state. In FIG. 14, the word "mineral salts" is selected, and therefore, the dictionary window 118 including the explanation of the "mineral salts", such as "Salt obtained by substituting the hydrogen of inorganic acid for metal. Sodium chloride, calcium carbonate, etc." is generated. On the other hand, the tab 120 corresponding to the generated dictionary window 118 is displayed on the lower screen. In FIG. 14, the tab 120 corresponds to the dictionary window 118 of the word "mineral salts", and therefore, the title "mineral salts" is displayed on the tab 120.

More specifically, when it is determined that the word in the explanation is selected on the basis of the touch input data and the word position data, the dictionary window image data (see FIG. 4 and FIG. 5) including an interpretation or explanation of the word is generated on the basis of the dictionary data. Also, the tab data (see FIG. 6) and the tab position data to which the data relating to the tab 120 corresponding to the generated dictionary window 118 is added are generated. Then, in the upper screen window tab number storing area 82, the tab number corresponding to the generated dictionary window 118 is stored. Thus, on the upper screen, the dictionary window 118 is displayed, and on the lower screen, the tab 120 of the mineral salts is displayed in addition to the dictionary window 114, the tab 112 of the search candidate, the tab 116 of the mineral water, etc.

Figure 15:
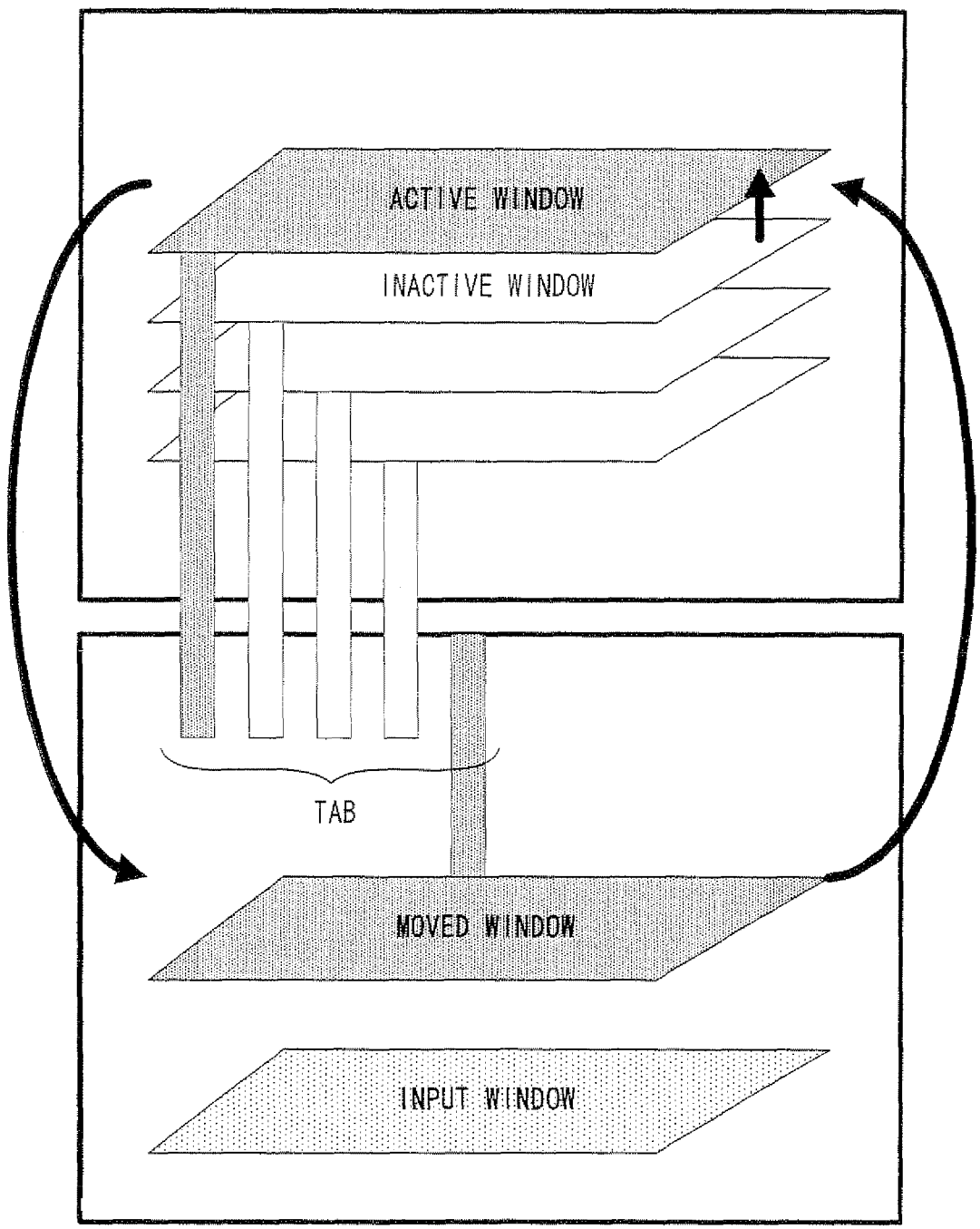
FIG. 15 is an illustrative view showing a concept of a window control in the information processing apparatus of FIG. 1 exemplary embodiment.

In FIG. 15, a concept of the window control in the exemplary embodiment is illustrated. On the upper screen (first display area or first display portion), a plurality of windows are created. On the upper screen, only one window is set to an active state (that is, displayed), and other windows are set to an inactive state. It should be noted that in this exemplary embodiment, only the window in the active state is displayed on the screen, and the window in the inactive state is not displayed on the screen. The window to be displayed is a predetermined window on the forefront in depth, for example.

On the other hand, to the lower screen (second display area or second display portion) to which a position can be input and specified by a pointing device, such as a touch panel 22, a tab corresponding to each window is provided. It should be noted that the input window is a default window on the lower screen, and is not moved to the upper screen, and therefore the corresponding tab is not provided thereto.

The tab is a selection area for selecting a corresponding window. By performing a predetermined input operation on the tab by utilizing a pointing device, the user can select a corresponding window, and control the movement and the display, etc. of the window. It should be noted that although in this exemplary embodiment, the selection area is displayed by utilizing a tab being connected to the window in order to simplify an understanding of the correspondence, this may be a button, an icon, or the like.

When the tab corresponding to the active window on the upper screen is selected, the selected window is moved to the lower screen so as to be displayed. The window moved to the lower screen is represented as a moved window. As to the lower screen, in a case that the moved window is present, the moved window is displayed in an active state, and in case that the moved window is absent, the input window is displayed in an active state. In a case that the window is moved from the upper screen to the lower screen, when another moved window has already been displayed on the lower screen, this window is moved to the upper screen, and displayed as an active window on the upper screen. On the other hand, in a case that the window is moved from the upper screen to the lower screen, when the input window is being displayed on the lower screen, the window corresponding to the highest tab number out of the inactive windows is displayed on the upper screen in an active state. That is, the window generated last is displayed.

In addition, in a case that the tab corresponding to the inactive window is selected, a different control is performed according to an operation. When the tab is selected with a one-click operation, for example, the selected window is displayed on the upper screen in the active state. On the other hand, when the tab is selected with a two-click operation, for example, the selected window is displayed on the lower screen in the active state.

Also, when the tab corresponding to the moved window on the lower screen is selected, the selected window is moved to the upper screen, and displayed in the active state. Thus, in a case that no window to be displayed on the lower screen is present, an input window as a basic input window is displayed on the lower screen. Accordingly, in a case of no window to be displayed on the lower screen out of the plurality of windows, the input window is displayed on the lower screen. This makes it possible to prompt the user to input, and to correspond to an input operation required for the progress of the application, etc. Furthermore, this makes it possible for the user to smoothly perform an input operation without inhibiting an input operation by the user.

FIG. 16 to FIG. 19 specifically show an outline of the window control according to such a tab selection.

Figure 16:
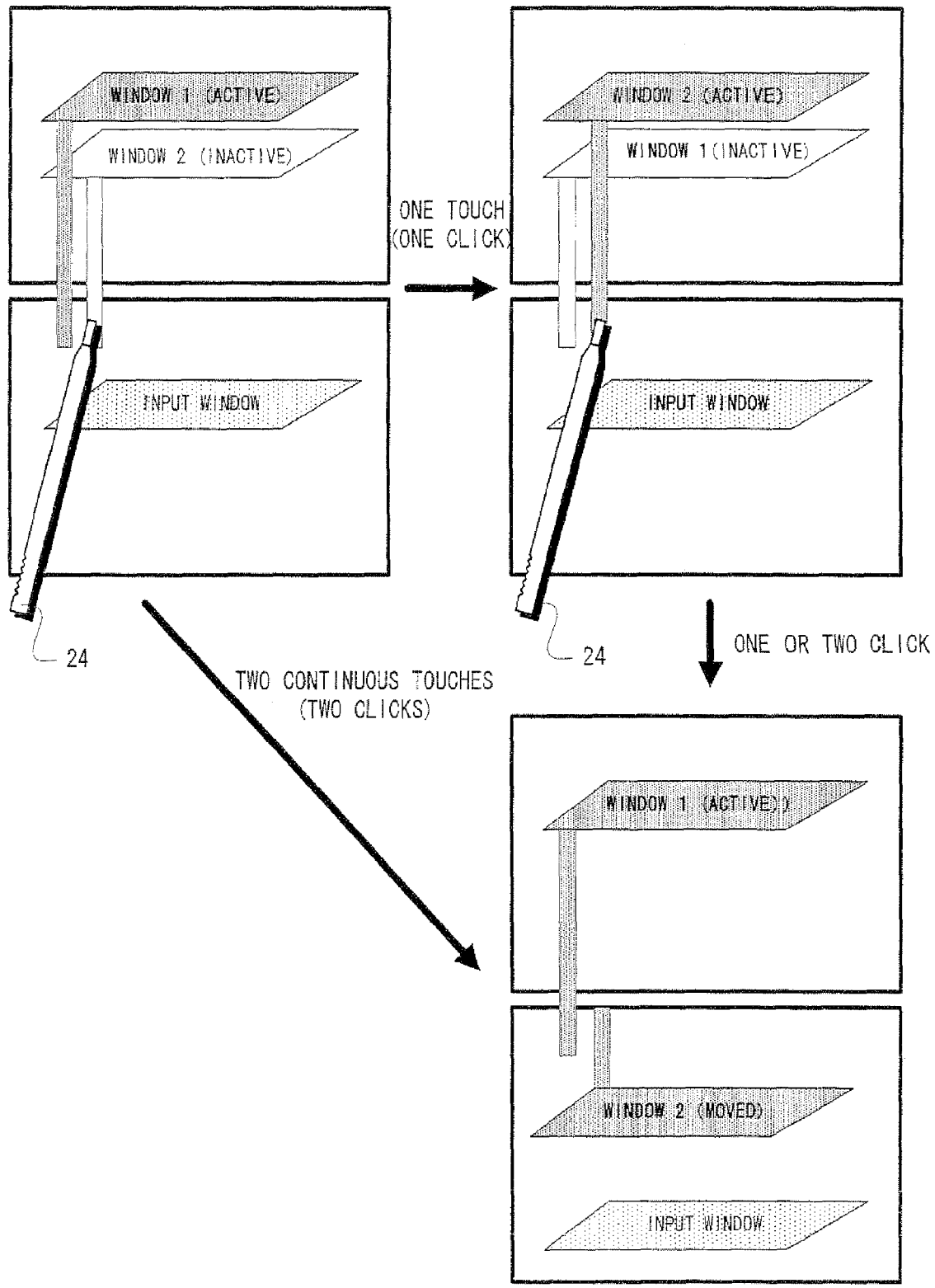
FIG. 16 is an illustrative view showing one example of an outline of window control depending on the difference in operations when a tab corresponding to the inactive window is selected, in a case that an input window is displayed on the lower screen.

FIG. 16 shows an outline of the window control when the tab corresponding to the inactive window is selected in a case that the input window is displayed on the lower screen. When the tab corresponding to the inactive window 2 is selected with one touch (one-click) operation, the window 2 is displayed on the upper screen in an active state, and the window 1 is set to the inactive state. Then, when the tab of the window 2 is selected with one-or two-click operation, the window 2 is moved to the lower screen and displayed in the active state, and the window 1 is displayed in the active state on the upper screen. That is, when a tab corresponding to the window displayed in the forefront is selected on the upper screen with one or two-click operation, it is determined that the window is an object to be operated, and the window is displayed on the lower screen so as to allow an operation input.

On the other hand, when the tab corresponding to an inactive window 2 is selected with a two-continuous-touching (two click) operation, it is determined that the window is an object to be operated, and the window 2 is directly moved to the lower screen to be displayed, and allows an operation input. The display on the upper screen remains to be the active window 1. Thus, by performing a simple predetermined operation (two clicks, for example) on the tab corresponding to the inactive window 2, it is possible to directly display the window on the lower screen in the active state.

In this case, by utilizing different selection operations with respect to the tab corresponding to the inactive window 2, it is possible to change the route until the operation of the window 2. For example, by selecting the tab with one click, the user can temporarily display the window 2 on the upper screen to determine whether or not the operation is required by confirming the content of the window 2 in advance. On the other hand, in a case that there is no need to confirm the content before operating the window 2, and so forth, by selecting the tab with two clicks, the window 2 can be directly displayed on the lower screen to allow an operation on the window 2 to be instantly started. Accordingly, it is possible to improve operability.

Figure 17:
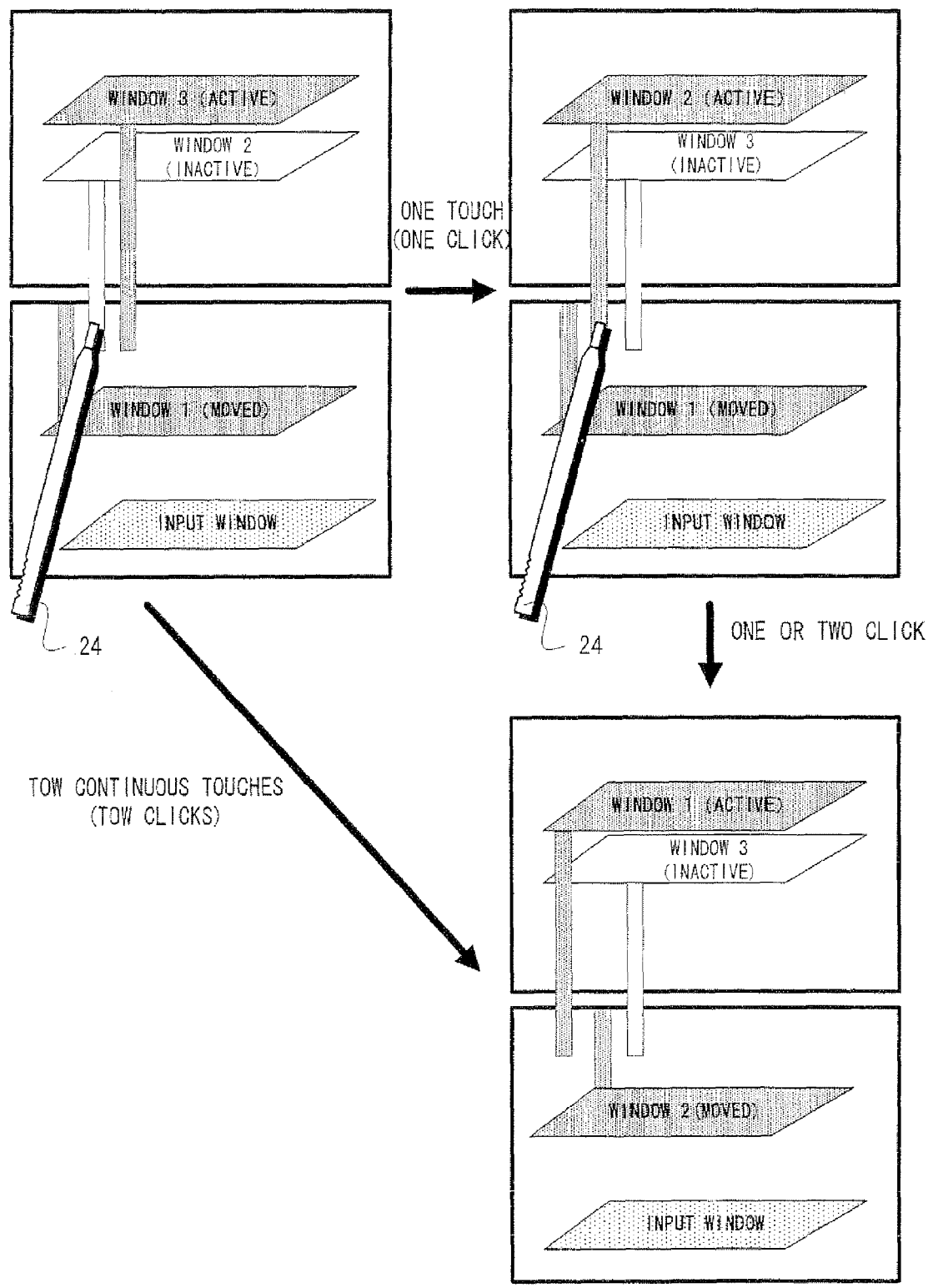
FIG. 17 is an illustrative view showing one example of an outline of window control depending on the difference in operations in a case that a moved window is displayed on the lower screen and when the tab corresponding to the inactive window is selected.

FIG. 17 shows an outline of the control in a case that the moved window 1 is displayed on the lower screen in contrast to FIG. 16 and when the tab corresponding to the inactive window is selected. When the tab corresponding to the inactive window 2 is selected with one-touch (one-click) operation, the window 2 is displayed on the upper screen in an active state, and a window 3 which was in the active state is set to the inactive state. Then, in a case that the tab of the window 2 is selected with one or two-click operation, the window 2 is moved to the lower screen to be displayed in the active state. The window 1 which was displayed on the lower screen is moved to the upper screen so as to be displayed.

On the other hand, when the tab corresponding to the inactive window 2 is selected with a two-continuous-touch (two-click) operation, the window 2 is directly moved to the lower screen and displayed. On the upper screen, the window 1 which was displayed on the lower screen is displayed in the active state. Thus, by performing a simple predetermined operation (2 clicks, for example) on the tab corresponding to the inactive window 2, the window can directly be switched by the moved window on the lower screen so as to be displayed. Accordingly, similarly to FIG. 16, it is possible to improve operability.

Figure 18:
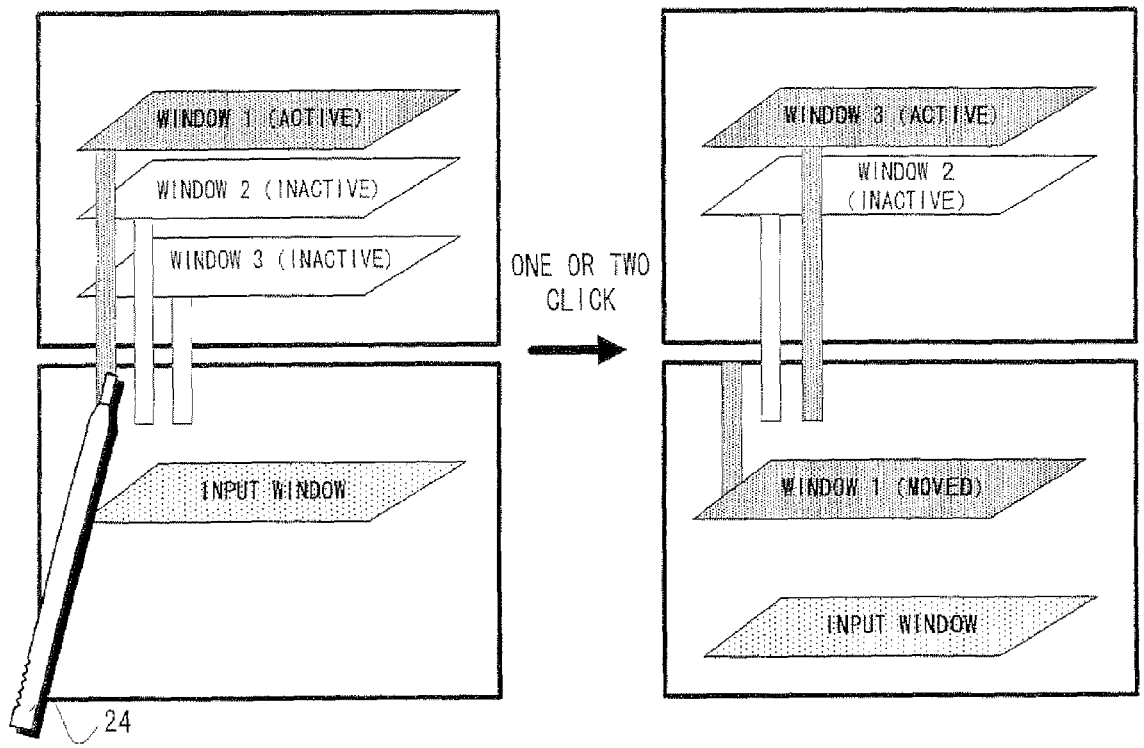
FIG. 18 is an illustrative view showing one example of an outline of window control in a case that the input window is displayed on the lower screen and when the tab corresponding to the active window on the upper screen is selected, and FIG. 18 (A) shows a case that inactive window is activated on the upper screen, and FIG. 18 (B) shows a case that a background image is displayed on the upper screen.
Figure 18:
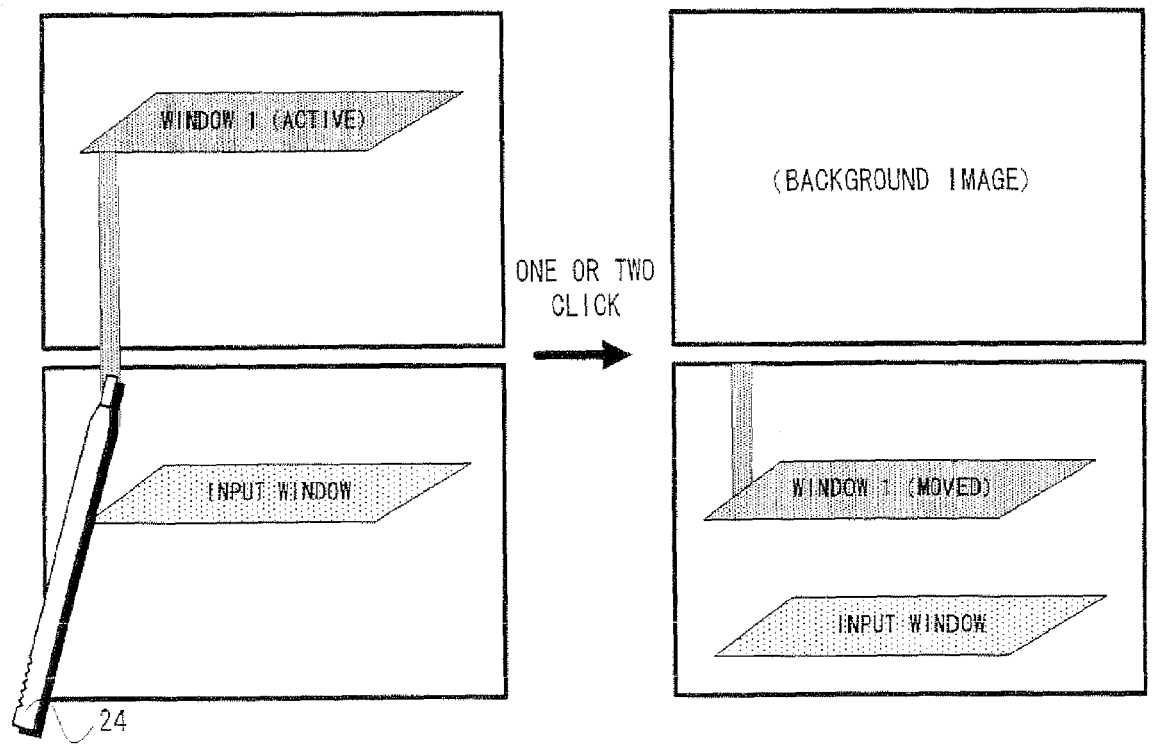

FIG. 18 shows an outline of the control in a case that the input window is displayed on the lower screen and when the tab corresponding to the active window on the upper screen is selected. FIG. 18 (A) shows a case that a plurality of windows 1-3 are created on the upper screen. When the tab corresponding to the active window 1 on the upper screen is selected with 1 or 2 clicks, it is determined that the window 1 becomes an object to be operated, and it moved to the lower screen so as to be displayed in an active state. On the other hand, the window (window 3 in FIG. 18 (A)) corresponding to the tab having the highest tab number out of the inactive windows is displayed on the upper screen in the active state.

In addition, FIG. 18 (B) shows a case that only the one window 1 is created on the upper screen. When the tab corresponding to the window 1 is selected with one or two clicks, it is determined that the window 1 becomes an object to be operated, and it is moved to the lower screen so as to be displayed in an active state. On the other hand, as to the upper screen, no inactive window is present, and therefore, a background image is displayed on the upper screen. It should be noted that in a case that a moved window is displayed on the lower screen, when the active window on the upper screen is selected, the window which was displayed on the lower screen is moved and displayed on the upper screen (see a shift from upper right to lower right in FIG. 17).

Figure 19:
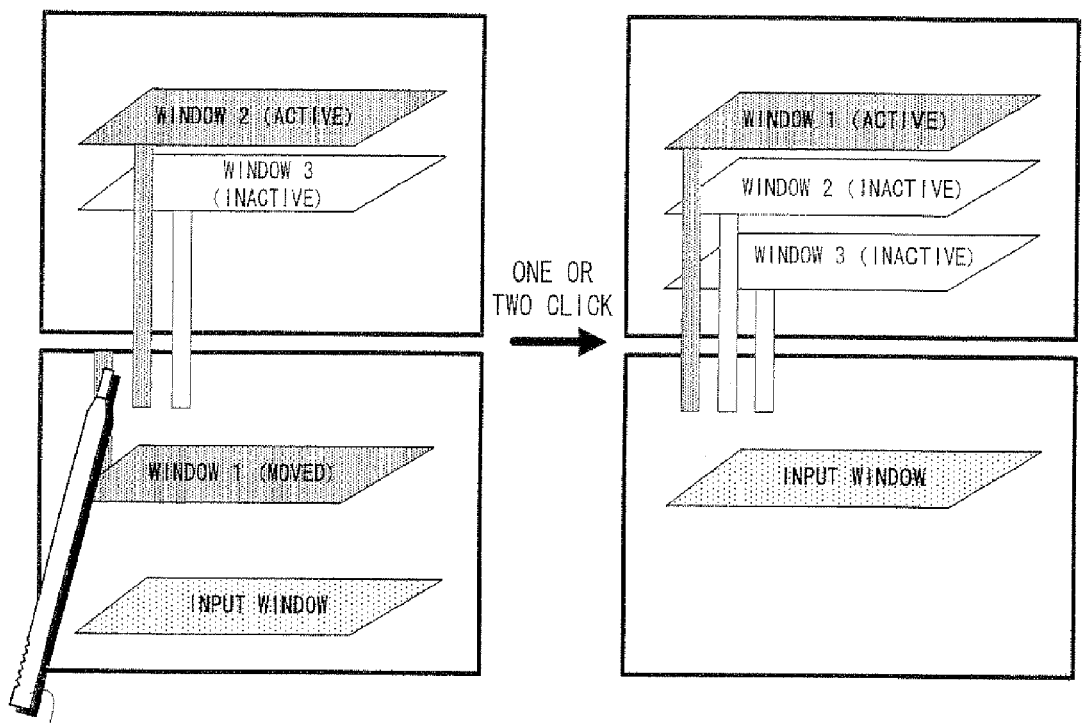
FIG. 19 is an illustrative view showing one example of an outline of window control in a case that the moved window is displayed on the lower screen, and when a tab corresponding to the window on the lower screen is selected.

FIG. 19 shows an outline of the control when the tab corresponding to the active window (moved window) on the lower screen is selected. When the tab corresponding to the moved window 1 on the lower screen is selected with one or two clicks, it is determined that the window 1 is not an object to be operated, and it is moved to the upper screen so as to be displayed in the active state. On the other hand, the input window is displayed on the lower screen. It should be noted that FIG. 19 shows a case that the windows 2 and 3 are present on the upper screen, but the same is true for a case that a background image is displayed on the upper screen.

Figure 20:
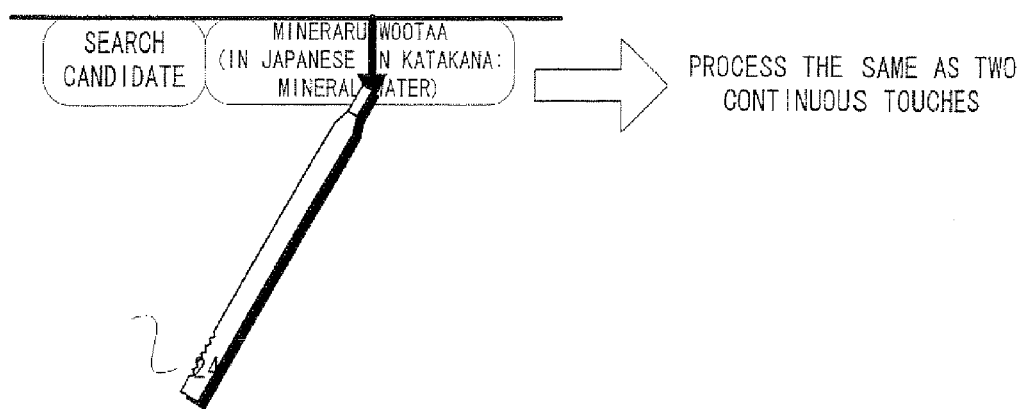
FIG. 20 is an illustrative view showing one example of an outline of a selection by a gesture operation on the tab, FIG. 20 (A) shows a downward-sliding operation, and FIG. 20 (B) shows one example of a sliding operation to a right or left direction.
Figure 20:
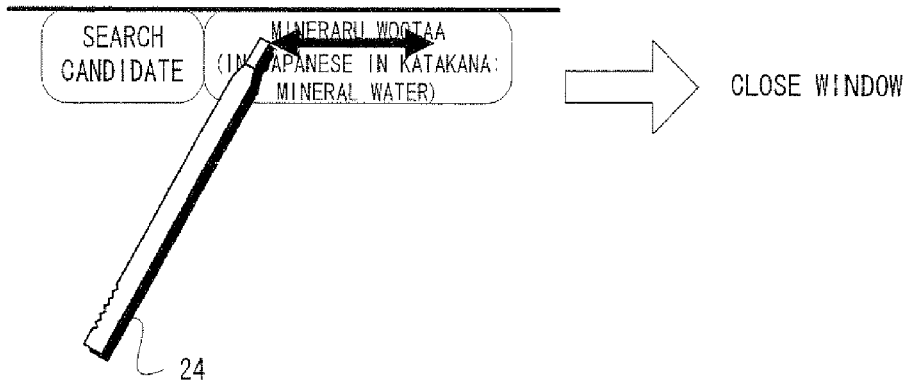

FIG. 20 shows one example of a gesture operation on the tab. FIG. 20 (A) shows a scene where a sliding operation is downwardly performed with the stick 24, etc. on the touch panel 22. When it is determined that the downward-sliding operation is performed on the tab, in this exemplary embodiment, a process the same as that in the case of the two continuous touches (2 clicks) is executed. Accordingly, when a downward-sliding operation is performed on the tab corresponding to the inactive window, the window is directly displayed on the lower screen similarly to the two-click operation shown in FIG. 16 and FIG. 17. Therefore, similarly to the above-described one click or two-click operation, it is possible to control the movement and display of the window with a simple gesture operation, capable of improving operability.

Also, FIG. 20 (B) shows a scene where a sliding operation is performed in the left direction or the right direction with the stick 24, etc. on the touch panel 22. When it is determined that the sliding operation in the left or right direction is performed on the tab, an erasing (closing) process of the corresponding window is executed in this exemplary embodiment. Accordingly, in this case also, similarly to each of the above-described operations, it is possible to control erasure of the window with a simple gesture operation, capable of improving operability.

It should be noted that the predetermined operation, such as the above-described one click operation, two-click operation, downward-sliding operation, sliding operation in the left to right or right to left direction, and correspondences between these predetermined operations and the window control process are one example, and may be changed to other operations and other correspondences as necessary. For example, when the tab is continued to be pushed for a fixed period of time and more, the corresponding window may be erased.

Figure 21:
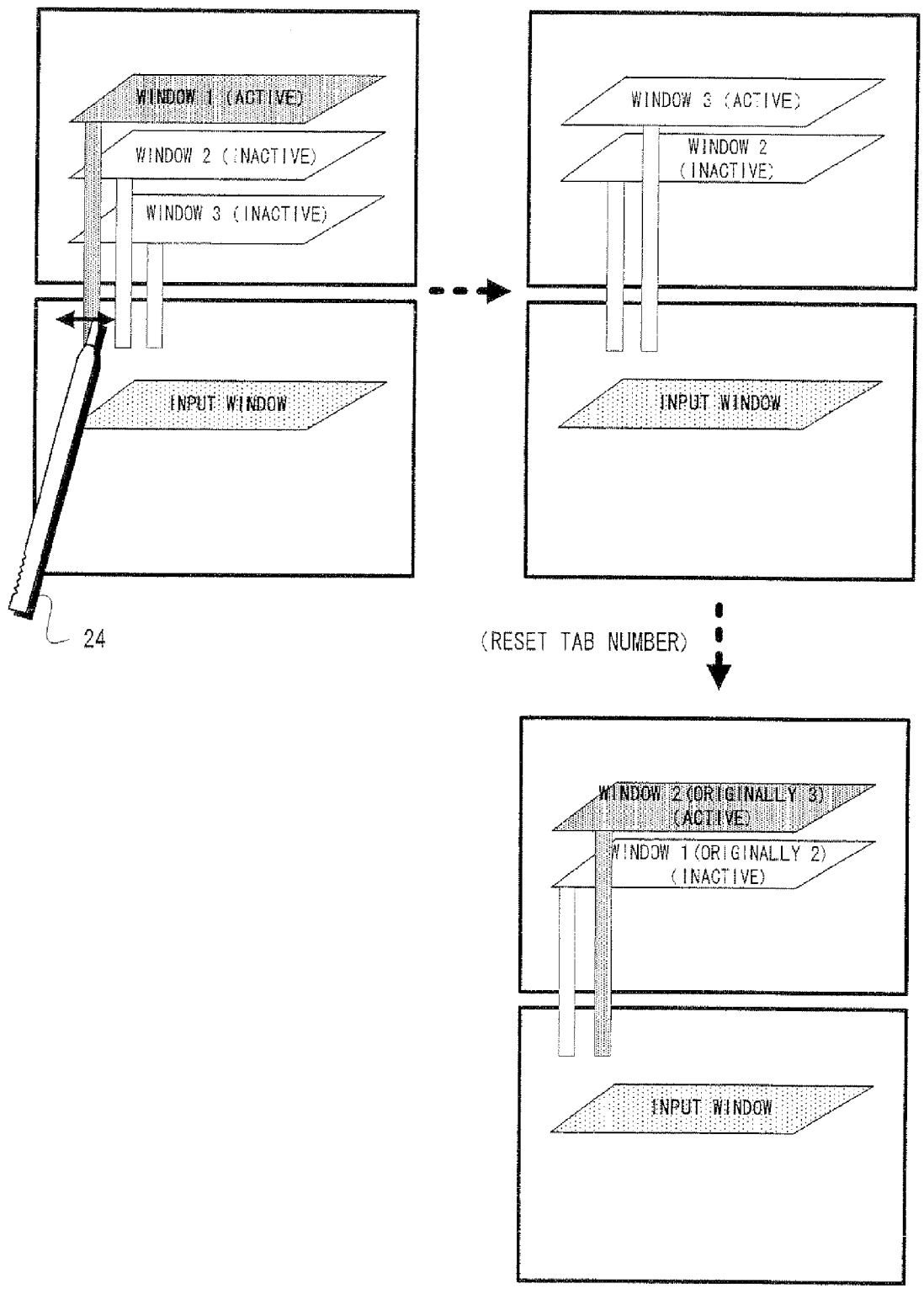
FIG. 21 is an illustrative view showing one example of an outline of window control when an operation for erasing the active window on the upper screen is present.

FIG. 21 shows an outline of window control in a case that an active window is erased on the upper screen. When an operation for instructing erasure (sliding operation from left to right or right to left direction in this exemplary embodiment) is performed on the tab corresponding to window 1 in the active state on the upper screen, the window 1 and the corresponding tab are erased. More specifically, data of the window 1 is erased from the window image storing area 78, and the tab data is erased from the tab data storing area 80. Then, since missing numbers may occur as to the serial tab number, the tab number is reset as required, and the tab data is updated. Thus, the tab number having the highest number is applied to the tab number of the window which is generated anew. More specifically, when the tab number higher than the erased tab number is present, the tab number is subtracted by 1 to reset the tab number. In FIG. 21, since the window 1 with the tab number 1 is erased, the window 3 with the tab number 3 is updated to the window 2 with the tab number 2, and the window 2 with the tab number 2 is updated to the window 1 with the tab number 1. Then, the highest tab number out of the inactive windows is detected, and the highest tab number is stored in the upper screen window tab number storing area 82. Thus, the window corresponding to the highest tab number is displayed on the upper screen. In addition, the tab position data is also updated, and the tabs corresponding to the rest of the windows are displayed in the updated display position on the lower screen. It should be noted that in a case that the highest tab number is not detected, that is, in a case that no inactive window remains, a background image is displayed on the upper screen.

It should be noted that although not illustrated, in a case that an erasing operation is performed on the tab corresponding to the inactive window, the active window is displayed on the upper screen as it is. It should be noted that the window image data, the tab data, and the tab position data are updated in a similar way as described above. If the tab number of the active window on the upper screen is reset, the reset tab number is written to the upper screen window tab number storing area 82.

Furthermore, in a case that an erasing operation is performed on the tab corresponding to the moved window on the lower screen, the lower screen window tab number storing area 84 is cleared, and an input window is displayed on the lower screen. The upper screen is displayed as it is. It should be noted that as described above, the window image data, the tab data, and the tab position data are updated in a similar way as described above, and the upper screen window tab number storing area 82 is also updated as necessary.

It should be noted that in this exemplary embodiment, when the active window is erased, the window having the highest tab number, that is, the window generated last is displayed. However, when the active window is erased by recording, window display history data in advance the window which has been displayed directly before may be displayed.

Figure 22:
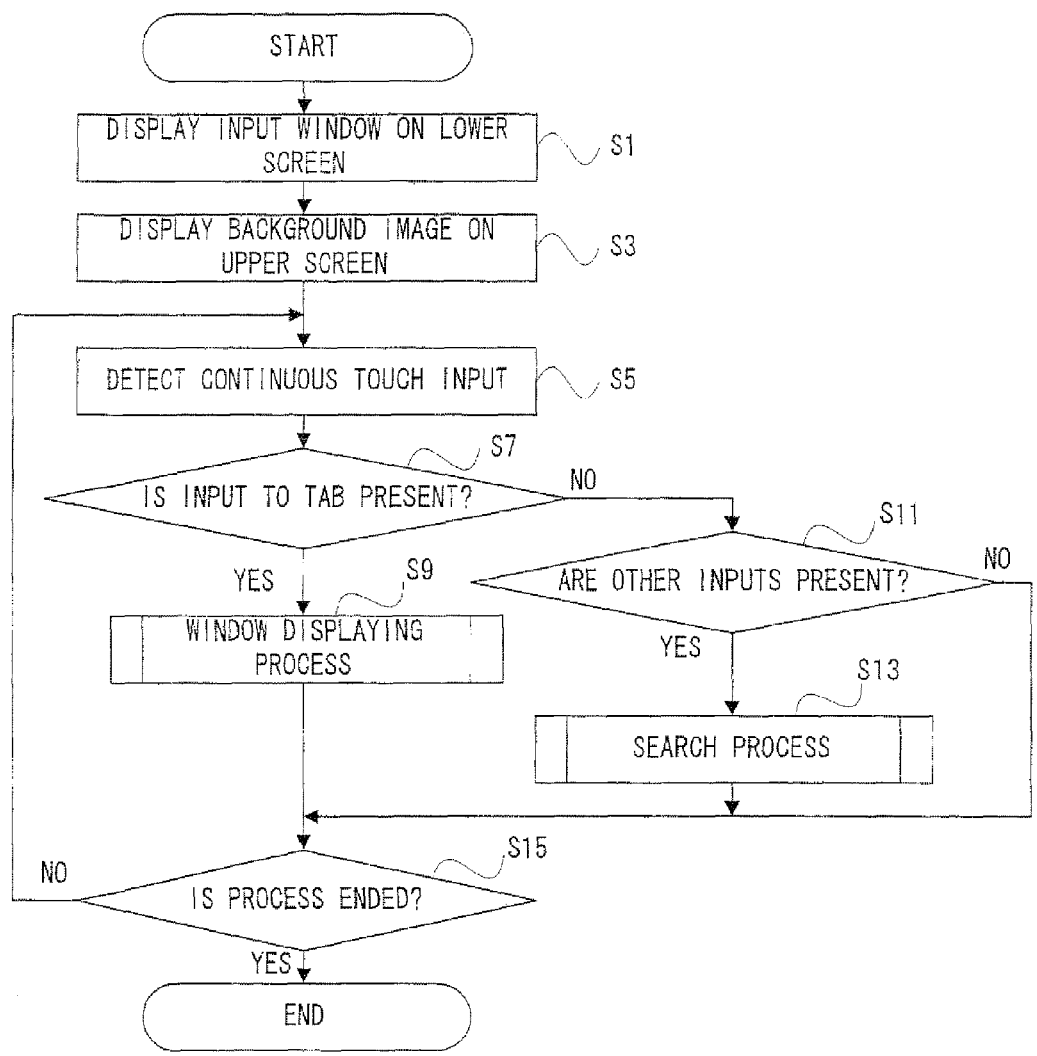
FIG. 22 is a flowchart showing one example of an operation of the information processing apparatus of FIG. 1 exemplary embodiment.

FIG. 22 shows one example of an operation of the information processing apparatus 10. When starting the process, the CPU core 42 displays an input window on the lower screen in a step S1. More specifically, the CPU core 42 generates image data of the input window in the VRAM 56 (or VRAM 58) by utilizing the GPU 50 (or GPU 52) on the basis of the input window image data of the initial state in the window image storing area 78. The LCD controller 60 outputs to the LCD 14 the image data stored in the VRAM 56 (or VRAM 58) according to an instruction from the CPU core 42, and displays the image on the LCD 14. Furthermore, in a step S3, the CPU core 42 displays a background image on the upper screen. More specifically, the CPU core 42 generates image data of the background image in the VRAM 58 (or VRAM 56) by utilizing the GPU 52 (or GPU 50) on the basis of the data for displaying the background image in the data storage area, and displays the background image on the LCD 12 by utilizing the LCD controller 60.

Next, in a step S5, the CPU core 42 detects a continuous touch input. More specifically, the CPU core 42 stores coordinates data output from the touch panel 22 via the I/F circuit 54 in the touch input data storing area 74. For example, the coordinates data of the continuous predetermined number of frames (one frame is ¹⁄₆₀ seconds) is detected and stored in the storage area 74.

Subsequently, in a step S7, the CPU core 42 determines whether or not an input to the tab is present on the basis of the touch input data and the tab position data. That is, it is determined whether or not the coordinates of the touch input data is included in the coordinates indicative of the display position or range of the tab of the tab position data. If "YES" in the step S7, the CPU core 42 executes a window displaying process in a step S9. The operation of the window displaying process is shown in detail in FIG. 26 described later.

On the other hand, if "NO" in the step S7, the CPU core 42 determines whether or not another input is present on the basis of the touch input data in a step S11. If "YES" in the step S11, that is, if a touch input except for the tab position is present, the CPU core 42 executes a search process in a step S13. The operation of the search process is shown in detail in FIG. 23 described later.

Also, if "NO" in the step S11, that is, if no touch input is present, the process directly proceeds to a step S15. After the completion of the step S9 or step S13, the process proceeds to the step S15.

In the step S15, the CPU core 42 determines whether or not the process is to be ended on the basis of the touch input data, for example. If "NO" in the step S15, the process returns to the step S5, and if "YES", the process is ended.

Figure 23:
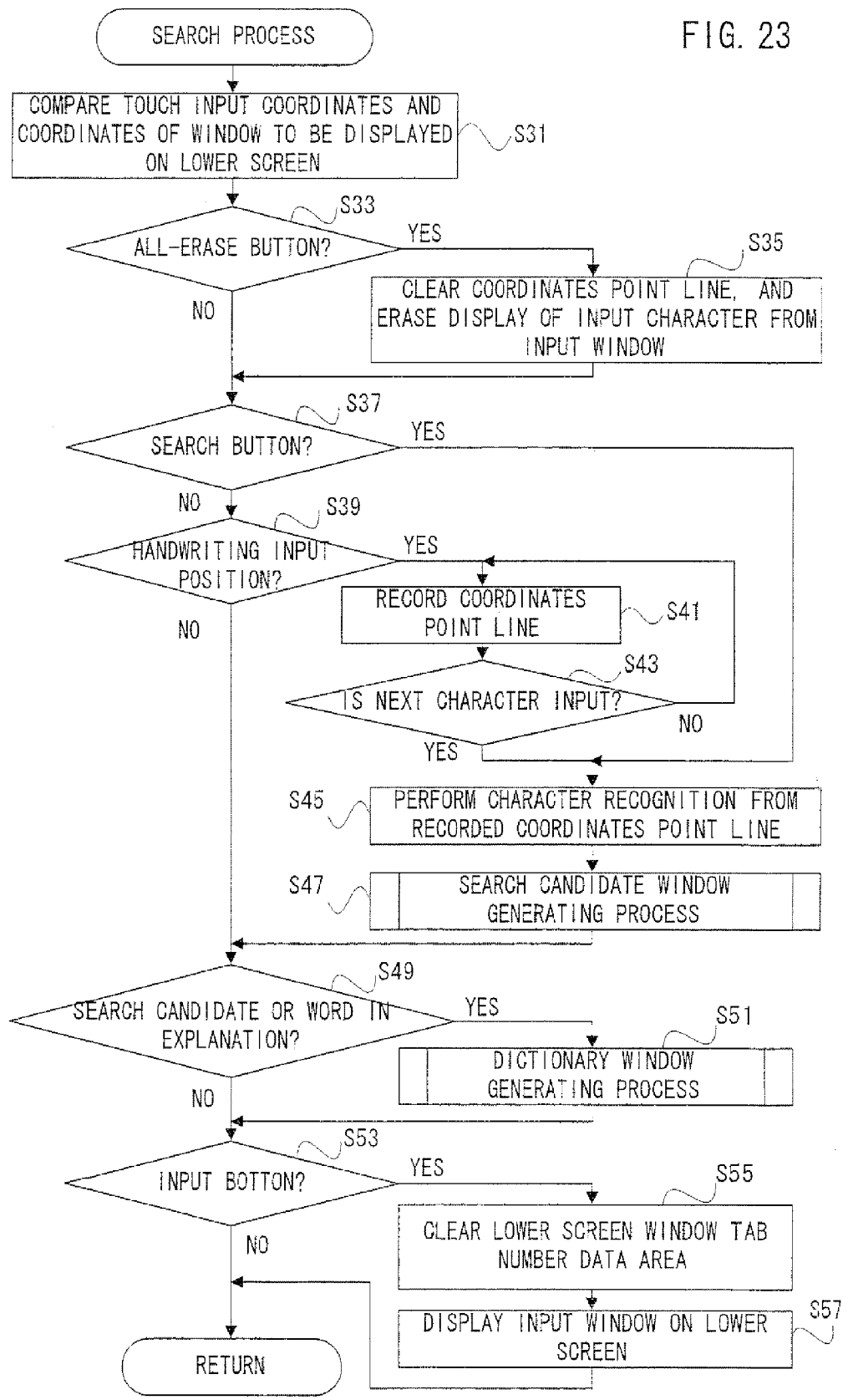
FIG. 23 is a flowchart showing one example of an operation of a search process in FIG. 22.

FIG. 23 shows one example of an operation of the search process in the step S13 (FIG. 22). In a first step S31 in FIG. 23, the CPU core 42 compares the touch input coordinates with the coordinates of the window displayed on the lower screen. More specifically, a window which is being displayed on the lower screen is specified on the basis of the data in the lower screen window tab number storing area 84, and the coordinates to be compared included in the window image data of the window is referred. For the input window, with reference to search button position data, all-erase button position data, handwriting input position data, and it is determined the coordinates indicated by the touch input data is included in them. For the search candidate window, with reference to each of the search candidate position data, it is determined whether or not the coordinates indicated by the touch input data is included in them. For the dictionary window, with reference to each word position data, it is determined whether or not the coordinates indicated by the touch input data is included them.

In a step S33, the CPU core 42 determines whether or not the instructed coordinates is the coordinates of the all-erase button 106. If "YES" in the step S33, the CPU core 42 clears the coordinates point line storing area 76, and clears the image data of the input character from the input window image data to erase the display of the input character in the character input area 102 in a step S35. If "NO" in the step S33, or after completion of the step S35, the process proceeds to a step S37.

In the step S37, the CPU core 42 determines whether or not the instructed coordinates is the coordinates of the search button 104, and if "YES", the process proceeds to a step S45.

On the other hand, if "NO" in the step S37, the CPU core 42 determines whether or not the instructed coordinates is the coordinates of the handwriting input area 102 in a step S39. If "YES" in the step S39, the CPU core 42 records the coordinates point line in a step S41. More specifically, the coordinates data of the handwriting input area 102 stored in the touch input data storing area 74 is stored in the coordinates point line storing area 76, the coordinates data output from the touch panel 22 via the I/F circuit 54 is obtained and additionally stored in the coordinates point line storing area 76. It should be noted that although omitted in FIG. 23, on the basis of the recorded coordinates point line data, the color data of the corresponding coordinates in the handwriting input area 102 in the input window is changed to update the input window image data, and the input window image is displayed on the lower screen. Thus, the character input by handwriting is displayed on the handwriting input area 102.

Suceedingly, in a step S43, the CPU core 42 determines whether or not a next character is input. In inputting the character by handwriting, the user generally spends a predetermined time period from the end of a certain character to the start of the next character. Thus, it is determined whether or not the predetermined time period elapses from the touch-off to the touch-on on the basis of the stored coordinates point line data, for example. Or, the start of the input of the next character may be determined by the end of the input of the current character. More specifically, it may be determined whether or not a predetermined time period elapses from the touch-off on the basis of the coordinates point line data. If "NO" in the step S43, the process returns to the step S41.

Figure 24:
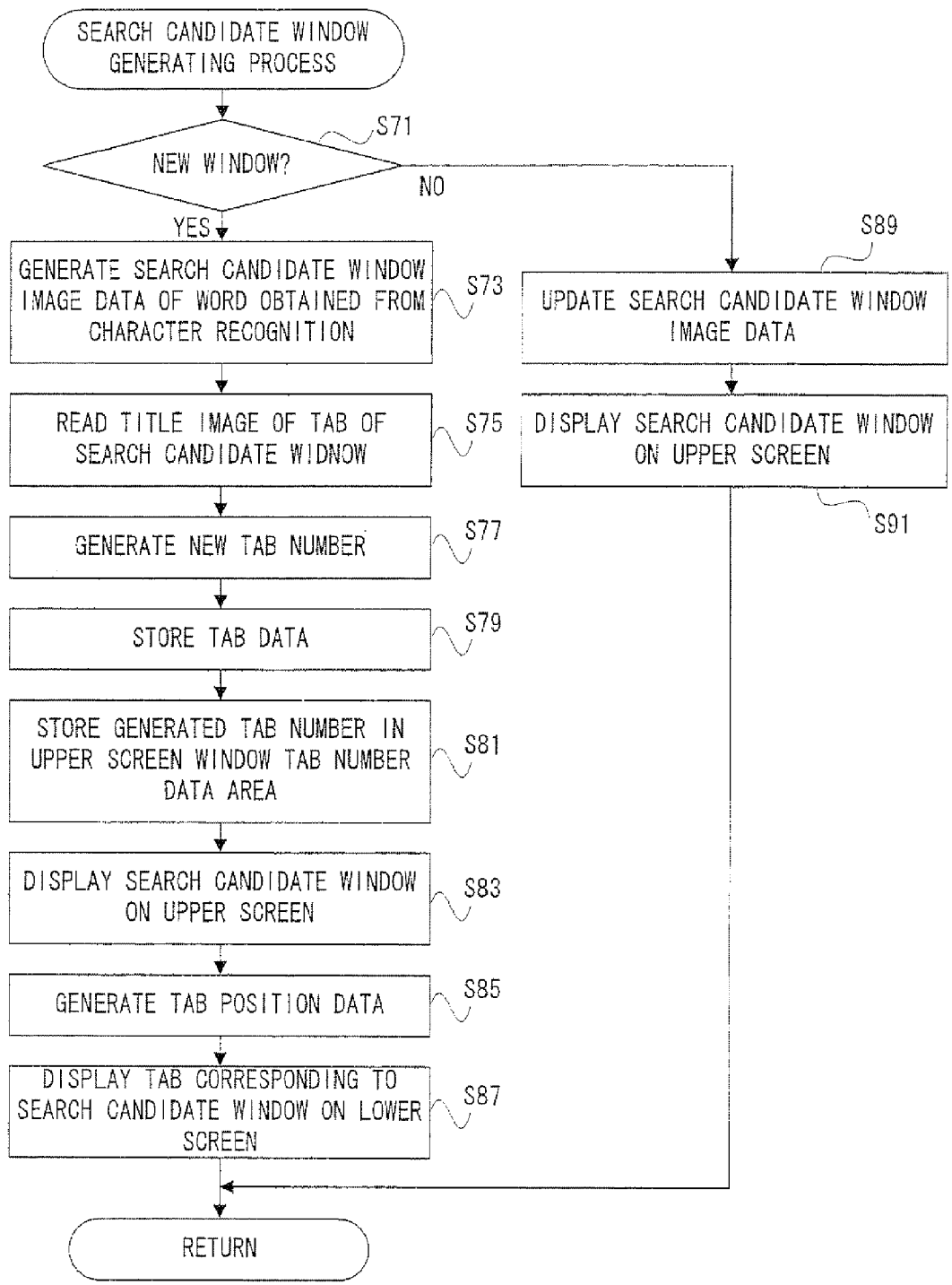
FIG. 24 is a flowchart showing one example of an operation of a search candidate window generating process in FIG. 23.

If "YES" in the step S43, the CPU core 42 performs a character recognition process from the recorded coordinates point line in a step S45. More specifically, the character input is recognized on the basis of the coordinates point line data by pattern matching, for example. Then, in a step S47, the CPU core 42 executes a search candidate window generating process, and creates a search candidate window for displaying the recognized word as a search candidate. The operation of the search candidate window generating process is shown in FIG. 24 described later. After completion of the step S47, or if "NO" in the step S39, the process proceeds to a step S49.

Figure 25:
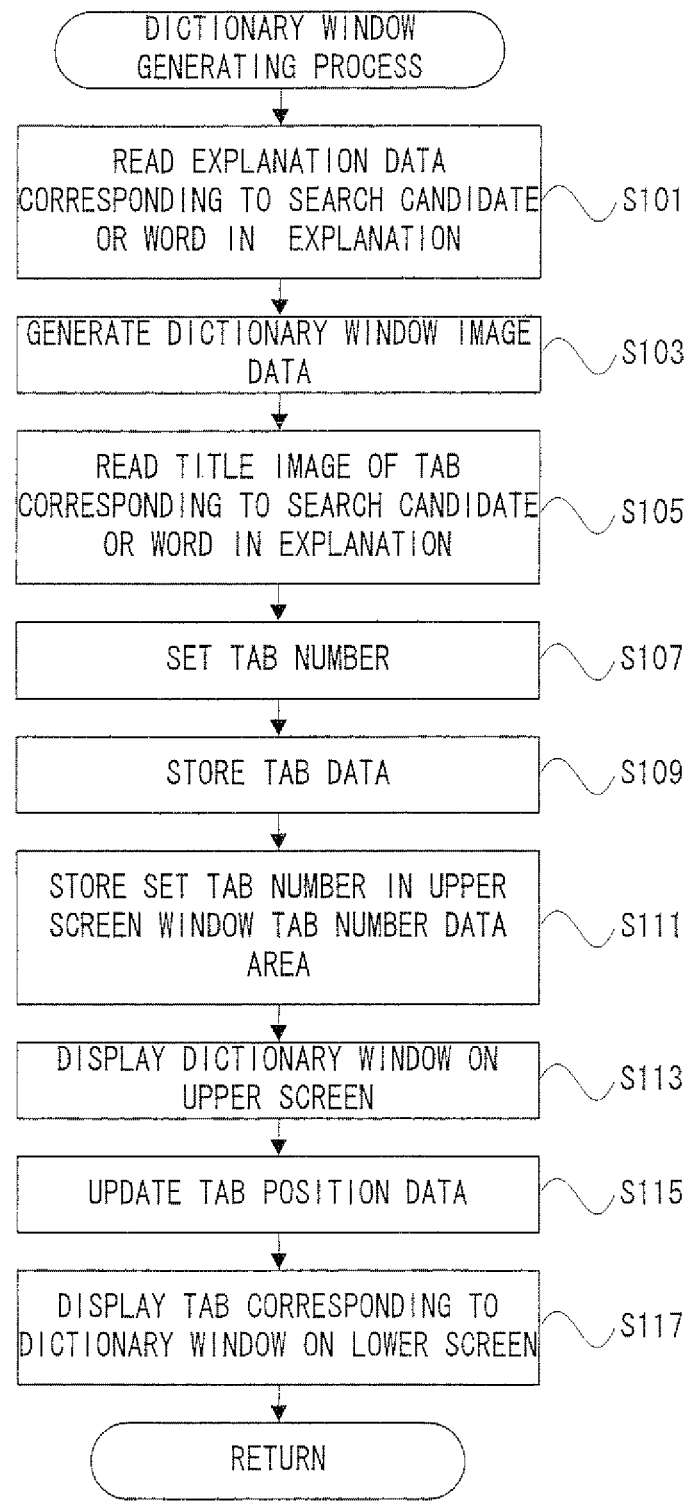
FIG. 25 is a flowchart showing one example of an operation of a dictionary window generating process in FIG. 23.

In the step S49, the CPU core 42 determines whether or not the instructed coordinates is equal to the coordinates of the word of the search candidate. Or, the CPU core 42 determines whether or not the instructed coordinates is equal to the coordinates of the word in the dictionary. If "YES" in the step S49, the CPU core 42 executes a dictionary window generating process, and creates the dictionary window for displaying the explanation of the instructed word in a step S51. The operation of the dictionary window generating process is shown in FIG. 25 described later. After completion of the step S51, or if "NO" in the step S49, the process proceeds to a step S53.

In the step S53, the CPU core 42 determines whether or not the instructed coordinates is equal to the coordinates of the input button 108. If "YES" in the step S53, the CPU core 42 clears the lower screen window tab number data storing area 84, and writes an initial value, such as 0, NULL, or the like in a step S55. Succeedingly, in a step S57, the CPU core 42 displays the input window on the lower screen. More specifically, the CPU core 42 displays an input window image on the LCD 14 on the basis of the input window image data by utilizing the GPU 50 (or GPU 52) and the LCD controller 62, etc as described above.

After completion of the step S57, or if "NO" in the step S53, the search process is ended, and the process returns to the step S15 in FIG. 22.

In FIG. 24, one example of an operation of the search candidate window generating process in the step S47 (FIG. 23) is shown. In a first step S71 in FIG. 24, the CPU core 42 determines whether or not the new search candidate window is to be created. For example, in a case of a first character recognition after the all-erase button 106 is pushed, and coordinates point line data is temporarily cleared, it is determined to be a new window creation.

If "YES" in the step S71, the CPU core 42 generates search candidate window image data of the word obtained by the character recognition in a step S73. For example, the word applied to the recognition result is read from the dictionary data, and the display position of the word is determined to thereby generate search candidate position data. Thus, the data for displaying a search candidate window image including the word is generated, and stored in the window image storing area 78.

In a step S75, the CPU core 42 reads title image data of the tab of the search candidate window (image data indicative of "search candidate") from the ROM 28a to the RAM 48.

In a step S77, the CPU core 42 generates a new tab number. More specifically, if the tab data is stored in the tab data storing area 80, 1 is added to the highest tab number to generate a new tab number. It should be noted that if the tab data is not stored in the tab data storing area 80 (that is, window is not created), 1 is set as the new tab number.

In a step S79, the CPU core 42 generates tab data to store it in the tab data storing area 80. More specifically, in correspondence with the tab number generated in the step S77, the title image data read in the step S75 and an initial address of the window image data generated in the step S73 are stored (see FIG. 6).

In a step S81, the CPU core 42 stores the tab number generated in the step S77 in the upper screen window tab number data storing area 82. In a step S83, the CPU core 42 displays a search candidate window on the LCD 12 on the basis of the search candidate window image data by utilizing the GPU 50 (or GPU 52) and the LCD controller 62. Thus, as shown in FIG. 7, for example, the search candidate window 110 created anew is displayed on the upper screen.

Furthermore, in a step S85, the CPU core 42 generates the tab position data, and stores it in the tab position data storing area 86. For example, if the tab position data is not stored in the tab position data storing area 86, a predetermined display position or range for the first tab is read, and stored in correspondence with the new tab number generated in the step S77. On the other hand, in a case that the tab position data is stored, a display position or range of a new tab is set on the basis of the character count of the title image of each tab, a size of the display area of the tab, etc., and is stored in correspondence with a new tab number. Also, a display position or range of the existing tab is updated as necessary such that all of the tabs are within the display area of the tab.

Then, in a step S87, the CPU core 42 displays on the LCD 14 the tab corresponding to the search candidate window on the basis of the tab data and the tab position data by utilizing the GPU 52 (or GPU 50) and the LCD controller 60. It should be noted that in a case that the display position of the existing tab is updated in the step S85, the existing tab is displayed in the updated position.

On the other hand, if "NO" in the step S71, the CPU core 42 updates the search candidate window image data in a step S89. More specifically, similarly to the step S73, data for displaying the search candidate window image including the word obtained from a further character recognition is generated, and stored in the window image storing area 78.

Then, in a step S91, the CPU core 42 displays a search candidate window on the LCD 12 on the basis of the updated search candidate window image data by utilizing the GPU 50 (or GPU 52) and the LCD controller 60. Thus, as shown in FIG. 8, the updated search candidate window 110 is displayed on the upper screen, for example. After completion of the step S87 or the step S91, the search candidate window generating process is ended, and the process proceeds to the step S49 in FIG. 23.

FIG. 25 shows one example of an operation of the dictionary window generating process in the step S51 (FIG. 23). In a first step S101 in FIG. 25, the CPU core 42 reads explanation data corresponding to the selected search candidate or the word within the content of the explanation from the dictionary data storing area 88 to the work area of the RAM 48. Then, in a step S103, the CPU core 42 determines a heading position of the word, the display position of the explanation (display position of each word), etc. on the basis of the read explanation data, etc., and generates the dictionary window image data to display the word and explanation and stores it in the window image storing area 78.

Also, in a step S105, the CPU core 42 reads the data for displaying the title image of the tab corresponding to the selected search candidate or the word in the explanation from the dictionary data storing area 88 to the work area of the RAM 48.

In a step S107, the CPU core 42 adds 1 to the highest tab number with reference to the tab data storing area 80 to thereby set the tab number corresponding to the created dictionary window.

In a step S109, the CPU core 42 generates tab data by being brought into correspondence with the tab number in the step S107, the title image data in the step S105, and the initial address of the dictionary window image data in the step S103, and stores the generated tab data in the tab data storing area 80.

In a step S111, the CPU core 42 stores the tab number set anew in the step S107 in the upper screen window tab number data storing area 82. Then, in a step S113, the CPU core 42 displays the dictionary window on the LCD 12 on the basis of the dictionary window image data generated in the step S103 by utilizing the GPU 50 (or GPU 52) and the LCD controller 60. Thus, as shown in FIG. 10 or FIG. 14, for example, the dictionary window created anew is displayed on the upper screen.

Furthermore, in a step S115, the CPU core 42 updates the tab position data to store it in the tab position data storing area 86. More specifically, similarly to the step S85, a display position or range of the new tab is set anew and stored by being brought into correspondence with the new tab number, and updates the display position or range of the existing tab is updated as required.

Then, in a step S117, the CPU core 42 displays the tab corresponding to the new dictionary window on the LCD 14 on the basis of the tab data and the tab position data by utilizing the GPU 52(or GPU 50) and the LCD controller 60. It should be noted that in a case that the display position of the existing tab is updated in the step S115, the existing tab is displayed in the updated position. After completion of the step S117, the dictionary window generating process is ended, and the process proceeds to the step S53 in FIG. 23.

Figure 26:
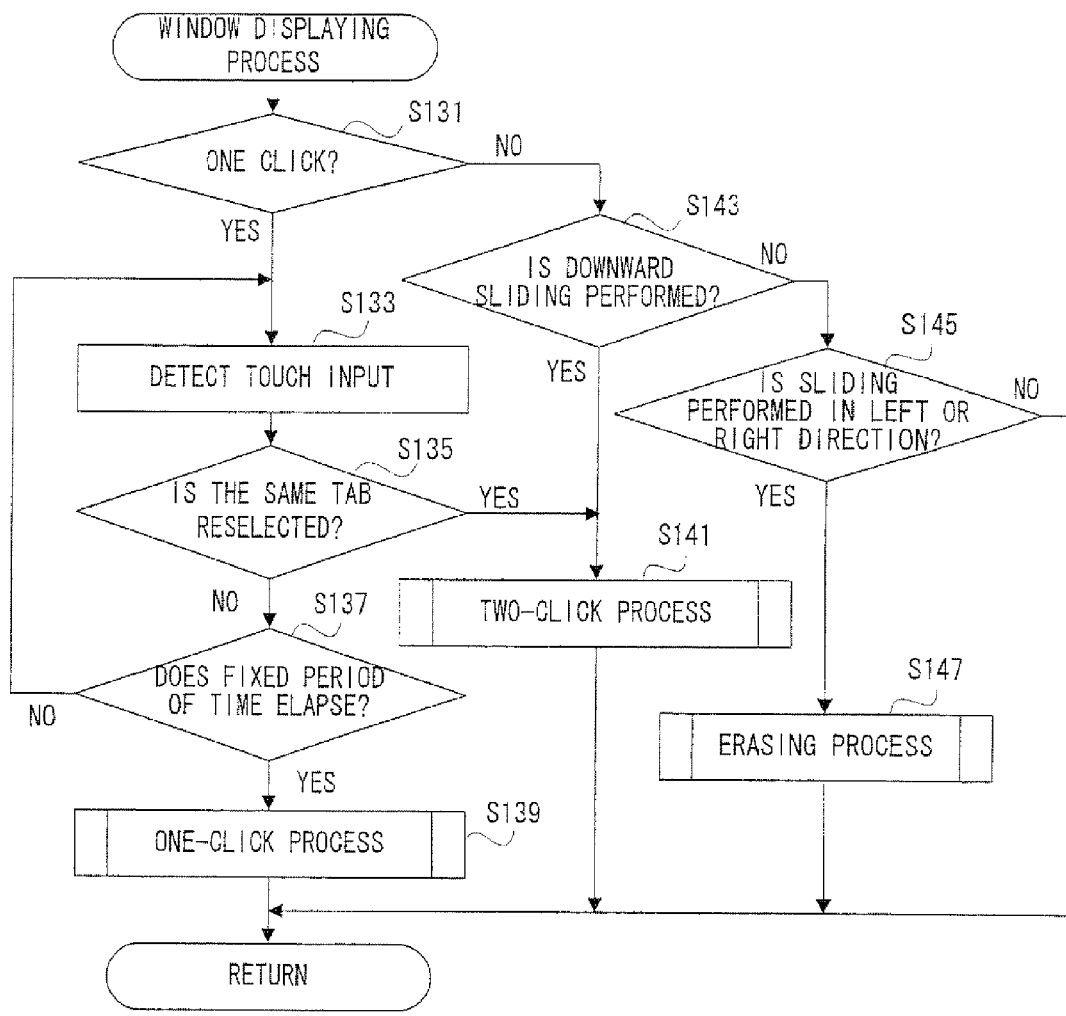
FIG. 26 is a flowchart showing one example of an operation of a window displaying process in FIG. 22.

FIG. 26 shows one example of an operation of the window displaying process in the step S9 (FIG. 22). In a first step S131 in FIG. 26, the CPU core 42 determines whether or not the one-click operation is performed on the basis of the touch input data. For example, in a case that a touch-on state is detected from a touch-off state and then, the touch-off state is detected, it is determined that the one click operation is performed.

If "YES" in the step S131, the CPU core 42 detects the data output from the touch panel 22 via the I/F circuit 54, and stores it in the touch input data storing area 74 in a step S133. Then, in a step S135, the CPU core 42 determines whether or not the same tab is reselected on the basis of the coordinates data and the tab position data detected in the step S135. That is, it is determined whether or not the instructed coordinates instructed by the touch input data is equal to the display coordinates of the tab instructed in the step S7. If "NO" in the step S135, the CPU core 42 determines whether or not a fixed period of time elapses after it is determined the touch-on state is shifted to the touch-off state in the step S131. If "NO" in the step S137, the process returns to the step S133.

Figure 27:
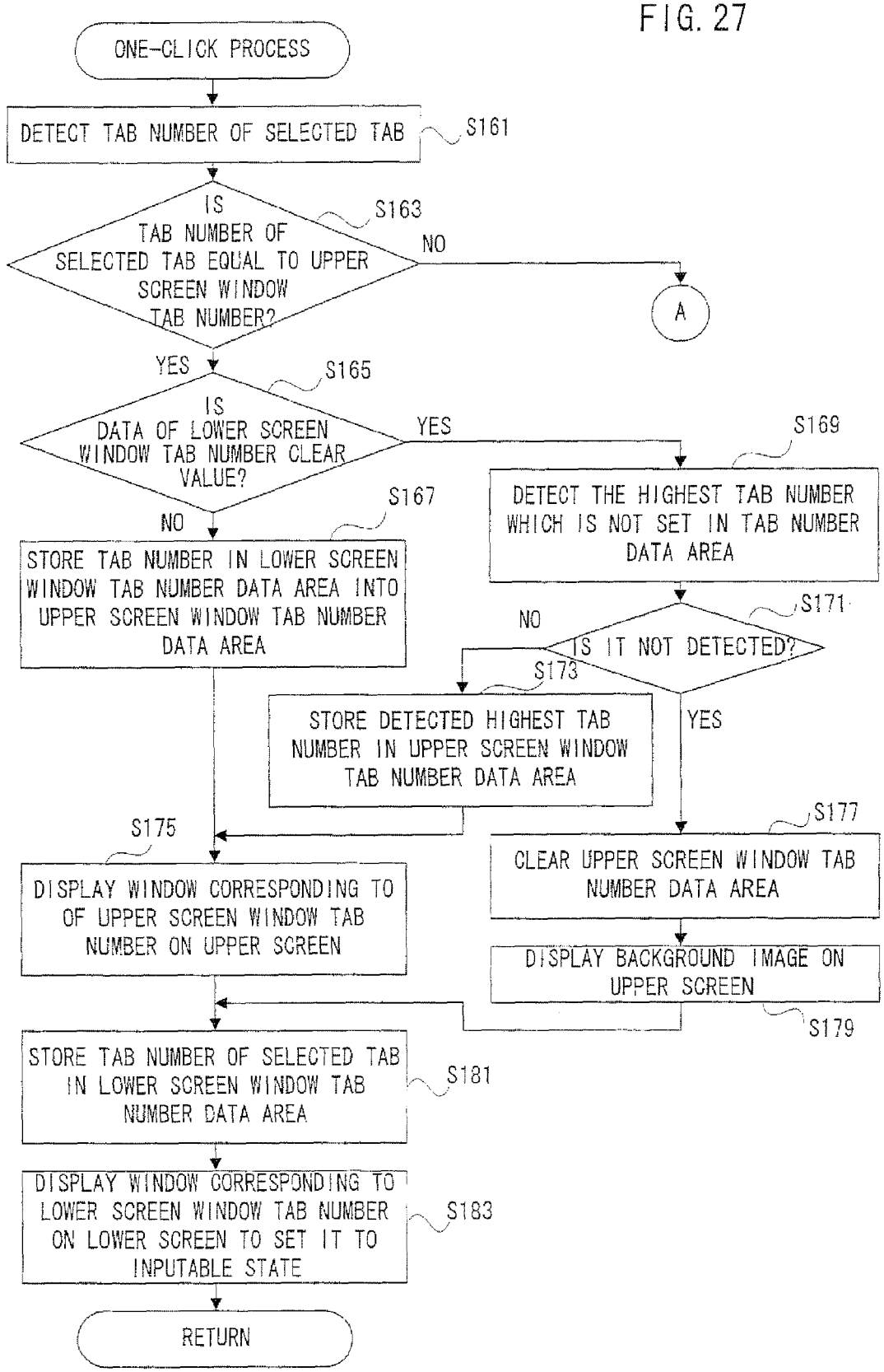
FIG. 27 is a flowchart showing a part of example of an operation of one-click process in FIG. 26.
Figure 28:
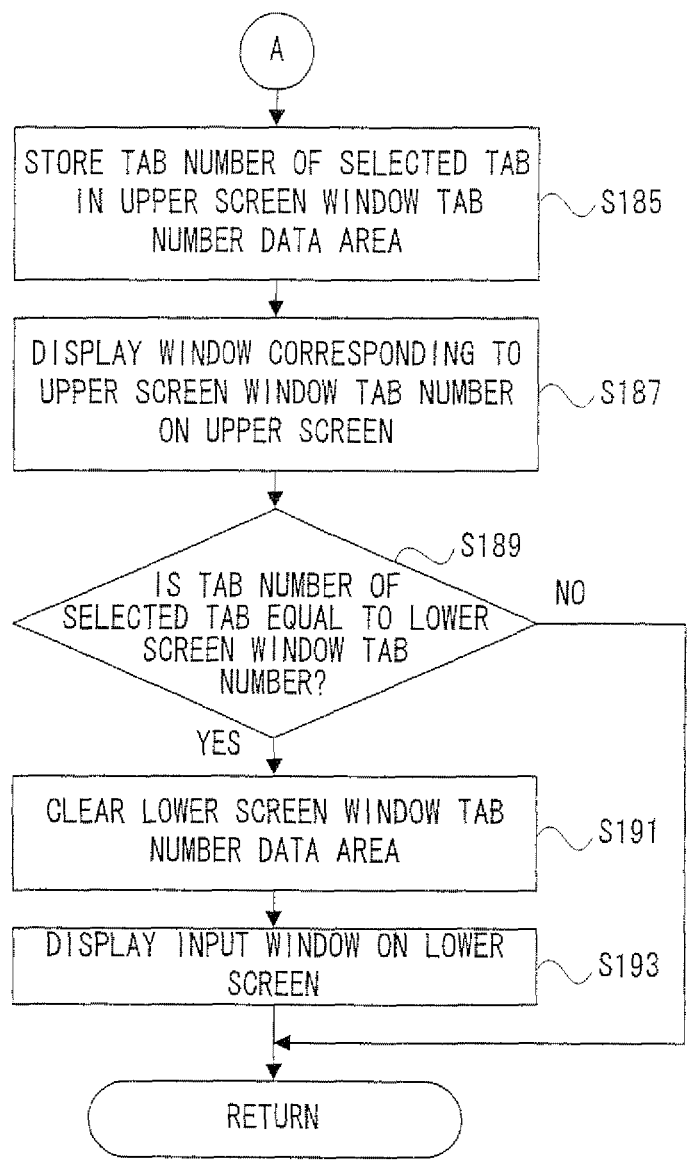
FIG. 28 is a flowchart continued from FIG. 27.

On the other hand, if "YES" in the step S137, that is, if a fixed period of time elapses from the detection of the one-click operation without the same tab being selected, the CPU core 42 executes the one-click process in a step S139. The operation of the one-click process is shown in FIG. 27 and FIG. 28 described later.

Figure 29:
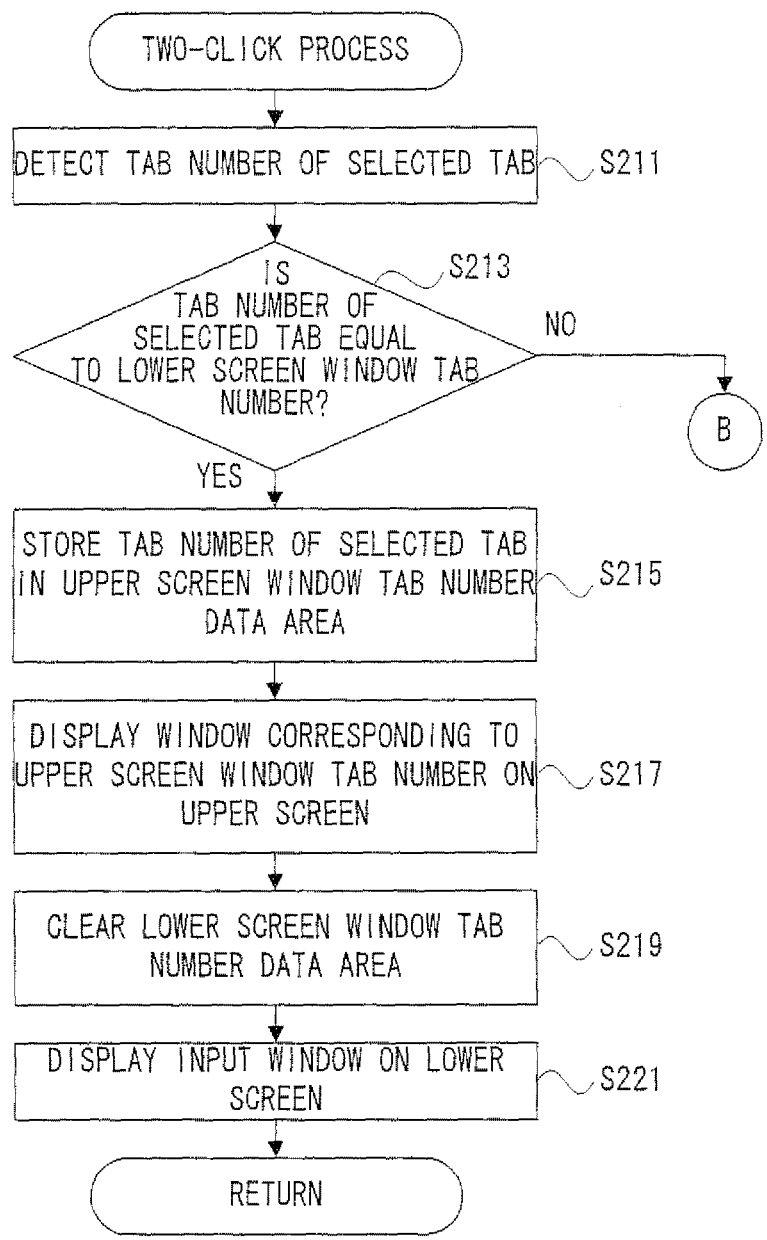
FIG. 29 is a flowchart showing a part of example of an operation of a two-click process in FIG. 26.
Figure 30:
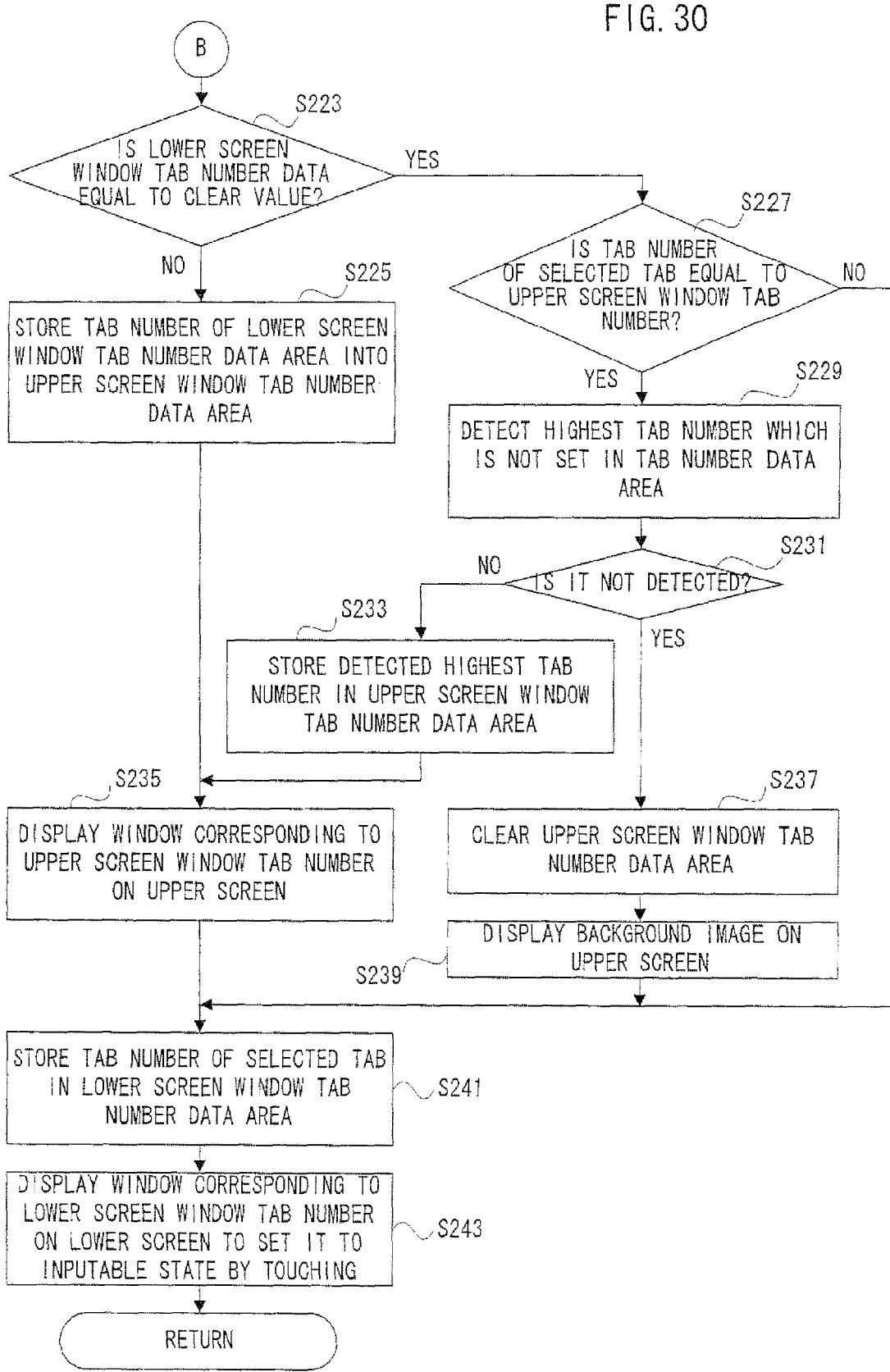
FIG. 30 is a flowchart continued from FIG. 29.

Furthermore, if "YES" in the step S135, that is, if the display position of the same tab is instructed again before a lapse of the fixed period of time since a touch-off at the first click is detected, it can be determined that a two-click operation is performed on the tab. Accordingly, the CPU core 42 executes a two-click process in a step S141. The operation of the two-click process is shown in FIG. 29 and FIG. 30 described later.

Also, if "NO" in the step S131, the CPU core 42 determines whether or not a downward-sliding operation is performed on the basis of the touch input data in a step S143. If "YES" in the step S143, that is, if the history of the detected instructed coordinates indicates the downward continuous track, the CPU core 42 executes the two click process in the step S141.

Figure 31:
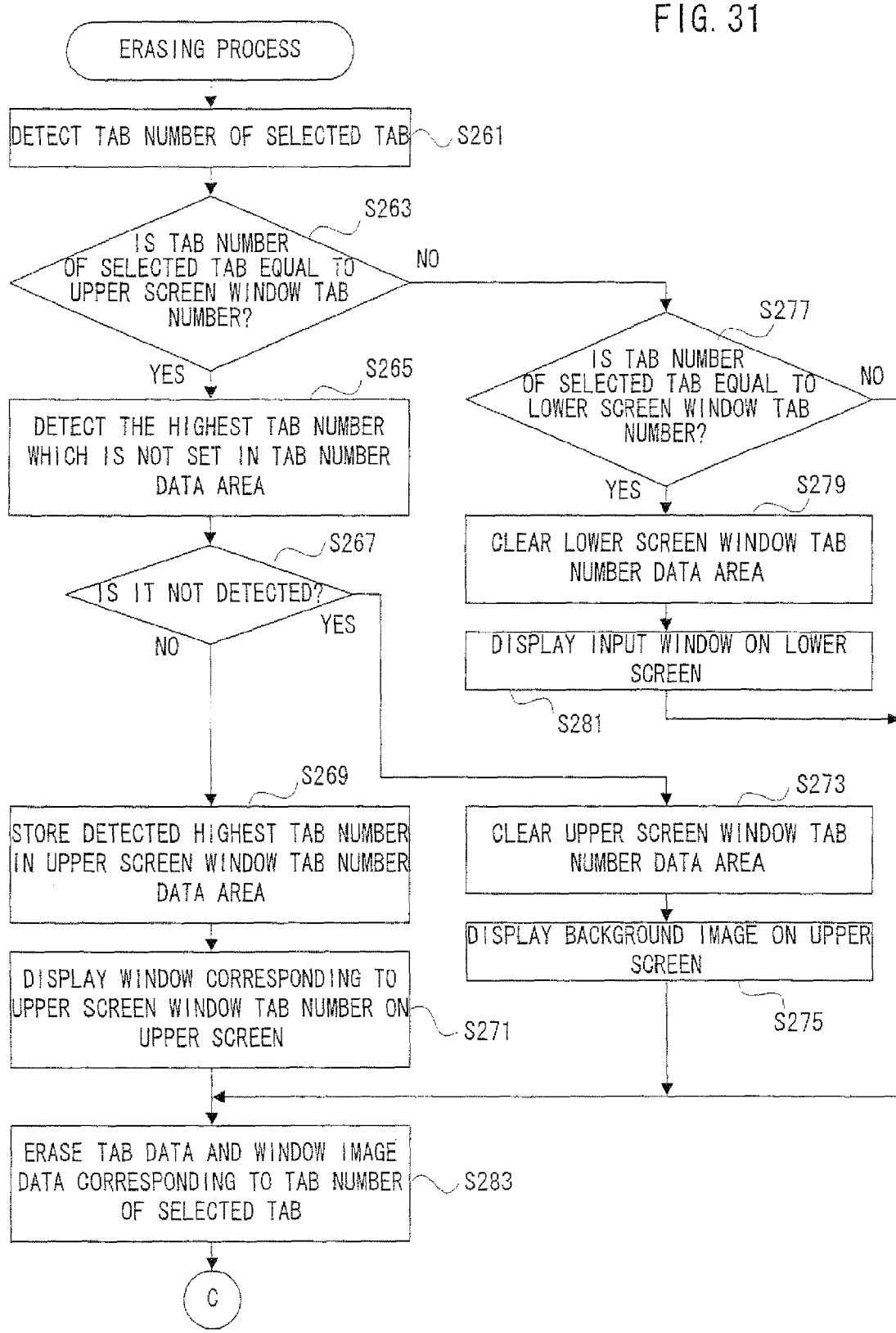
FIG. 31 is a flowchart showing a part of example of an operation of an erasing process in FIG. 26.
Figure 32:
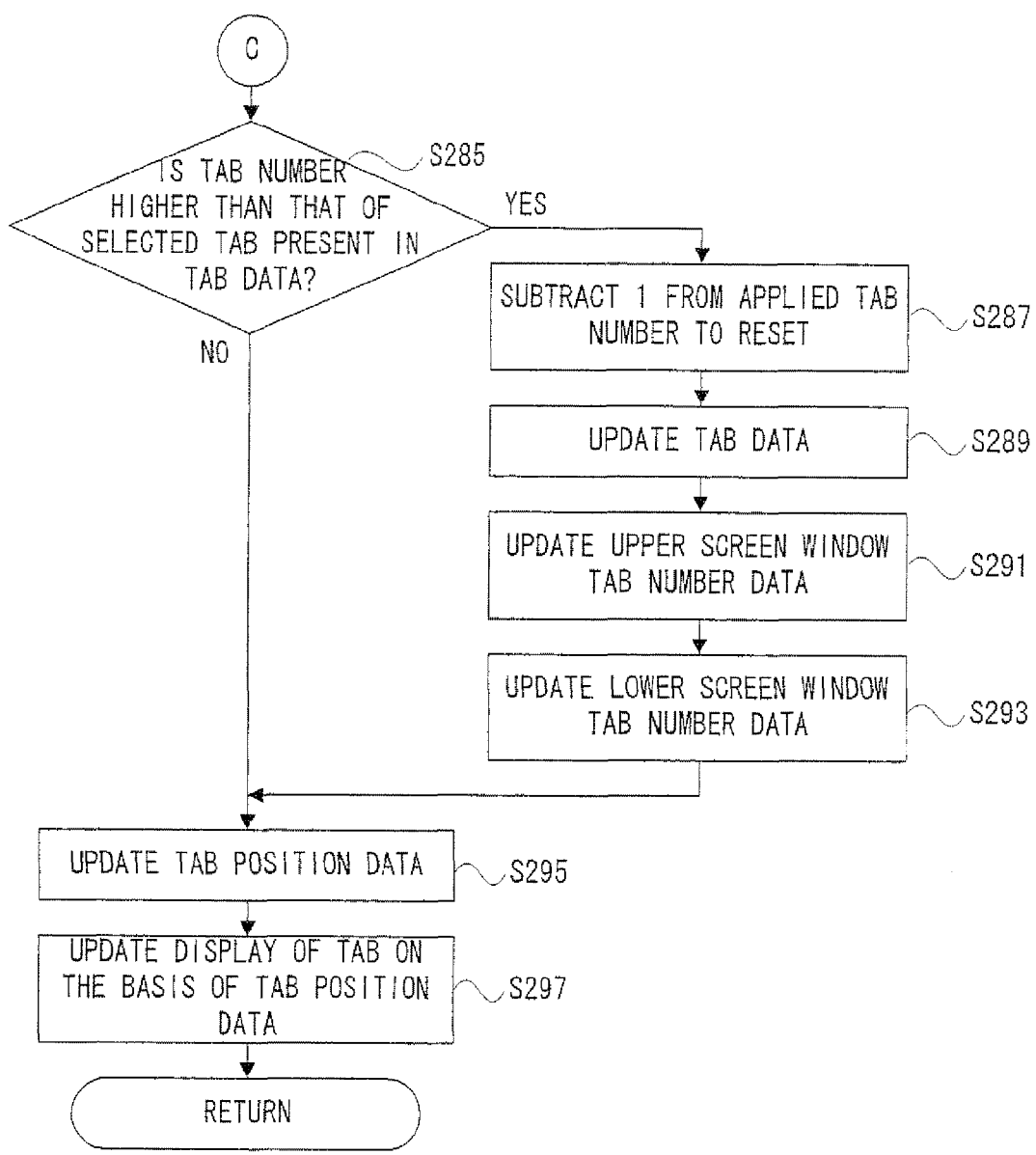
FIG. 32 is a flowchart continued from FIG. 31.

Furthermore, if "NO" in the step S143, the CPU core 42 determines whether or not a sliding operation in the right direction or a sliding operation in the left direction is performed on the basis of the touch input data in a step S145. If "YES" in the step S145, that is, if the history of the instructed coordinates indicates a continuous track in the right or left direction, the CPU core 42 executes an erasing process in a step S147. The operation of the erasing process is shown in FIG. 31 and FIG. 32 described later.

Also, if "NO" in the step S145, that is, if the operation with respect to the tab is not distinguishable, the window displaying process is ended, and the process proceeds to the step S15 in FIG. 22. Furthermore, after completion of the step S139, the step S141 or the step S147, the same is true.

FIG. 27 shows one example of an operation of the one-click process in the step S139. In a first step S161 in FIG. 27, the CPU core 42 detects a tab number of the selected tab on the basis of the touch input data and the tab position data. Next, in a step S163, the CPU core 42 determines whether or not the tab number of the selected tab is equal to the value in the upper screen window tab number storing area 82. If "YES" in the step S163, that is, if the tab corresponding to the window which is active on the upper screen is selected by the one-click operation, the CPU core 42 determines whether or not the lower screen window tab number data is a clear value in a step S165. If "NO" in the step S165, that is, if a moved window is displayed on the lower screen, the CPU core 42 reads a tab number of the lower screen window tab number data storing area 84, and stores it in the upper screen window tab number data storing area 82 in a step S167. Thus, the moved window which was displayed on the lower screen is displayed on the upper screen in an active state. It should be noted that FIG. 27 shows an operation in a case that the active window on the upper screen is moved to the lower screen. However, if the active window on the upper screen is copied to the lower screen, the upper screen window tab number data storing area 82 remains without changes.

On the other hand, if "YES" in the step S165, that is, if the input window is displayed on the lower screen, the CPU core 42 detects the highest tab number which is not set in the tab number data area in a step S169. That is, the highest tab number out of the tab numbers stored in the tab data storing area 80 and except for the tab numbers stored in the upper screen window tab number storing area 82 is detected. If a window except for the window displayed on the upper screen in an active state is created, the highest tab number is detected, and if not, the highest tab number is not detected.

Then, the CPU core 42 determines whether or not it is not detected in a step S171. If "NO" in the step S171, the CPU core 42 stores the detected highest tab number in the upper screen window tab number data storing area 82 in a step S173. Thus, the window having the highest tab number out of the inactive windows is displayed in an active state on the upper screen.

After completion of the step S167 or the step S173, the CPU core 42 displays the window corresponding to the upper screen window tab number on the upper screen in a step S175. More specifically, the CPU core 42 obtains an initial address of the window image corresponding to the upper screen window tab number with reference to the upper screen window tab number data and the tab data. Then, the CPU core 42 displays the window image on the LCD 12 on the basis of the corresponding window image data of the window image storing area 78 by utilizing the GPU 50 (or GPU 52) and the LCD controller 60.

Also, if "YES" in the step S171, that is, if an inactive window is absent, the CPU core 42 clears the upper screen window tab number data storing area 82 in a step S177. Then, in a step S179, the CPU core 42 displays a background image on the basis of the background image data on the LCD 12 by utilizing the GPU 50 (or GPU 52) and the LCD controller 60.

After completion of the step S175 or the step S179, the CPU core 42 stores the tab number of the selected tab in the lower screen window tab number data storing area 84 in a step S181. Then, in a step S183, the CPU core 42 displays the window corresponding to the lower screen window tab number on the lower screen. More specifically, the CPU core 42 obtains an initial address of the window image corresponding to the lower screen window tab number with reference to the lower screen window tab number data and the tab data. Then, the CPU core 42 displays the window image on the LCD 14 on the basis of the applied window image data of the window image storing area 78 by utilizing the GPU 52 (or GPU 50) and the LCD controller 60. It should be noted that in this exemplary embodiment, the window corresponding to the tab number stored in the lower screen window tab number storing area 84 is decided so as to be operable by an input operation via the touch panel 22, that is, by storing the tab number in the lower screen window tab number storing area 84, a corresponding window is displayed on the lower screen to thereby set the window as an inputable state. Furthermore, aside from the lower screen window tab number storing area 84 indicative of the window to be displayed on the lower screen, a data storage area indicating whether or not an input to the window on the lower screen via the touch panel 22 is possible, and by storing data indicative of an inputable state or a non-inputable state in the storage area, whether or not an input to the window displayed on the lower screen is possible may be controlled. Thus, the active window on the upper screen selected with one click is displayed in an active state (inputable state) on the lower screen. After completion of the step S183, the one-click process is ended.

On the other hand, if "NO" in the step S163, that is, if the tab corresponding to the inactive window or the moved window on the lower screen is selected with the one-click operation, the process proceeds to a step S185 in FIG. 28.

In the step S185 in FIG. 28, the CPU core 42 stores the tab number of the selected tab in the upper screen window tab number data storing area 82. Then, in a step S187, the CPU core 42 displays the window corresponding to the upper screen window tab number on the upper screen similarly to the step S175. Thus, the inactive window or the moved window on the lower screen corresponding to the selected tab is displayed in an active state on the upper screen.

Also, in a step S189, the CPU core 42 determines whether or not the tab number of the selected tab is equal to the value of the lower screen window tab number storing area 84. If "YES" in the step S189, that is, if the tab corresponding to the moved window on the lower screen is selected, the CPU core 42 clears the lower screen window tab number data storing area 84 in a step S191. Then, in a step S193, the CPU core 42 displays an input window on the lower screen. Thus, in a case that the tab corresponding to the moved window on the lower screen is selected with the one-click operation, an input window is displayed on the lower screen.

Furthermore, if "NO" in the step S189, that is, if the tab corresponding to the inactive window is selected with one click, the one click process is ended as it is. Accordingly, in this case, the display of the lower screen is not changed.

FIG. 29 shows one example of an operation of the two-click process in the step S141 (FIG. 26). In a first step S211 in FIG. 29, the CPU core 42 detects the tab number of the selected tab on the basis of the touch input data and the tab position data. Next, in a step S213, the CPU core 42 determines whether or not the tab number of the selected tab is the same as the value of the lower screen window tab number storing area 84.

If "YES" in the step S213, that is, if the tab corresponding to the moved window on the lower screen is selected with a two-click operation (or downward-sliding operation), the CPU core 42 stores the tab number of the selected tab in the upper screen window tab number data storing area 84 in a step S215. Then, in a step S217, the CPU core 42 displays the window corresponding to the upper screen window tab number on the upper screen. Thus, similarly to the one-click selection, on the upper screen, the moved window on the lower screen corresponding to the selected tab is displayed in an active state.

Furthermore, in a step S219, the CPU core 42 clears the lower screen window tab number data storing area 84. Then, in the step S211, the CPU core 42 displays an input window on the lower screen. Thus, in a case that the tab corresponding to the moved window on the lower screen is selected with the two-click operation, etc., the input window is displayed on the lower screen similarly to the one-click operation. After completion of the step S221, the two-click process is ended.

On the other hand, if "NO" in the step S213, that is, if the tab corresponding to the active window or the inactive window on the upper screen is selected with a two-click operation, etc., the process proceeds to a step S223 in FIG. 30.

In a step S223 in FIG. 30, the CPU core 42 determines whether or not the lower screen window tab number data is a clear value. If "NO" in the step S223, that is, if the moved window is displayed on the lower screen, the CPU core 42 reads the tab number in the lower screen window tab number data storing area 84, and stores it in the upper screen window tab number data storing area 82 in a step S225. Thus, the moved window displayed on the lower screen is displayed on the upper screen in the active state.

On the other hand, if "YES" in the step S223, that is, if an input window is displayed on the lower screen, the CPU core 42 determines whether or not the tab number of the selected tab is the same as the value in the upper screen window tab number storing area 82 in a step S227. If "YES" in the step S227, that is, if the active window on the upper screen is selected with a two-click operation, etc., the CPU core 42 detects the highest tab number which is not set in the tab number data area similarly to the step S169 (FIG. 27) in a step S229. Then, the CPU core 42 determines whether or not the highest tab number is not detected in a step S231. If "NO" in the step S231, that is, if the inactive window exists, the CPU core 42 stores the detected highest tab number in the upper screen window tab number data storing area 82 in a step S233. Thus, a window having the maximum tab number out of the inactive windows is displayed on the upper screen in an active state.

After completion of the step S225 or S233, the CPU core 42 displays a window corresponding to the upper screen window tab number on the upper screen in a step S235.

Also, if "YES" in the step S231, that is, if an inactive window is absent, the CPU core 42 clears the upper screen window tab number data storing area 82 in a step S237, and displays a background image on the LCD 12 in a step S239.

Furthermore, if "NO" in the step S227, that is, if the tab corresponding to the inactive window is selected with a two-click operation, etc., the display on the upper screen is without change, and the process proceeds to a step S241. Additionally, after completion of the step S235 or S239, the process proceeds to the step S241.

In the step S241, the CPU core 42 stores the tab number of the selected tab in the lower screen window tab number data storing area 84. Then, in a step S243, the CPU core 42 displays the window corresponding to the lower screen window tab number on the lower screen, and allows an operation input to the window similarly to the step S183 (FIG. 27). Thus, the active window or inactive window on the upper screen selected by a two-click operation, etc. is displayed in an active state on the lower screen. After completion of the step S243, the two-click process is ended.

FIG. 31 shows one example of an operation of an erasing process in the step S147 (FIG. 26). In a first step S261 in FIG. 31, the CPU core 42 detects the tab number of the tab selected by the erasing operation on the basis of the touch input data and the tab position data. Next, in a step S263, the CPU core 42 determines whether or not the tab number of the selected tab is the value the same as that in the upper screen window tab number storing area 82.

If "YES" in the step S263, that is, if the tab corresponding to the window which is in an active state on the upper screen is instructed by an erasing operation, the CPU core 42 detects the highest tab number which is not set in the tab number data area in a step S265. That is, except for the tab number stored in the upper screen window tab number storing area 82 and the lower screen window tab number storing area 84, the highest tab number out of the tab numbers stored in the tab data storing area 80 is detected. Then, in a step S267, the CPU core 42 determines whether or not the highest tab number is not detected. If "NO" in the step S267, that is, if an inactive window exists, the CPU core 42 stores the detected highest tab number in the upper screen window tab number data storing area 82 in a step S269. Then, in a step S271, the CPU core 42 displays the window corresponding to the upper screen window tab number. Thus, in a case that the tab corresponding to the active window on the upper screen is selected with an erasing operation, when an inactive window exists, the window corresponding to the highest tab number is displayed on the upper screen in an active state.

On the other hand, if "YES" in the step S267, that is, if an inactive window does not exist, the CPU core 42 clears the upper screen window tab number data storing area 82 in a step S273, and displays a background image on the upper screen in a step S275.

Additionally, if "NO" in the step S263, that is, if the inactive window or the tab corresponding to the moved window on the lower screen is selected by an erasing operation, the CPU core 42 determines whether or not the tab number of the selected tab is the value the same as that in the lower screen window tab number storing area 84 in a step S277. If "YES" in the step S277, that is, if the tab corresponding to the moved window on the lower screen is instructed with an erasing operation, the CPU core 42 clears the lower screen window tab number data storing area 84 in a step S279, and displays an input window on the lower screen in a step S281.

Also, if "NO" in the step S277, that is, if the tab corresponding to the inactive window is selected by an erasing operation, since the inactive window is not displayed on the screen in this exemplary embodiment, the display of the window is not changed, and the process proceeds to a step S283. Furthermore, after completion of the step S271, the step S275 or the step S281, the process proceeds to the step S283.

In the step S283, the CPU core 42 erases the tab data and the window image data corresponding to the tab number of the selected tab from the tab data storing area 80 and the window image storing area 78. After completion of the step S283, the process proceeds to a next step S285 in FIG. 32.

In the step S285 in FIG. 32, the CPU core 42 determines whether or not a tab number higher than the tab number of the tab selected by an erasing operation exists in the tab data storing area 80. If "YES" in the step S285, the CPU core 42 subtracts 1 from the applied tab number to reset the tab number in a step S287. Then, in a step S289, as to the tab data having a tab number larger than that of the selected tab, the CPU core 42 overwrites the reset tab number in the tab number in the tab data storing area 80 to update the tab data. Also, in a step S291, if the tab number higher than that of the selected tab is stored, the CPU core 42 updates the upper screen window tab number data storing area 82 to the reset tab number. Furthermore, in a step S293, the CPU core 42, if the tab number larger than that of the selected tab is stored, updates the lower screen window tab number data storing area 84 to the reset tab number.

It should be noted that if "NO" in the step S285, the tab number needs not to be reset, and therefore, the process directly proceeds to a step S295.

In the step S295, the CPU core 42 updates the tab position data storing area 86. More specifically, the display position data corresponding to the tab number of the tab selected by the erasing operation is erased. Furthermore, if the tab number larger than that of the selected tab exists, the applied tab number is subtracted by 1 to update the tab number. Furthermore, the reset of the display position is performed as necessary as to the tab remained without being erased.

Then, in a step S297, the CPU core 42 updates the display of the tab on the basis of the tab position data. That is, the CPU core 42, if the data relating to the tab exists in the tab position data, displays an image of each tab in each display position of the tab position data on the basis of the title image data, etc. by utilizing the GPU 52 (or GPU 50) and the LCD controller 60. It should be noted that if the display position data of the tab does not exist in the tab position data storing area 86, a background image is displayed in the area for displaying the tab of the lower screen. After completion of the step S297, the erasing process is ended.

According to this exemplary embodiment, since the plurality of tabs respectively brought into correspondence with the plurality of windows are displayed on the LCD 14, the user performs a predetermined operation input in a display position or range of a tab on the LCD 14 by utilizing the touch panel 22 to thereby control the window corresponding to the tab. More specifically, by performing a predetermined input on the tab of the LCD 14, the window displayed on the forefront (active window) on the LCD 12 can be displayed on the LCD 14. Thus, it becomes possible to operate and input the window by means of the touch panel 22. Thus, even the window which was displayed on the LCD 12 can be displayed on the LCD 14 so as to become an inputable state, capable of improving the operability.

Furthermore, the user uses different input operations in accordance with the intention to thereby differentiate the display control of the inactive window which is not displayed on the LCD 12. For example, since a first predetermined input with the one-click operation is performed to temporarily display an inactive window on the forefront on the LCD 12, by confirming the content of window in advance, and by performing the one-click operation, etc. as necessary after the confirmation, it is possible to display the window on the LCD 14. On the other hand, in a case that there is no need to confirm the content of the applied window, by performing a second predetermined input with the two-click operation or downward-sliding operation, an inactive window can directly be displayed on the LCD 14. Thus, the window can directly be set to the inputtable state, which allows a quick input. Accordingly, it is possible to improve operability.

In addition, by performing a predetermined input on the tab which is being brought into correspondence with the window displayed on the LCD 14, it is possible to display the window on the forefront on the LCD 12. In this case, if an input operation is not required on the window displayed on the LCD 14, the window can be moved from the LCD 14 to the LCD 12, capable of the operability.

Also, when a window is to be displayed on the LCD 14, if another window (moved window) has already been displayed on the LCD 14, the window is displayed on the LCD 12. In this case, the window to be input from now and the window which has been an object to be input at that time can be displayed such that the display areas are switched by only a predetermined input, capable of the operability.

Also, like the exemplary embodiment, in a case that the touch panel 22 set on the LCD 14 as an input means is applied, the player can operate the tab on the LCD 14 as if he or she feels a sense of actually touching it. In addition, similarly, the user can operate the window displayed on the LCD 14 as if he or she feels a sense of directly touching it. Accordingly, it is possible to control the window by utilizing the touch panel 22 with an intuitive operation. Also, since the touch panel 22 is an input means, a window as an operational object can be displayed on the LCD 14 which is within a range touchable by a user, that is, reachable by the user. Accordingly, it is possible to further improve the operability.

Figure 33:
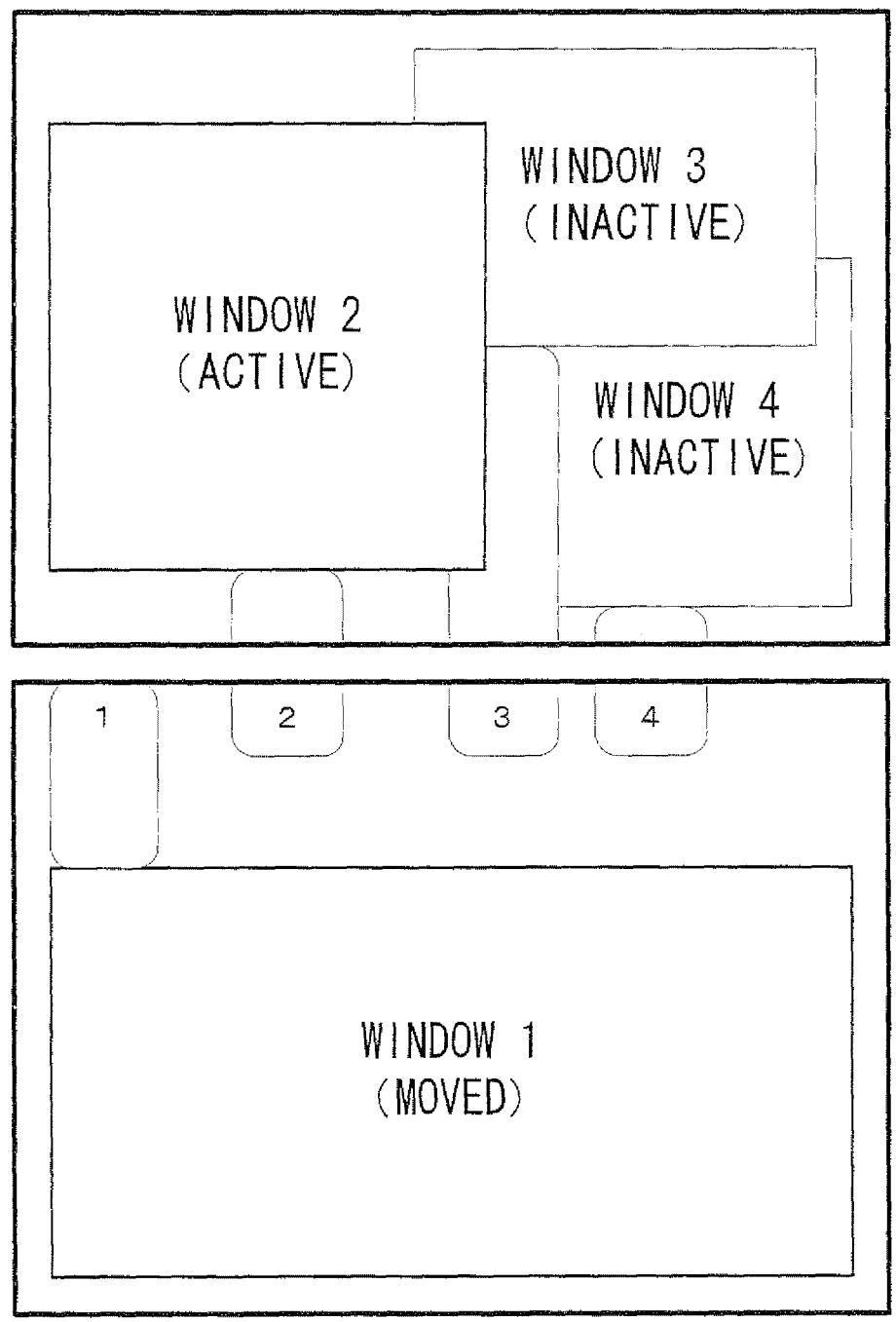
FIG. 33 is an illustrative view showing a modified example of a display screen where a plurality of windows are simultaneously displayed on the upper screen.

It should be noted that in this exemplary embodiment, only one window out of the plurality of windows is displayed on the upper screen. However, as shown in FIG. 33, a plurality of windows including an inactive window may simultaneously be displayed on the upper screen in an overlapping manner. In this case, the window corresponding to the tab number stored in the upper screen window tab number storing area 82 is made to an active state, that is, is displayed on the forefront. Also, the window corresponding to the tab number which is not stored in the upper screen window tab number storing area 82 is made to an inactive state, and is displayed so as to be partially hidden under the window displayed on the forefront on the upper screen. It should be noted that the plurality of windows are thus simultaneously displayed in an overlapped manner, the plurality of windows have the information relating to a depth indicative of a displaying order on the screen, and the tab number, for example, may be utilized as the displaying order. That is, the displaying order of the inactive windows on the LCD 12 may be set such that the window is displayed on a front side in ascending order of the tab number, for example. Or, the former the window displayed on the forefront, the deeper the window is displayed.

Furthermore, in each of the above-described exemplary embodiments, only on the upper screen, the plurality of windows are displayed in an overlapped manner, or only the forefront window out of the plurality of windows is displayed while on the lower screen, only the one window (moved window) is displayed. It should be noted that the input window is displayed on the initial state of the lower screen and not moved to the upper screen, and is thus not included in the window to be controlled between the plurality of display areas as feature of certain exemplary embodiments. However, in other exemplary embodiments, on the lower screen, similarly to the upper screen, a plurality of windows are displayed in an overlapping manner, or only the forefront window out of the plurality of windows may be displayed.

Also, in each of the above-described exemplary embodiments, when the window which has been displayed on the forefront is displayed on the LCD 14, on the LCD 12, another window (window having the highest tab number, for example) is displayed on the forefront of the LCD 12, or the background image is displayed, for example. That is, the window is represented so as to be moved from the LCD 12 to the LCD 14. However, in another exemplary embodiment, the window may be displayed on the LCD 14 while it remains to be displayed on the LCD 12. That is, the window may be represented so as to be copied from the LCD 12 to the LCD 14.

Also, in each of the above-described exemplary embodiments, although the first LCD 12 and the second LCD 14 are vertically arranged, the arrangement of the two LCDs may be changed as necessary. For example, in the information processing apparatus 10 of another exemplary embodiment, the first LCD 12 and the second LCD 14 may horizontally be arranged.

Furthermore, in each of the above-described exemplary embodiments, although the two LCDs respectively displaying two screens are provided, the number of the LCDs as a display portion may be changed as required. For example, in the information processing apparatus 10 of the other exemplary embodiments, one vertically-long shaped LCD is provided, and on at least one of the vertically divided display areas, a touch panel 22 is provided, and two images or screens may respectively be displayed on the display areas. Or, one horizontal-long shaped LCD is provided, and on at least one of the display areas horizontally divided, the touch panel 22 is provided, and two images or screens may respectively be displayed on the display areas.

In addition, the first display area is divided into a plurality of areas to simultaneously display the plurality of windows. For example, the first display area 12 is divided into the left half area and the right half area. A certain window is displayed on the left half area, and another window is displayed on the right half area. At this time, the upper screen window tab number storing area 82 may includes a left area window tab number storing area 82*a* and a right area window tab number storing area 82*b*. For example, the deepest window is displayed at the left half area, and the second deepest window is displayed at the right half area, or arbitrary two windows may be displayed on the respective areas according to user's selection. In this case, irrespective of the left area or the right area, when the tab corresponding to the window displayed on the first display area is touched, the corresponding window may be displayed on the second display area. Also, when the tab corresponding to the window which is not displayed is touched, the corresponding window may be displayed on any one of the left area and the right area. Also, the second display area may be divided into a plurality of areas to thereby simultaneously display a plurality of windows. Of course, each of the first display area and the second display area may be divided into three or more areas to allow three or more windows to be simultaneously displayed.

In addition, in each of the above-described exemplary embodiments, although a window is displayed on a part of the display area 12 or 14, the window may be displayed on the entire (full-screen) of the display area 12 or 14.

Additionally, in each of the above-described exemplary embodiments, the input means for instructing an arbitrary position on the second display area is the touch panel 22. However, other pointing devices, such as a computer mouse, a touch pad, a tablet, etc. may be utilized, for example. In this case, an image such as a mouse pointer, a cursor, or the like for denoting an instructed position is displayed on the second display area.

Although certain exemplary embodiments have been described and illustrated in detail, it is clearly understood that the same is by way of illustration and example only and is not to be taken by way of limitation, the spirit and scope of certain exemplary embodiments being limited only by the terms of the appended claims.

What is claimed is:

1. An information processing apparatus, comprising:
    a memory for storing data to display a plurality of windows and data to display a plurality of selection areas which respectively correspond to the plurality of windows,
    a display for including a first display area on which the plurality of windows are displayed in an overlapping manner and a second display area on which the plurality of selection areas are displayed, and
    a processor coupled to the memory, the memory storing instructions that, when executed by the processor, control the processor to:
        detect an input to display positions of the plurality of selection areas displayed in the second display area,
        when it is determined that a first predetermined input is performed within a selection area, displayed in the second display area, corresponding to a forefront window out of the plurality of windows displayed in the overlapping manner on the first display area, display on the second display area the forefront window corresponding to the selection area within which the first predetermined input is performed, and
        when it is determined that the first predetermined input is performed within a selection area, displayed in the second displayed area, corresponding to a window a part of which is hidden under the forefront window displayed on the first display area, display on the first display area the window corresponding to the selection area within which the first predetermined input is performed as a forefront window overlapping other windows displayed in the first display area.

2. The information processing apparatus according to claim 1, wherein the processor is further controlled to, when it is determined that the first predetermined input is performed within a selection area corresponding to a window which is not displayed on the first display area and the second display area, display on the first display area the window corresponding to the selection area within which the first predetermined input is performed.

3. The information processing apparatus according to claim 1, wherein the processor is further controlled to, when it is determined that a second predetermined input is performed within a selection area corresponding to a window which is not displayed on the first display area and the second display area or a window a part of which is hidden under the window displayed on the forefront on the first display area, display on the second display area the window corresponding to the selection area within which the second predetermined input is performed.

4. The information processing apparatus according to claim 3, wherein the processor is further controlled to:
    detect an input to an arbitrary position of the second display area, and
    set, when a window is displayed on the second display area, the window to an inputable state.

5. The information processing apparatus according to claim 1, wherein the processor is further controlled to, when it is determined that a predetermined input is performed within a selection area corresponding to the window displayed on the second display area, display on the first display area the window, displayed on the second display area, corresponding to the selection area within which the predetermined input is performed as a forefront window overlapping other windows displayed in the first display area.

6. The information processing apparatus according to claim 1, wherein the processor is further controlled to, in a case that the window corresponding to the selection area within which the first predetermined input is performed is displayed on the second display area and when it is determined that another window is being displayed on the second display area, display on the first display window the other window as a forefront window overlapping other windows displayed in the first display area.

7. The information processing apparatus according to claim 1, wherein the processor is further controlled to detect the first predetermined input on the basis of the input from a touch panel which is not set on the first display area but is set on the second display area.

8. The information processing apparatus according to claim 1, wherein the memory stores data to display a basic input window to be displayed on the second display area, and
the processor is further controlled to display the basic input window on the second display area when no window to be displayed on the second display area is present.

9. The information processing apparatus according to claim 1, wherein the processor is further controlled to, when a predetermined coordinates input is performed to the window displayed on the second display area, generate data to display a new window and data to display a new selection area, and store the generated data in the memory by bringing the data to display a new window and the data to display a new selection area into correspondence with each other, and
the processor is further controlled to display the generated selection area on the second display area.

10. The information processing apparatus according to claim 1, wherein the first display area is a first display screen and the second display area is a second display screen that is different from the first display screen.

11. The information processing apparatus according to claim 1, wherein the processor is further controlled to:
when it is determined that a second predetermined input, having an operation input that is different from an operation input of the first predetermined input, is performed within the selection area corresponding to the window a part of which is hidden under the forefront window displayed on the first display area, display on the second display area the window corresponding to the selection area within which the second predetermined input is performed.

12. An information processing apparatus, comprising:
a memory for storing data to display a plurality of windows and data to display a plurality of selection areas which respectively correspond to the plurality of windows,
a display including a first display area on which the plurality of windows are displayed in an overlapping manner and a second display area on which the plurality of selection areas are displayed, and
a processor coupled to the memory, the memory storing instructions that, when executed by the processor, control the processor to:
detect an input to display positions of the plurality of selection areas displayed in the second display area,
when it is determined that a first predetermined input is performed at a display position of a selection area, displayed in the second display area, corresponding to window a part of which is hidden under a forefront window out of the plurality of windows displayed in the overlapping manners on the first display area, display on the second display area the window corresponding to the selection area within which the first predetermined input is performed, and
when it is determined that a second predetermined input, having an operation that is different from an operation of the first predetermined input, is performed at the display position of a selection area, displayed in the second display area, corresponding to the window a part of which is hidden under the forefront window out of the plurality of windows displayed in the overlapping manners on the first display area, display on the first display area the window corresponding to the selection area within which the second predetermined input is performed as a forefront window overlapping other windows displayed in the first display area.

13. The information processing apparatus according to claim 12, wherein the processor is further controlled to, when it is determined that the second predetermined input is performed within a selection area, displayed in the second display area, corresponding to the forefront window out of the plurality of windows displayed in the overlapping manners on the first display area, display on the second display area the forefront window corresponding to the selection area within which the second predetermined input is performed.

14. An information processing system comprising:
a memory storing an information processing program, data to display, on a first display area of a display, a plurality of windows in an overlapping manner, and data to display ,on a second display area of the display, a plurality of selection areas which respectively correspond to the plurality of windows, the information processing program, when executed, causing a processor of the information processing system to execute:
detecting an input to display positions of the plurality of selection areas displayed in the second display area,
when it is determined that a predetermined input is performed within a selection area, displayed in the second display area, corresponding to a forefront window out of a plurality of windows displayed in the overlapping manner on the first display area, displaying on the second display area the forefront window corresponding to the selection area within which the predetermined input is performed, and
when it is determined that the predetermined input is performed within a selection area, displayed in the second displayed area, corresponding to a window a part of which is hidden under the forefront window displayed on the first display area, display on the first display area the window corresponding to the selection area within which the predetermined input is performed as a forefront window overlapping other windows displayed in the first display area.

15. The information processing system according to claim 14, wherein the information processing program, when executed, further causes the processor to, when it is determined that a second predetermined input is performed within a selection area corresponding to a window a part of which is hidden under the window displayed on the forefront on the first display area, display on the second display area the window corresponding to the selection area within which the second predetermined input is performed.

16. A non-transitory storage medium storing an information processing program of an information processing apparatus comprising a memory for storing data to display a plurality of windows and data to display a plurality of selection areas which respectively correspond to the plurality of windows, and a display for including a first display area on which the plurality of windows are displayed in an overlapping manner, and a second display area on which the plurality of selection areas are displayed, wherein
the information processing program causes a processor of the information processing apparatus to execute:
detecting an input to display positions of the plurality of selection areas displayed in the second display area, when it is determined that a predetermined input is performed within a selection area, displayed in the second display area, corresponding to a forefront window out of a plurality of windows displayed in the overlapping manner on the first display area, displaying on the second display area the forefront window corresponding to the selection area within which the predetermined input is performed, and when it is determined that the predetermined input is performed within a selection area, displayed in the second displayed area, corresponding to a window a part of which is hidden under the forefront window displayed on the first display area, display on the first display area the window corresponding to the selection area within which the predetermined input is performed as a forefront window overlapping other windows displayed in the first display area.

17. A window controlling method of an information processing apparatus comprising a memory for storing data to display a plurality of windows and data to display a plurality of selection areas which respectively correspond to the plurality of windows, and a display for including a first display area on which the plurality of windows are displayed in an overlapping manner, and a second display area on which the plurality of selection areas are displayed, further including:

detecting an input to display positions of the plurality of selection areas displayed on the second display area, when it is determined that a predetermined input is performed within a selection area, displayed in the second display area, corresponding to a forefront window out of the plurality of windows displayed in the overlapping manner on the first display area, displaying on the second display area the forefront window corresponding to the selection area within which the predetermined input is performed, and when it is determined that the predetermined input is performed within a selection area, displayed in the second displayed area, corresponding to a window a part of which is hidden under the forefront window displayed on the first display area, display on the first display area the window corresponding to the selection area within which the predetermined input is performed as a forefront window overlapping other windows displayed in the first display area.

18. An information processing system comprising:

a memory storing an information processing program, data to display, on a first display area of a display, a plurality of windows in an overlapping manner, and data to display, on a second display area of the display, a plurality of selection areas which respectively correspond to the plurality of windows, the information processing program, when executed causing a processor of the information processing system to execute detecting an input to display positions of the plurality of selection areas displayed on the second display area, when it is determined that a first predetermined input is performed at a display position of a selection area, displayed in the second display area, corresponding to a window a part of which is hidden under a forefront window out of the plurality of windows displayed in the overlapping manner displayed on the first display area, displaying on the second display area the window corresponding to the selection area within which the first predetermined input is performed, and when it is determined that a second predetermined input, having an operation that is different from an operation of the first predetermined input, is performed at the display position of a selection area, displayed in the second display area, corresponding to the window a part of which is hidden under the forefront window out of the plurality of windows displayed in the overlapping manners on the first display area, display on the first display area the window corresponding to the selection area within which the second predetermined input is performed as a forefront window overlapping other windows displayed in the first display area.

19. A non-transitory storage medium storing an information processing program of an information processing apparatus comprising a memory for storing data to display a plurality of windows and data to display a plurality of selection areas which respectively correspond to the plurality of windows, and a display including a first display area on which the plurality of windows are displayed in an overlapping manner, and a second display area on which the plurality of selection areas are displayed, wherein the information processing program causes a processor of the information processing apparatus to execute:

detecting an input to display positions on the plurality of selection areas displayed on the second display area, and when it is determined that a first predetermined input is performed at a display position of a selection area, displayed in the second display area, corresponding to a window a part of which is hidden under a forefront window out of the plurality of windows displayed in the overlapping manner on the first display area, displaying on the second display area the window corresponding to the selection area within which the first predetermined input is performed, and when it is determined that a second predetermined input, having an operation that is different from an operation of the first predetermined input, is performed at the display position of a selection area, displayed in the second display area, corresponding to the window a part of which is hidden under the forefront window out of the plurality of windows displayed in the overlapping manners on the first display area, display on the first display area the window corresponding to the selection area within which the second predetermined input is performed as a forefront window overlapping other windows displayed in the first display area.

20. A window controlling method of an information processing apparatus comprising a memory for storing data to display a plurality of windows and data to display a plurality of selection areas which respectively correspond to the plurality of windows, and a display including a first display area on which the plurality of windows are displayed in an overlapping manner, and a second display area on which the plurality of selection areas are displayed, including:

detecting an input to a display position of the plurality of selection areas displayed in the second display area, and when it is determined that a first predetermined input is performed at a display position of a selection area, displayed in the second display area, corresponding to a window a part of which is hidden under a forefront window out of the plurality of windows displayed in the overlapping manner on the first display area, displaying on the second display area the window corresponding to the selection area within which the first predetermined input is performed, and when it is determined that a second predetermined input, having an operation that is different from an operation of the first predetermined input, is performed at the display position of a selection area, displayed in the second display area, corresponding to the window a part of which is hidden under the forefront window out of the plurality of windows displayed in the overlapping manners on the first display area, displaying on the first display area the window corresponding to the selection area within which the second predetermined input is performed as a forefront window overlapping other windows displayed in the first display area.

21. An information processing apparatus, comprising:
a memory for storing data to display a plurality of windows and data to display a plurality of selection areas which respectively correspond to the plurality of windows,
a display including a first display area on which the plurality of windows are displayed in an overlapping manner, and a second display area on which the plurality of selection areas are displayed,
a detector for detecting an input to display positions of the plurality of selection areas displayed in the second display area, and
a display controller configured to:
when a predetermined input is detected by the detector within a selection area, displayed in the second display area, corresponding to a forefront window out of the plurality of windows displayed on the first display area, display on the second display area the forefront window corresponding to the selection area within which the predetermined input is detected, and
when the predetermined input is detected within a selection area, displayed in the second display area, corresponding to a window a part of which is hidden under the forefront window displayed on the first display area, display on the first display area the window a part of which is hidden under the forefront window and which corresponds to the selection area within which the predetermined input is detected as a forefront window overlapping other windows displayed in the first display area.

22. An information processing system, comprising:
a memory for storing data to display a plurality of windows and data to display a plurality of selection areas which respectively correspond to the plurality of windows,
a display including a first display area on which the plurality of windows are displayed in an overlapping manner and a second display area on which the plurality of selection areas are displayed, and
a processor coupled to the memory, the memory storing instructions that, when executed by the processor, control the processor to:
detect an input to display positions of the plurality of selection areas,
when it is determined that a predetermined input is performed within a selection area, displayed in the second display area, corresponding to a forefront window out of the plurality of windows displayed in the overlapping manner on the first display area, display on the second display area the forefront window corresponding to the selection area within which the predetermined input is performed, and
when it is determined that the predetermined input is performed within a selection area, displayed in the second displayed area, corresponding to a window a part of which is hidden under the window displayed on the forefront on the first display area, display on the first display area the window a part of which is hidden under the forefront window and which corresponds to the selection area within which the predetermined input is performed as a forefront window overlapping other windows displayed in the first display area.

23. An information processing display device comprising:
a memory configured to store (a) data representing a plurality of displayable windows,
(b) data representing a plurality of selection areas respectively corresponding to said plurality of displayable windows, and (c) executable instructions;
a processor coupled to the memory, the processor executing the executable instructions stored in the memory to:
display of the plurality of displayable windows within a first display area, with a first of the plurality of displayable windows being displayed in the forefront to at least partially hide at least one other window of the plurality of displayable windows displayed in the first display area,
display the plurality of selection areas within a second display area different from the first display area,
detect input corresponding to a display position of at least one of the displayed selection areas,
in response to detection of the detected input to a selection area, displayed in the second display area, corresponding to the first window being displayed in the forefront in the first display area, move the first window from the first display area to the second display area and display the first window next to at least one other input area displayed in the second display area, and
in response to detection of the detected input to a selection area, displayed in the second display area, corresponding to a window a part of which is hidden under the first window being displayed in the forefront in the first display area, redisplay the window, a part of which is hidden under the first window, in the forefront of the first display area to at least partially hide at least one other window of the plurality of displayable windows displayed in the first display area.

24. The display device of claim 23, wherein the first window is moved from the first display area to the second display area to enable touch input into the first window displayed in the second display area.

* * * * *